US006941287B1

(12) United States Patent
Vaidyanathan et al.

(10) Patent No.: US 6,941,287 B1
(45) Date of Patent: Sep. 6, 2005

(54) DISTRIBUTED HIERARCHICAL EVOLUTIONARY MODELING AND VISUALIZATION OF EMPIRICAL DATA

(75) Inventors: Akhileswar Ganesh Vaidyanathan, Hockessin, DE (US); Aaron J. Owens, Newark, DE (US); James Arthur Whitcomb, Brevard, NC (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/466,041

(22) Filed: Dec. 17, 1999

Related U.S. Application Data

(60) Provisional application No. 60/131,804, filed on Apr. 30, 1999.

(51) Int. Cl.[7] .................................................. G06F 15/18

(52) U.S. Cl. ............................. 706/12; 706/14; 706/46

(58) Field of Search ............................. 706/46, 12, 14; 707/100

(56) References Cited

U.S. PATENT DOCUMENTS 5,140,530 A 8/1992 Guha et al.
5,727,128 A 3/1998 Morrison
5,864,803 A * 1/1999 Nussbaum .................. 704/232

FOREIGN PATENT DOCUMENTS

WO WO 98/07100 2/1998

OTHER PUBLICATIONS

E. A. Unger et al, Entropy as a Measure of Database Information, Dec. 1990, IEEE, TH0351–7/90/0000/0080, 80–87.*

Donald German, The Entropy strategy for Shape Recognition, Oct. 1994, IEEE, Information theory and Statistics, 8.*

Du–Yih Tsai et al, Computerized Analysis of Heart Diseases in Echocardiographic Images, 1996, IEEE, 0–7803–3258–X.*

Mieko Tanaka–Yamawaki et al, Classification of the Totalistic and Semitotalistic Rules of Cellular Automata, May 1996, IEEE, Evolutionary Computation, 748–753.*

A Mathematical Theory of Communication, Bell System Technical Journal, vol. 27, pp. 623–656, (1948).

Morphology and Physical Properties of Polymer Alloys. Proceedings of the International Conference on 'Mechanical Behavior of Materials VI' Kyoto 325, 1991. (In Japanese).

Neural Networks for Financial Forecasting by Edward Gately, p. 20–31. (1996)*.

Wann M. et al: "The Influence of Training Sets on Generalization in Feed–Forward Neural Networks" International Joint Conference on Neural Networks; vol. 17, Jun. 1990.

(Continued)

*Primary Examiner*—Anthony Knight
*Assistant Examiner*—Joseph P. Hirl
(74) *Attorney, Agent, or Firm*—George M. Medwick

(57) ABSTRACT

A distributed hierarchical evolutionary modeling and visualization of empirical data method and machine readable storage medium for creating an empirical modeling system based upon previously acquired data. The data represents inputs to the systems and corresponding outputs from the system. The method and machine readable storage medium utilize an entropy function based upon information theory and the principles of thermodynamics to accurately predict system outputs from subsequently acquired inputs. The method and machine readable storage medium identify the most information-rich (i.e., optimum) representation of a data set in order to reveal the underlying order, or structure, of what appears to be a disordered system. Evolutionary programming is one method utilized for identifying the optimum representation of data.

68 Claims, 27 Drawing Sheets

OTHER PUBLICATIONS

Deller Jr, J.R. "Toward the use of Set–Membership Identification in Efficient Training of Feedforward Neural Networks" Proceedings of the International Symposium on Circuits and Systems, US New York, IEEE.

Rosca, Justinian P., "Entropy–Driven Adaptive Representation" Process Workshop on Genetic Programming "From Theory to Real World Applications", Sep. 1995.

Fisher John W., et al, "A Nonparametric Methodology for Information Theoretic Feature Extraction" Process of Darpa, Image Understanding Workshop, 1997.

Physics From Fisher International, A Unification by B. Roy Frieden. Cambridge University Press. (1998).

Morphology and Physical Properties of Three–Component Incompatible Polymer Alloys. Kobunshi Ronbunshu, 49(4) 373–82. (1992).

Adaptation in Natural and Artifical Systems by John Holland, Ann Arbor. University of Michigan, pp. 89–120 (1975).

Genetic Algorithms in Search, Optimization and Machine Learning, By D. E. Goldberg. Addison, Wesley Publishing, pp. 1–23, 59–88 (1989).

An Introduction to Genetic Algorithms by M. Mitchell, pp. 6–12, MIT Press (1997).

The Self–Organizing Map. by T. Kohonen. Proceedings of IEEE vol. 78(4) 1464–1480 (1990).

Genetic Programming—on the Programming of Computers by Natural Selection by J. R. Koza., pp. 73–119, MIT Press, (1992).

Data Mining Techniques for Marketing, Sales and Customer Support by Michael J. A. Berry and Gordon Linhoff, pp. 75–85, (1997).

Neural Networks for Financial Forecasting by Edward Gately, p. 20. (1996)*.

"Genetic Algorithms" by John Holland, Scientific American, pp. 66–72, (Jul. 1992).

Neural Networks for Pattern Recognition by Christopher M. Bishop. p. 7 and 8. Clarendon Press, Oxfrord.

* cited by examiner

| DATA | 1-D Feature Subspace 0010 | 0100 |
|---|---|---|
| DP1 (.5, 1.5, .5, 1.5) | C1 | C2 |
| DP2 (.9, .7, 1.2, 1.2) | C2 | C1 |
| DP3 (.2, 1.9, 1.7, 1.1) | C2 | C2 |
| DP4 (.1, .4, .3, 1.7) | C1 | C1 |

| DATA | 2-D Feature Subspace 1100 | 1010 |
|---|---|---|
| DP1 (.5, 1.5, .5, 1.5) | C2 | C1 |
| DP2 (.9, .7, 1.2, 1.2) | C1 | C2 |
| DP3 (.2, 1.9, 1.7, 1.1) | C2 | C2 |
| DP4 (.1, .4, .3, 1.7) | C1 | C1 |

FIG. 3C
| DATA | 3-D Feature Subspace 1011 | 1101 |
|---|---|---|
| DP1 (.5, 1.5, .5, 1.5) | C1 | C2 |
| DP2 (.9, .7, 1.2, 1.2) | C2 | C1 |
| DP3 (.2, 1.9, 1.7, 1.1) | C2 | C2 |
| DP4 (.1, .4, .3, 1.7) | C1 | C1 |
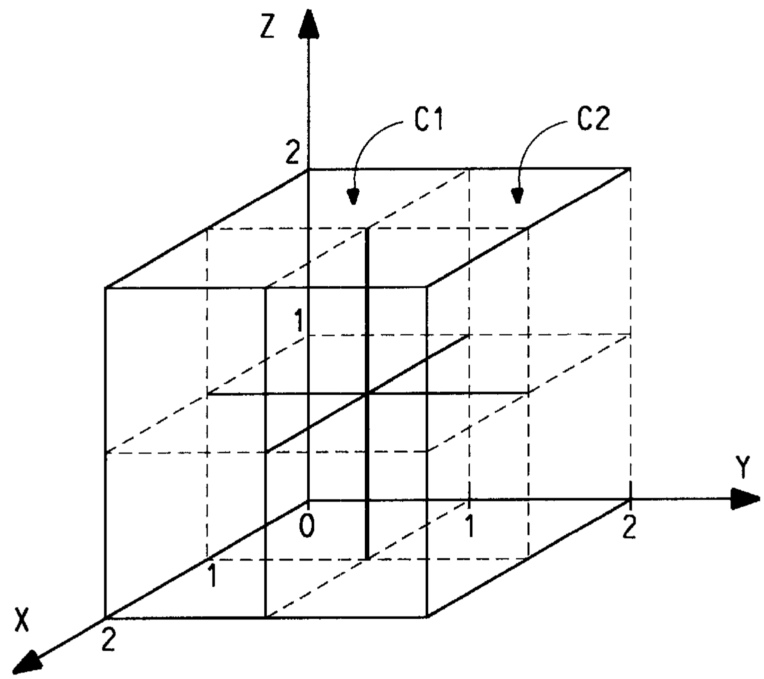
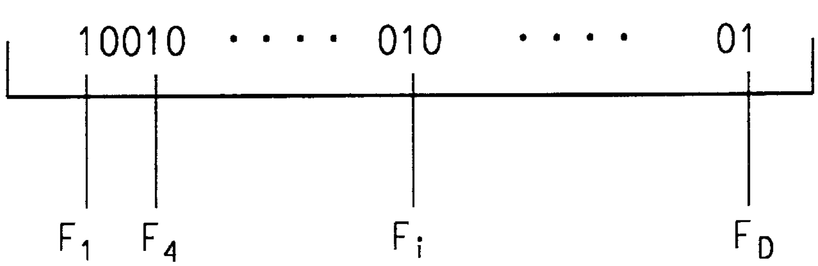
FIG. 4

A definition of informational metrics:

$$D = \{d_1, \ldots\ldots\ldots, d_N\}$$

i. If the data set, D has $d_i < 0$, follow the following steps; if not, skip to ii.

1. Find the $d_{min.}$ number in the D (data set)
2. Subtract $d_{min.}$ from every element of D $$d_i = d_i - d_{min.}$$

ii. $$d_{total} = \sum_{i=1}^{N} d_i$$

$$F = \left\{ \frac{d_i}{d_{total}}, \ldots\ldots, \frac{d_N}{d_{total}} \right\}, \quad f_i = \frac{d_i}{d_{total}}$$

Shannon (1947 -) defines entropy function - generalized by Nishi $$** \; S = \frac{\sum_{i=1}^{N} f_i \log f_i}{\log\left(\frac{1}{N}\right)}$$ (Entropy Function) Normalized to have values between 0 and 1

Nishi ⟶ (denominator $\log\left(\frac{1}{N}\right)$)

---

Example of Uniform Data:

Assume all $d_i = d_o$ $\quad D = \{d_o, \ldots\ldots, d_o\}$ $d_{total} = N\, d_o$ Uniform Data $$f_i = \frac{d_o}{N\, d_o} = \frac{1}{N}, \quad F = \left\{ \frac{1}{N} \ldots\ldots, \frac{1}{N} \right\}$$

$$S_{\text{(entropy)}} = \frac{\sum_{i=1}^{N} \frac{1}{N} \log\left(\frac{1}{N}\right)}{\log\left(\frac{1}{N}\right)} = 1!$$

---

Example of Highly Non-Uniform Data

Only one $d_i > 0$ which we'll call $d_o$

All other $d_i$'s $= 0$ $D = \{d_o, 0, 0 \ldots\ldots\}$ $F = \{1, 0, \ldots\ldots\}$ $$S = \frac{\log 1}{\log\left(\frac{1}{N}\right)} = 0$$

FIG. 8

B. Local cell entropy ($I_{cell}$)

Example of a 2 output state system.

Here, N = 2 for 2 output state systems, ie. (X, O)

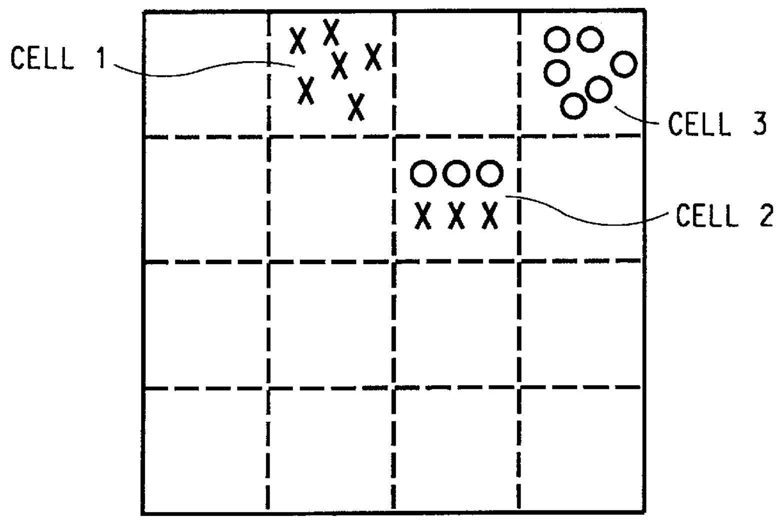

Cell

1. $D = (\overset{X}{7}, \overset{O}{0})$ $d_{total} = 7$ $F = \{1, 0\}$

↓

$S = 0$

* $W = 1 - S$ } $I_{cell}$ $= 1$

Cell

2. $D = \{3, 3\}$ $d_{total} = 6$ $F = \{\frac{1}{2}, \frac{1}{2}\}$

↓

$S = 1$ $W = 0$

C. Global Picture Entropy $$I_{picture} = \frac{\sum_{\text{cells in picture}} (\text{N samples in cell})\, I_{cell}}{\sum_{\text{cells in picture}} (\text{N samples in cell})}$$

* For discrete outputs, use the formula W = 1-S to calculate local cell entropy.

* For continuous outputs, S is the local cell entropy For continuous outputs, S measures the uniformity of the output distribution within a cell.

$I_{cell} = S_{cell}$

FIG. 9

| GENE LIST |
| --- |
| 10001 |
| 10010 |
| 00010 |
| 00001 |
| 11000 |
| 00010 |
| 10011 |
| 01111 |
| 10000 |
| 00011 |

| FEATURE INDEX | COUNT |
| --- | --- |
| 1 | 5 |
| 2 | 2 |
| 3 | 1 |
| 4 | 6 |
| 5 | 5 |

KEY IDEAS IN FRAMEWORK EVOLUTION

1. Start with a set of N models.

2. Create a Prediction Matrix using Framework data subset with M data items.

Prediction Matrix has M rows and N + 1 columns.

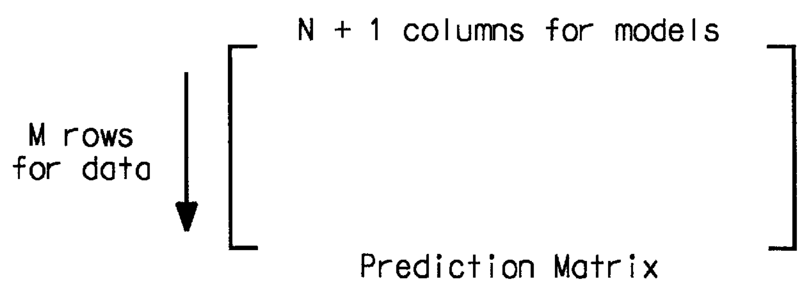

3. Each matrix element in Prediction Matrix has a prediction valve (discrete state prediction for categorical, continuous value for quantitative modeling) for the Framework data subset.

4. The last column of the Prediction Matrix (N + 1th column) contains ACTUAL output values for Framework data subset.

5. The Prediction Matrix is used as the data table used to evolve model combinations.

FIG. 17A

FRAMEWORK EVOLUTION (Continued)

Framework Gene has N bits.

| 1 0 0 . . . 1 0 . . . 1 0 |

↑ each bit refers to a model

So the models are the imput features for framework evolution

* * * *

6. Framework Evolution then proceeds as in Figure 1 for model evolution using the Prediction as the data table and the individual models as inputs.

IMPORTANT NOTE:

In framework evolution, there is no direct accessing of the raw data in the training/test data to evolve the models. The prediction matrix uses the framework data subset to generalize frameworks.

FRAMEWORK = A set of model combinations

FIG. 17B

KEY IDEAS IN SUPER FRAMEWORK EVOLUTION

Same as Framework Evolution but here the Prediction Matrix has N + 1 columns where each of the first N columns refer to a FRAMEWORK.

A super framework gene has N bits where each bit refers to a framework.

Super Framework Evolution then proceeds as in Figure 1 for Model Evolution using the Prediction Matrix as the data table and the individual frameworks as input.

Super Framework = A set of framework combinations

| | | | |
|---|---|---|---|
| Comment: | Distributed | ←→ | Families of Evolutionary "objects" such as Models, Frameworks, Super Frameworks, etc. which are distributed over a large data base. |
| | Hierachical | ←→ | Evolutionary Tree or hierarchy |
| | Evolution | ←→ | Dynamic Process governed by information theory. |

Evolution proceeds down the hierarchy until there is no more information to be gained or we have reached some point of termination.

FIG. 18B

BASIC MOTIVATION:

InfoEvolve™ framework can be used to discover data clusters based on similarity of input features. This is independent of any output state, and is very useful for subdividing large data bases into smaller subsets based on input feature similarity.

HIGHEST LEVEL FLOW DIAGRAM

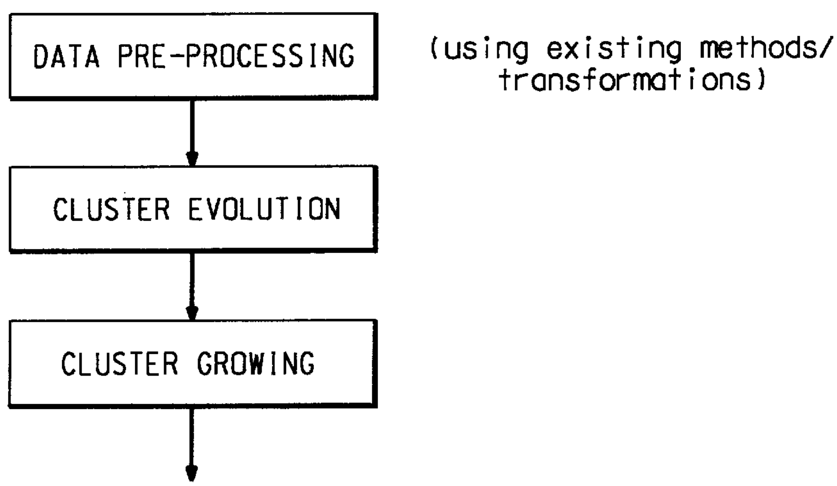

(use modified recursive merge algorithm similar to region growing algorithms in image analysis.)

FIG. 19C

DISTRIBUTED HIERARCHICAL EVOLUTIONARY MODELING AND VISUALIZATION OF EMPIRICAL DATA

This application claims the benefit of Provisional application Ser. No. 60/131,804, filed Apr. 30, 1999.

FIELD OF THE INVENTION

The present invention combines the concepts of pictorial representations of data with concepts from information theory, to create a hierarchy of "objects", e.g., features, models, frameworks, and super-frameworks. This invention relates to a method and a machine readable storage medium of creating an empirical model of a system, based upon previously acquired data, i.e., data representing inputs to the system and corresponding outputs from the system. The model is then used to accurately predict system outputs from subsequently acquired inputs. The method and machine readable storage medium of the invention utilizes an entropy function, which is based upon information theory and the principles of thermodynamics, and the method is particularly suitable for the modeling of complex, multi-dimensional processes. The method of the invention can be used for both categorical modeling, i.e., where the output variable assumes discrete states, or for quantitative modeling, i.e., where the output variable is continuous. The method of the invention identifies the optimum representation of the data set, i.e., the most information-rich representation, in order to reveal the underlying order, or structure, of what outwardly appears to be a disordered system. The use of evolutionary programming is one method of identifying an optimum representation. The method is distinguished by its use of both local and global information measures in characterizing the information content of multi-dimensional feature spaces. Experiments have shown that local information measures dominate the predictive capability of the model. The method can thus be described as a globally influenced, but locally optimized, technique, in contrast to many other methods, which primarily use global optimization over the entire data set.

BACKGROUND OF THE INVENTION

Information Theory

The idea of using an entropy function in order to describe the information content of a system was first introduced by C. E. Shannon in his pioneering work, "A Mathematical Theory of Communication", Bell System Technical Journal, 27, 379–423; 623–656 (1948). Shannon showed that a definition of entropy similar in form to a corresponding definition in statistical mechanics could be used to measure the information gained from the selection of a specific event among an ensemble of possible events. Shannon's entropy function can be represented as:

$$H(p_1, p_2 \ldots p_n) = \sum_{k=1}^{n} p_k \ln p_k$$

where $p_k$ represents the probability of occurrence for the k'th event, and uniquely satisfies the following three conditions:

1. $H(p_1, \ldots, p_n)$ is a maximum for $p_k=1/n$ for $k=1, \ldots, n$. This implies that a uniform probability distribution possesses the maximum entropy. In addition, $H_{max}(1/n, 1/n, \ldots, 1/n)$=In n. Therefore, the entropy of a uniform probability distribution scales logarithmically with the number of possible states;
2. $H(AB)=H(A)+H_A(B)$ where A and B are two finite schemes. H(AB) represents the total entropy of schemes A and B and $H_A(B)$ is the conditional entropy of scheme B given scheme A. When the two scheme distributions are mutually independent, $H_A(B)$ H(B);
3. $H(p_1, p_2, \ldots, p_n, 0)=H(p_1, p_2, \ldots, p_n)$. Any event with zero probability of occurrence in a scheme does not change the entropy function.

Shannon's work was directed to describing the information content of one-dimensional electrical signals. In his book *Physics from Fisher Information: A Unification*, Cambridge University Press, 1998, Roy Friedan describes the "Shannon entropy" as a global information measure across an entire data set. An alternative informational measure, known as "Fisher entropy", is also described by Friedan as a measurement of local information across a data set. For mathematical modeling, Friedan has recently shown that Fisher entropy is particularly well suited to discover physical laws.

More recently, T. Nishi has used the Shannon entropy function to define a normalized "informational entropy" function, which can be applied to any data set. See: Hayashi, T. and Nishi, T., "Morphology and Physical Properties of Polymer Alloys", Proceedings of the International Conference on 'Mechanical Behaviour of Materials VI', Kyoto, 325, 1991. See also: Hayashi, T., Watanabe, A., Tanaka, H., and Nishi, T., "Morphology and Physical Properties of Three-Component Incompatible Polymer Alloys", Kobunshi Ronbunshu, 49 (4), 373–82, 1992.

Nishi's definition can be summarized as follows: Consider a data set $D=\{d_1, \ldots, d_n\}$ with n data elements. If the sum of all the elements $d_{tot}$ is defined as $$d_{tot} = \sum_{i=1}^{n} d_i,$$

then $d_{tot}$ can be used to normalize each of the data elements such that $$f_i = d_i/d_{tot} \forall i \in \{1, \ldots, n\}.$$

It is then possible to define an informational entropy function, E:

$$E = \left(\sum_i f_i \ln f_i\right) \Big/ \ln(1/n).$$

The entropy function E has the useful property that it is normalized between 0 and 1. A perfectly uniform distribution, where $f_i=1/n$ results in an E value of 1. As the distribution becomes less uniform, the value of E drops and asymptotically approaches zero. A significant advantage of the Nishi informational entropy function E is that it characterizes the uniformity of any distribution regardless of the shape of the distribution. In contrast, the commonly used "standard deviation" is usually interpreted in standard statistics only for Gaussian distributions.

Prior art methods, such as neural networks, statistical regression, and decision tree methods, have certain inherent limitations. Although neural networks and other statistical regression methods have been used for categorical modeling, they are much better suited and perform better for quantitative modeling, due to the continuous non-linear sigmoid function used within the nodes of the network. Decision trees are best suited for categorical modeling, due to their inability to perform accurate quantitative predictions on continuous output values.

SUMMARY OF THE INVENTION

The present invention generalizes the concepts of information entropy, extending those concepts to multidimensional data sets. In particular the quantification of information entropy set forth by Shannon is modified and applied to data obtained from systems having one or more inputs, or features, and one or more outputs. The entropy quantification is performed to identify various subsets of data inputs, or feature subsets, that are information-rich and thus may be useful in predicting the system output(s). The entropy quantification also identifies regions, or cells, within the various feature subsets that are information-rich. The cells are defined in the feature subspaces using a fixed or adaptive binning process.

The input combinations, or feature combinations, define a feature subspace. The feature subspaces are represented by binary bit strings, and are referred to herein as genes. The genes indicate which inputs are present in a particular subspace, and hence the dimensionality of a particular subspace is determined by the number of "1" bits in the gene sequence. The information-richness of all feature subspaces may be searched exhaustively to identify those genes corresponding to subspaces having desirable information properties.

Note that if the total number of possible subspaces is small, an exhaustive search may be the preferred method of identifying the most information-rich subspaces. In many instances, however, the number of possible subspaces is large enough that exhaustively searching all possible subspaces is computationally impractical. In those situations, the subspaces are preferably searched using a genetic algorithm to manipulate the gene sequences. That is, the genes are combined and/or selectively mutated to evolve a set of feature subspaces having desirable information properties. In particular, the fitness function for the genetic feature subspace evolution process is a measure of the information entropy for the feature subspace represented by that particular gene. Other measures of information content measure the uniformity of the subspaces with respect to the output(s). These measures include variance, standard deviation, or a heuristic such as the number of cells (or percentage of cells) having a specified output-dependent probability above a certain threshold. These informational measures may be used to identify genes, or subspaces, having desirable information properties, i.e., high informational content. In addition, decision tree-based methods may also be used. Note that these alternative methods may also be used to identify desirable subspaces when performing exhaustive searches.

In a preferred embodiment, the feature subspace entropy, referred to herein as global entropy, is preferably determined by calculating a weighted average of the entropy measurements of the cells within the subspace. An output-specific entropy measurement may also be used. Cell entropy is referred to herein as local entropy, and is calculated using a modified Nishi entropy calculation.

An empirical model is then created in a hierarchical manner by examining combinations of feature subspaces that have been determined to contain high information content. The feature subspaces may be selected and combined into models using exhaustive search techniques to find combinations of feature subspaces that provide highly accurate predictions utilizing test data (sample input data points having known corresponding outputs). The models may also be evolved using a genetic algorithm. In this case, the model genes specify which feature subspaces are utilized, and the length of the model gene is determined by the number of feature subspaces previously identified as having desirable informational properties. The fitness function used in the model evolutionary process is preferably the prediction accuracy of the particular model under consideration.

In accordance with one aspect of the invention, a method of creating an empirical model of a system, based upon previously acquired data representing corresponding inputs and outputs to the system, to accurately predict system outputs from subsequently acquired inputs is provided. The method comprising the steps of:

(a) acquiring a data set from a number of inputs to the system and corresponding outputs from the system;

(b) grouping the previously acquired data set into at least one training data set, at least one test data set, and at least one verification data set, where the sets may be identical to each other, or may be exclusive or non-exclusive subsets of the previously acquired data;

(c) determining a plurality of feature subspaces having high global entropic weights by:

(i) selecting a plurality of inputs defining a feature subspace from said training data set, (ii) dividing the feature subspace into cells by dividing the range of each input into subranges, either by fixed or adaptive quantization methods, (iii) determining the global entropic weights, either by forming a weighted average of local cellular entropic weights or a weighted average of output-specific entropic weights (using, e.g., the modified Nishi information content);

(d) optionally, examining the frequency of occurrence of each input in the determined feature subspaces having high entropic weights, and retaining only those inputs occurring most frequently to define a reduced-dimensionality data set, and thereafter repeating step (c);

(e) optionally, exhaustively searching over a plurality of the dimensions (e.g., some or all of the dimensions) of the reduced-dimensionality data set under a plurality of quantization conditions to determine an optimum or near-optimum dimensionality and an optimum or near-optimum quantization condition that most accurately predicts system outputs from system inputs to define a reduced-dimensionality feature data set;

(f) determining a combination of the determined feature subsets having high global entropic weights (e.g., either a fraction of, or the entire, feature data set) that most accurately predicts system outputs from system inputs on said data set;

(g) determining a subset of the reduced-dimensionality feature data set (e.g., either a fraction of or the entire reduced-dimensionality feature data set) that more accurately predicts system outputs from system inputs on a test data set.

For large data sets, the model creating steps (b)–(g) may then be repeated on different training and test data sets to find a group of optimum models. This group of optimum models can be "polled" on new data to develop one or more predictions resulting from those models. These predictions can be based, for example, on a winner-takes-all voting rule. A subset of the group of optimum models that most accurately predicts system outputs from system inputs may then be determined as follows. The inputs of the test data set are submitted to each model of a selected subset group of models (which may be randomly selected) and each subset-predicted output is compared with each test data output. The step of calculating the subset-predicted output is performed in a manner similar to (b)–(e) (or optionally (b)–(g)), where a new training and test data set is created using individual model output predicted values as inputs and actual output values as the outputs. This step may be repeated for multiple selected subset groups of models. The selected subset groups of models are then evolved to find an optimum subset group of models that most accurately predicts system outputs from system inputs to define a "framework".

The framework creating steps may further be repeated, in a manner similar to the model creating steps, to find a group of optimum frameworks. This group of optimum frameworks can be "polled" on new data to develop one or more predictions resulting from those frameworks. These predictions can be based, for example, on a winner-takes-all voting rule. A subset of the group of optimum frameworks that most accurately predicts system outputs from system inputs may then be determined as follows. The inputs of the test data set are applied to each framework of the selected subset group of frameworks and each framework subset-predicted output is compared with each test data output. The step of calculating the subset-predicted output is performed in a manner similar to (b)–(g), where a new training and test data set is created using individual model framework-predicted values as inputs and actual output values as the outputs. This step may be repeated for multiple selected subset groups of frameworks. The selected subset groups of frameworks are then evolved to find an optimum subset group of frameworks, which is referred to as a "super-framework", that most accurately predicts system outputs from system inputs.

The optimum model determination steps, the optimum framework determination steps, or the optimum super-framework determination steps may be repeated until a predetermined stopping condition has been achieved. The stopping condition may be defined as, for example: 1) achievement of predetermined prediction accuracy from the polling of a family of evolutionary objects; or 2) when the incremental improvement in prediction accuracy drops below a predetermined threshold; or 3) when no further improvement in prediction accuracy is achieved.

Distributed hierarchical evolution is an evolutionary process in which groups of successively more complex interacting evolutionary "objects", such as models, frameworks, super-frameworks, etc. are created to model and understand progressively larger amounts of complex data.

BRIEF DESCRIPTION OF THE DRAWINGS

FIG. 3C shows a three-dimensional feature subspace;

FIG. 4 shows an exemplary binary bit string representing which inputs are included in a feature subspace;

FIG. 8 illustrates calculating local and global information content;

FIG. 9 shows an example of local entropy parameter and global entropy parameter;

FIGS. 17A and 17B comprise a block diagram illustrating a method for framework evolution;

FIG. 18B is a list of considerations for super-framework evolution;

FIG. 19C is a block diagram illustrating a method for discovering data clusters;

DETAILED DESCRIPTION OF THE INVENTION

Figure 1:
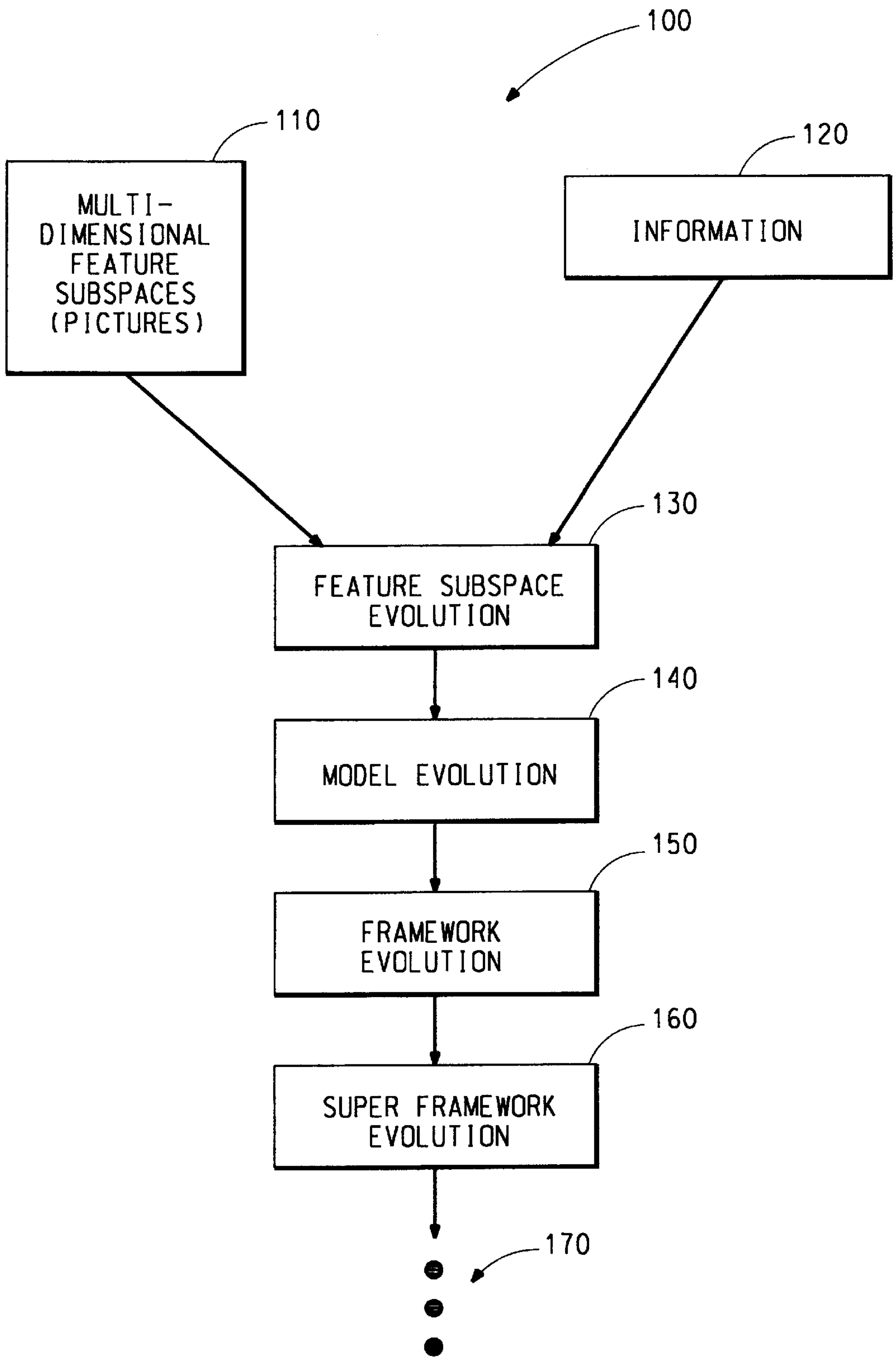
FIG. 1 is a block diagram illustrating the overall flow of the method.

FIG. 1 is a block diagram illustrating the overall flow of the method 100 of the present invention. As may be appreciated from this figure, an evolutionary process is used to create a model of a complex system from empirical data. The preferred method combines multidimensional representations of data 110 with information theory 120, to create an extensible hierarchy of "evolutionary objects", e.g., features 130, models 140, frameworks 150, and super-frameworks 160, etc. The process can be continued to generate further combinations in a hierarchical manner as indicated at 170.

First, combinations of inputs, also referred to as feature subspaces, are identified by exhaustive search or by an evolutionary process from an initial randomly selected feature subspace pool. Optimum combinations of feature subspaces are then searched or evolved to create models, optimum combinations of models are further searched or evolved to create frameworks, and optimum combinations of frameworks are further searched or evolved to create super-frameworks etc. The successive evolution of more complex evolutionary objects described above continues until a predetermined stopping condition, for example, a predetermined model performance, has been achieved. As a rule, the larger the data set, the more of these objects are created, so that the complexity of the empirical model reflects the complexity of the interactions of the inputs with the outputs of the system from which the data was acquired.

In developing the method described herein, several design criteria have been considered. It is necessary for the method to deal successfully with data spaces having arbitrary, nonlinear structures. It is also desirable that the method not distinguish between the "forward" problem of predicting outputs knowing inputs and the "inverse" problem of predicting inputs knowing outputs, thereby placing the problems of data modeling and control on the same footing. This implies that only minimal additional model geometry is superposed on the data set itself. The term "geometry" includes both linear and nonlinear manifolds, such as introduced in regression techniques. The symmetry implied here also has the advantage of identifying the most information-rich inputs or combinations of inputs for the modeling task at hand. This knowledge can be used to develop optimum strategies for decision making and planning. Finally, the method needs to be computationally tractable, so that it can in fact be implemented conveniently. In order to meet these design goals, several existing linear and nonlinear methods have been carefully analyzed and common themes abstracted out with the goal of identifying fundamental limitations and opportunities.

The discussion that follows will begin with a description of the basic method of the evolution of a single model using concepts from information theory and evolution. Further extensions of the method to address the successive hierarchical evolution of successively more complex objects to explain larger, more complex data sets is then described. The application of the underlying principles of the method to discover input feature clusters even in the absence of data outputs is then discussed, followed by a description of a method to perform "information visualization" in multi-dimensional data spaces. The combination of the method of the present invention with other modeling paradigms such as neural networks to create hybrid modeling schemes is then detailed. The description concludes with a new approach to discovering physical laws using the data modeling approach of the method of the present invention coupled with the field of genetic programming.

As a point of interest, it is worth noting that fundamental ideas from information theory provide the core tools required to solve all these problems, providing the method with a simple, unifying kernel. The concept of entropy provides a quantitative measure of order (or disorder) in a data space. This measure can be used as the fitness function for an evolutionary engine to drive the emergence of order from initially disordered systems. In this sense, information theory provides the driver and evolutionary programming provides the engine for systematizing the process of discovery. Finally, the paradigm described in the method of the present invention is data driven because the information content in the data itself is used for prediction. The method thus falls squarely in the field of empirical modeling as opposed to the field of mathematical modeling with its inherent constraints of the underlying mathematics.

Data Modeling:

A framework based on the concepts of informational entropy has been applied towards the problem of data modeling where either single or multiple output(s) need to be predicted given a set of inputs. The basic method consists of the following steps:

1. Data representation or data preprocessing.
2. Data quantization using fixed or adaptive methods to define cell boundaries.
3. Feature combination selection using genetic evolution and informational entropy.
4. Determining a subset of the feature data set that most accurately predicts system outputs from system inputs.

1. Data Representation

In a typical empirically derived data set, several "measurement" inputs and outputs are provided. Each system input and system output is sampled or otherwise measured to obtain input and output sequences of data values, referred to herein as data points. The goal is to extract the maximum information from the data point inputs in order to predict the data point outputs most accurately. In many real systems, the data points, or actual measured inputs, may be sufficiently "information-rich" for them to remain as suitable representations of the data. In other cases, this may not be so and it may be necessary to transform the data in order to create more suitable "eigenvectors" by which to represent the data. Commonly used transformations include singular value decomposition (SVD), principal component analysis (PCA) and the partial least squares (PLS) method.

The principal component "eigenvectors" which have the largest corresponding "eigenvalues" are usually used as inputs for the data modeling step. There are two significant limitations to the principal component selection method:

a. The principal component method only deals with the variance of the inputs and does not encode any information regarding the outputs. In many modeling problems, it is the eigenvectors that may have relatively low eigenvalues that contain the most information with respect to the output property being modeled.

b. The PCA method performs linear transformations of the inputs. This may not be the optimum transformation for all problems, especially those where the input-output relationships are highly non-linear.

In the preferred embodiment of the method described herein, the inputs, the combinations of which are also known as "input features", are not transformed initially. If the subsequent input data sets do not reveal sufficient information regarding the outputs that need to be modeled, then data transformations such as those described above may be performed. The primary reason for employing this strategy is to use actual data, wherever possible, rather than imposing an additional geometry in the form of a transformation. The form that this additional geometry takes may be unknown. In addition, avoiding the data transformation step avoids computational overhead of the transformation step and thus improves computational efficiency, especially for very large data sets.

Even though the actual data is preferably used without transformation, the dimensionality may still be reduced by identifying and selecting inputs, or features, that are more information-rich than other inputs. This may be =particularly desirable when the number of inputs is very large and it may be impractical to use all the possible features in the final model. The "dimension" of the data set may be defined as the total number of inputs. Prior to developing an empirical model, the most information-rich features are preferably identified for the modeling task at hand. One technique to reduce the number of inputs, or reduce the dimensionality of the problem, is to eliminate inputs having little informational content. This may be done by examining the correlation of an input and the corresponding output. Preferably, however, the dimensionality reduction is performed by examining each input's frequency of occurrence in feature combinations that have been determined to be information-rich, as discussed below. The less-frequently-occurring inputs may then be excluded in the model generation process.

For time varying or dynamical systems, an additional complication may result from the fact that an output at any given time may also depend on both inputs and outputs at earlier times. In such systems, the correct representation of the data set is very important. If the inputs corresponding to an output measured at a particular time are also measured only at that time, the information contained in the time lags (i.e., the period of time between an input occurrence and the resulting output occurrence) will be lost. To alleviate this problem, a data table consisting of an expanded set of inputs can be constructed where the expanded set of inputs consists of the current set of inputs as well as inputs and outputs at multiple prior times. This new data table can then be analyzed for information-rich input combinations spanning a selected time horizon.

An important issue in the creation of the expanded data table is knowing how far to go back in time. In many cases, this is not known a priori, and by including too long an earlier time interval (time span), the dimensionality of the data table can become very large. In order to deal with this issue, multiple smaller time-spanning data tables can be constructed from the original data table, with each data table consisting of a given time interval in the past. The time intervals spanned by each of these newer data tables maybe overlapping, contiguous or disjoint. The most information-rich inputs from each of these smaller data tables can then be collected and combined to create a hybrid data table which include selected inputs and outputs from the smaller data tables. This final hybrid table can then be used as the inputs to the data modeling process, as potential interactions across the time intervals are now included.

For example, if one wants to investigate whether home sales rates affect commodity lumber prices, but there is a suspected time lag of about two months, the data table requires matched inputs and outputs where the inputs precede the outputs by two months for the present invention to discover this time lag. This can be done by forming one or more data tables (i.e., columns are inputs and outputs and rows are consecutive times) where the various inputs have different time lags with respect to a single output to discover what the actual time lag is. Specifically, a single output may be the price of lumber on day X. The inputs are then home sales rates on day X, day X−1, day X−2 . . . through day X−120 as well as outputs from day X−1, X−2 . . . through X−120. To ensure that the earliest-time inputs having high information content are not missed, a time interval longer than the suspected time lag between inputs and corresponding outputs is selected. Then the next table row has the output equal to the price of lumber on day Y (for example X+1 or some later date), and the inputs are home sales rates on Y, Y-1, Y−2 . . . Y−120, as well as outputs from day Y−1, Y−2 . . . through Y−120 . . . . Then the system will identify the proper time lag by identifying the combination of inputs that affect the output.

2. Data Quantization and Cell Boundaries Within a Feature Subspace

Once a proper data representation has been established, a data "quantization" step is performed on each input used to characterize a sample point. Two quantization methods may be used to divide the range of values of an input into subranges, i.e., dividing into bins, also known in the art as "binning". The binning is performed on each input of a given feature subspace, where each input corresponds to a dimension of the subspace, which results in the given feature subspace being divided into cellular regions.

The simplest quantization method is based on fixed-sized subranges, or bin widths (sometimes known as "fixed binning") where the entire range of values associated with each input is divided into equally-spaced, or equally-sized, subranges or bins.

Figure 2A:
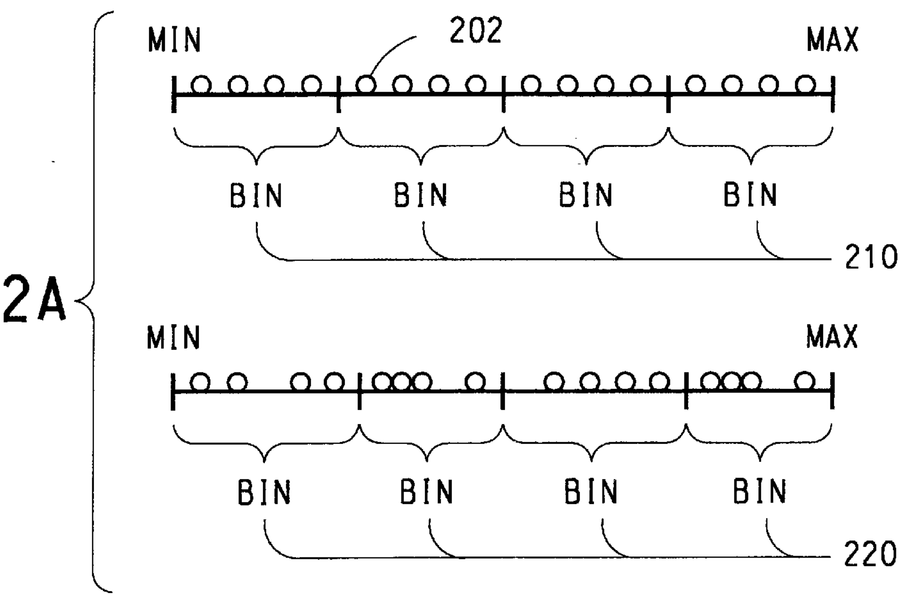
FIGS. 2A and 2B show examples of adaptive binning.
Figure 2B:
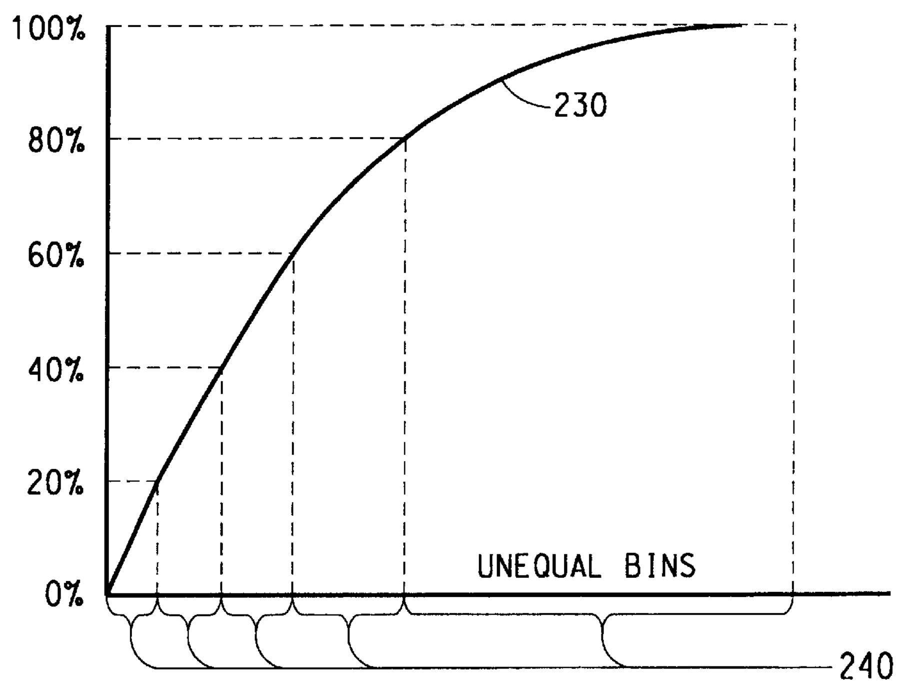

Another quantization method, referred to herein as "adaptive quantization", best seen in FIG. 2A, which might also be called "statistical quantization", is based on dividing the range of values into unequally sized subranges. If the data is uniformly distributed as shown by data bins 210, the bin sizes will be more or less equal. However, when the data distribution is clustered, the bin sizes are adaptively adjusted so that each bin contains a nearly equal number of data points, as shown by bins 220. As seen in FIG. 2B, the size of each subrange, or bin, may be related to the cumulative probability distribution 230 (or histogram) of each input by dividing the input range into equal percentile subranges and projecting those percentiles onto the range of feature values to create the bins 240.

In this way, global information on each input is used to adaptively quantize the data on that input. In this method each input is separately quantized, that is, quantization is performed on an input by input basis. It should be noted that the subrange or bin sizes (widths) are generally non-uniform within a given input, reflecting the shape of the cumulative probability distribution of that input. The sizes of the subranges may also vary from input to input. Adaptive quantization (adaptive binning) reduces the possibility of having an empty input subrange which contain no information, which might otherwise result in informational gaps in the resulting model.

The size of the subranges, or bins, for a given input may also vary from subspace to subspace. That is, certain inputs may have a finer resolution binning when they appear in lower-dimensioned subspaces than when they appear in higher dimensioned subspaces. This is due to the fact that a certain overall cellular resolution (number of points per cell) is desired so that meaningful quantities of data can be grouped, or binned, together in a cell. Because the number of cells is exponentially proportional to the number of dimensions, higher dimensioned feature subspace utilize coarser binning for individual inputs so as to maintain the desired average number of points per cell. Data quantization has significant implications for the robustness of a modeling method since the magnitude of the deviation of outlier points from the rest of the data is suppressed during the quantization (binning) process. For example, if an input value exceeds the upper limit in the highest subrange (bin), it gets quantized (binned) into that subrange (bin) regardless of its value.

As used herein a "feature subspace" is defined as a combination of one or more inputs. A pictorial representation of a feature subspace may be created, which is also referred to herein as simply a "subspace". The subspace is preferably divided into a plurality of "cells", the cells being defined by combinations of subranges of the inputs that comprise the feature subspace. In a preferred embodiment, data quantization can be further specified either by defining the number of subranges (bins) per input (using either fixed or adaptive methods previously described) or, alternatively, by defining the mean number of data points per cell in the feature. This may be viewed as a multidimensional extension of the adaptive quantization method.

Figure 3A:
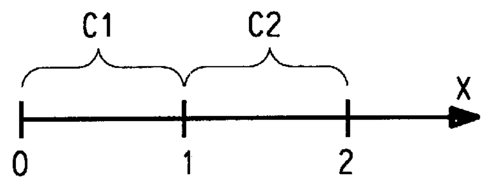
FIG. 3A shows a one-dimensional feature subspace.
Figure 3B:
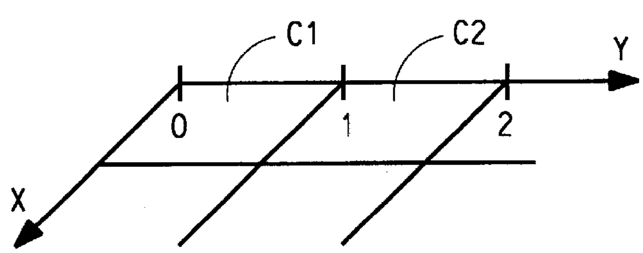
FIG. 3B shows a two-dimensional feature subspace.

With reference to FIGS. 3A, 3B, and 3C, fixed-sized binning is shown in one, two, and three dimensional feature subspaces, respectively. The data set consists of four data points, DP1–DP4, each having four inputs, or features. The data set is the same for all three figures. The data points fall into a particular cell depending upon which feature (or feature combination) is selected. In FIG. 3A, if the one-dimensional subspace represents the third input (designated 0010—with the first input corresponding to the left-most bit), DP1 and DP4 fall into cell C1 (DP1=0.5, DP4=0.3), and DP2 and DP3 fall into cell C2 (DP2=1.2, DP3=1.7). If however, the one-dimensional subspace is taken to be the second input (0100) then DP2 and DP4 fall into C1 (DP2=0.7, DP4=0.4), and DP1 And DP3 fall into cell C2 (DP1=1.5, DP3=1.9).

In FIG. 3B, if the subspace is specified by the first and second inputs (1100), DP1 falls into cell C2 (DP1=(0.5, 1.5)), yet falls into cell C2 in the subspace generated by the first and third inputs (1010). In FIG. 3C, DP1 falls in cell C1 in the subspace defined by the first, third and fourth inputs (1011) and cell C2 in the subspace defined by the first, second and fourth inputs (1101).

It is desirable to identify feature combinations that have some accuracy in predicting an output of the system based on the inputs. It can be seen from the above examples that the particular input combinations, or feature combinations, define many unique subspaces. The number of subspaces is of course finite, assuming a finite number of input sequences, but the number grows quite rapidly with the number of inputs.

The task of feature selection is complicated by the possibility of input-input interactions. If such interactions are present, individually information-poor inputs could combine in complementary ways to produce combinations of inputs with high informational entropy. Thus, any feature selection method that ignores the possibility of input-input interactions could potentially exclude useful inputs from the modeling process. To avoid these limitations, the preferred method utilizes an information theory based approach to select feature subspaces that inherently includes input-input relationships and also deals very naturally with any non-linearities which may be present in the data.

In addition, while the method may include exhaustively searching the available subspaces, it preferably includes a genetic evolutionary algorithm that utilizes a measure of information entropy as a fitness function.

3. Feature Subspace Selection Using Genetic Evolution and Informational Entropy

The method described herein preferably uses a relatively recent algorithmic approach known as "genetic algorithms." As formulated by John H. Holland, (in "Adaptation in Natural and Artificial Systems", Ann Arbor: the University of Michigan Press (1975)) and also described by D. E. Goldberg, (in "Genetic Algorithms in Search, Optimization and Machine Learning", Addison-Wesley Publishing Company (1989)) and by M. Mitchell (in "An Introduction to Genetic Algorithms", M. I. T. Press (1997)), the approach is a powerful, general way of solving optimization problems. The genetic algorithm approach is as follows:

(a) Encode the solution space of the problem as a population of N-bit strings. A popular encoding framework is based on binary strings. The collection of the bit strings is called a "gene pool" and an individual bit string may be called a "gene".

(b) Define a "fitness function" which measures the fitness of any bit string relative to the problem at hand. In other words, the fitness function measures the goodness (or accuracy) of any possible solution.

(c) Initially start off with a random gene pool of bit strings. By using ideas derived from genetics, such as selective recombination and mutation, through which the more "fit" bit strings preferentially mate to produce a new pool of "fitter" offspring, subsequent generations of fitter bit strings can evolve. "Fitness" is determined by a measure of information entropy. The role of mutation is to expand the search space of possible solutions, which creates an improved degree of robustness.

(d) After several generations of evolution following the prescription above, a pool of fitter bit strings will result. An optimum solution can be selected as the "fittest" bit string in this pool.

Each of these aspects are discussed in further detail below:

a. Encoding Solution as a Population of N-Bit Strings

A first step in using a genetic algorithm to solve an optimization problem is to represent the problem in a way that results in solutions that can be represented as bit strings. A simple example is a data base with 4 inputs and 1 output. The various combinations of inputs can be represented by 4 bit binary strings. The bit string 1111 would represent an input combination, or feature subspace, where all inputs are included in the combination. The left most bit refers to Input A, the second left most bit to Input B, the third left bit to Input C and the rightmost bit to Input D. If a bit is turned on to the value 1, it means that the corresponding feature should be included in the combination. Conversely, if a bit is turned off to the value 0, it means that the corresponding feature should be excluded in the combination.

Similarly, the bit string 1000 would represent an input combination where only Feature A is included and all other inputs are excluded. In this way, every possible input combination out of the 16 total possibilities can be represented by a 4 bit binary string. In general, if there are N inputs in the database being modeled, all possible input combinations can be expressed using a N bit binary string. A sample binary bit string representing a four-dimensional feature subspace is shown in FIG. 4. The bit string of FIG. 4 has D bits, only four of which are "1" bits. The "1" bits correspond to the four features $F_1$, $F_4$, $F_i$, and $F_D$. The variables i and D are used to represent a generalized case. Further examples are shown in FIG. 3A, where a four-bit string, representing a four-input system, having a single "1" bit codes to a one dimensional feature subspace. Two "1" bits code to a two-dimensional subspace as seen in FIG. 3B, and three "1" bits code to a three dimensional subspace as seen in FIG. 3C.

b. Defining a Fitness Function to Measure the Fitness of a Bit String

In order to evolve the optimum bit string as the solution to an optimization problem, it is necessary to define a metric used to drive the evolutionary process. This metric is referred to as a fitness function in a genetic algorithm. It is a measure of how well a given bit string solves the problem at hand. Defining an appropriate fitness function is a critical step in ensuring that the bit strings are evolving towards better solutions.

In the above example, each 4 bit binary string encodes a possible combination of inputs. An input feature subspace can be constructed by using the input features that are turned on in the corresponding bit string. The data in the data base can then be projected into this feature subspace. The fitness function provides a measure of information-richness by examining the distribution of output states over the input feature subspace. If the output states are highly clustered and separated over this subspace, the fitness function should result in a high value as the corresponding input feature combination is doing a good job in segregating the different output states. Conversely, if all the output states are randomly distributed over the subspace, the fitness function should result in a low value as the corresponding input feature combination is doing a poor job in segregating the different output states. Alternatively, the fitness function may provide a measure of the information-richness of the subspace by examining the informational richness of individual cells within the subspace and then forming a weighted average of the cells.

Preferably, a global measure of output state clustering is used as the fitness function to drive the evolution of the best bit strings. This measure is preferably based on an entropy function that is a powerful way to define clustering. With this entropic definition of a fitness function, bit strings that represent input combinations that best cluster and separate the output states emerge from the evolutionary process. Alternative fitness functions include the standard deviation or variance of output state probabilities, or a value representing the number of cells in a subspace where at least one output probability is significantly larger than other output probabilities. Other similar heuristics, or ad hoc rules, that measure the concentration of output states, are easily substituted in the evolutionary process.

c. Details of the Evolutionary Process

1. Creation of a Random Pool of N Bit Binary Strings

Figure 5A:
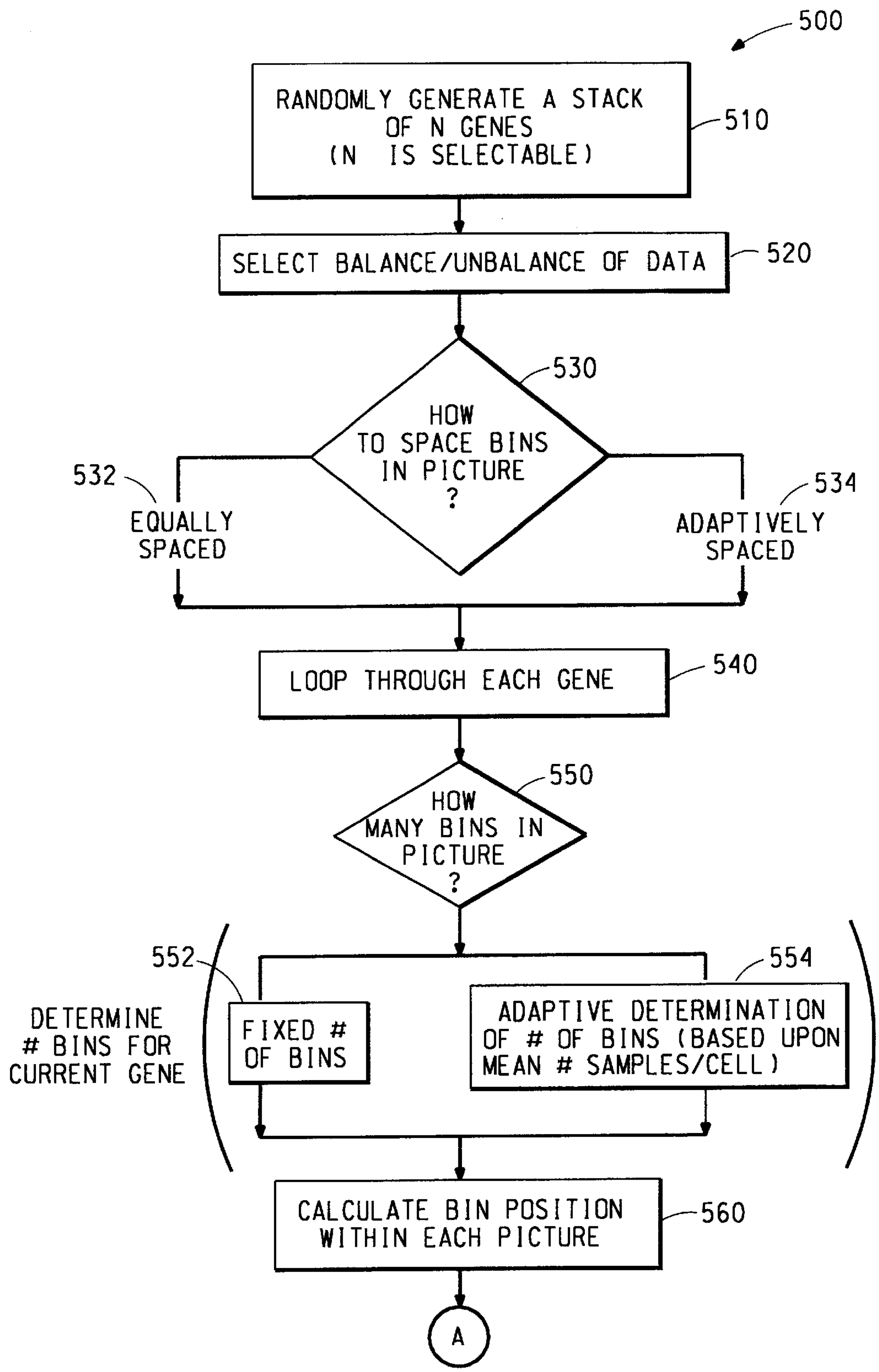
FIGS. 5A and 5B is a block diagram illustrating evolution of "information-rich" input features.

With reference to FIG. 5A, the evolutionary process 500 begins with step 510, where a random pool of N bit binary strings is created. These initial binary strings encode input feature combinations that in general will have very low values for their fitness functions since there is no a priori reason that they are optimum in any way. This initial pool is used to initiate the evolutionary process.

2. Calculation of Fitness

The fitness of each binary string in the pool is calculated using the methods described in step (b). The data may be balanced as shown in step 520. A feature subspace is generated for each binary string, and the data in the database is projected into the corresponding subspace. The subspaces are divided into bins according to the selection of equally spaced binning 532 or adaptively spaced binning 534, depending on the selection made at step 530. The particular gene under consideration is selected at step 540, and the number of bins is determined by specifying a fixed number of bins 552 or by specifying a mean number of samples per cell 554, preferably by user input, at step 550. The bin locations are then determined as shown in step 560. An entropy function or other rule is then used to calculate the degree of clustering and separation of the output states that represents the fitness of the corresponding binary string. This is shown by step 570, where the data points are located within each subspace, and step 580 where the global information content is determined. As shown by step 585, the next gene sequence is acted on beginning at step 540.

3. Creation of a Weighted Roulette Wheel of Fitnesses

Figure 5B:
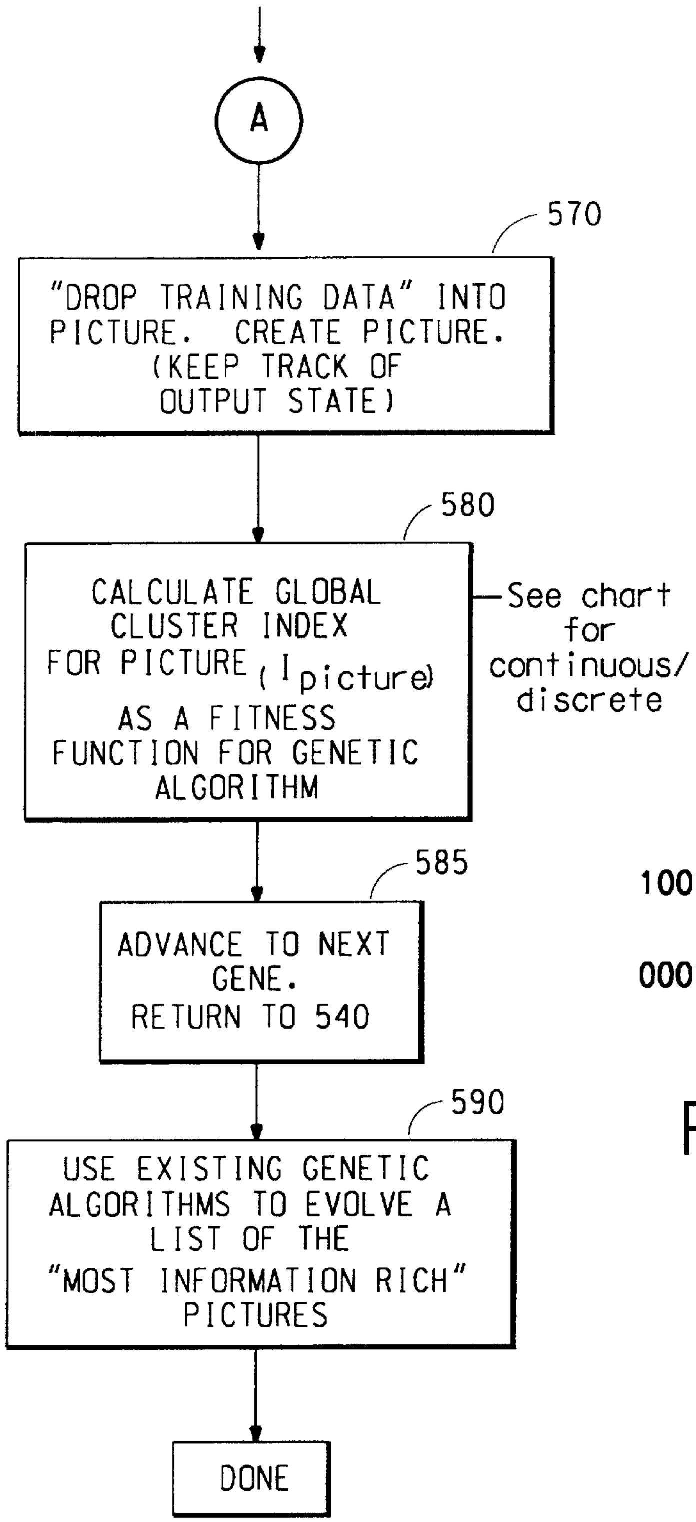
Figure 5C:
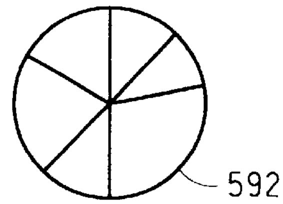
FIG. 5C shows a weighted roulette wheel of binary string fitness.

After the fitness of each binary string has been calculated, a weighted roulette wheel 592 of the fitnesses is created as shown in FIG. 5C. This can be considered as a step where the binary strings with higher fitness values are associated with proportionately wider slot widths than binary strings with a lower fitness values. This will weight the selection of the higher fitness binary strings more heavily than the lower fitness binary strings as the roulette wheel is spun. This step is described in further detail below.

4. Selection of New Parent Binary Strings

The roulette wheel 592 is then spun and the binary string corresponding to the slot where the wheel ends up is selected. If there are N binary strings in the original pool, the wheel 592 is spun N times to select N new parent strings. The important point here is that the same binary string can be chosen more than once if it has a high fitness value. Conversely, it is possible that a binary string with a low fitness function is never selected as a parent although it is not ruled out completely. The N parents are then paired off into N/2 pairs as a precursor to generating new child binary strings.

5. Parent Crossover and Mutation to Create Child Strings

Figure 5D:
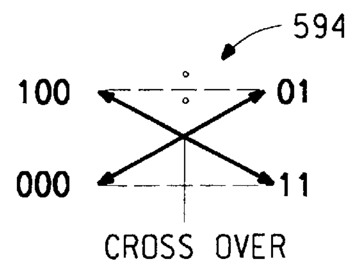
FIG. 5D shows a crossover operation diagram.

Once two parents have been chosen, a weighted coin is flipped to decide whether or not a crossover operation 594, shown in FIG. 5D, should be performed. If this results in a crossover operation, a crossing site is randomly selected between bit position 1 and the last possible crossing site which is the next to last bit position in the string. The crossing site splits each parent into a right side and a left side. Two child strings are created by concatenating the left side of each parent with the right side of the other parent, as shown in FIG. 5D, where the parent genes 10001 and 00011 are split into left halves 100 and 000, and right halves 01 and 11, and then combined to form 10011 and 00011. Finally, after the two child strings have been created, a small number of individual bits in the child strings are randomly reversed (or mutated) to increase the diversity of the child string pool. This can be specified in terms of a probability that a given bit is reversed. The probability of reversal can be scaled based on the number of desired bit mutations and the number of bits in the strings. That is, if an average of five mutations per string is desired, then the probability of a given bit changing is set to 0.05 for one hundred-bit strings and set to 0.1 for fifty-bit strings, etc.

6. Continuing the Evolutionary Process

As shown in step 590, the above steps 2–5 are repeated several times (or generations) using each created child string pool as the new parent pool for the next generation. As the child string pools evolve, their corresponding fitnesses should improve on average since at each generation, fitter strings are preferentially mated to create new child strings.

The evolutionary process can either stop after a predetermined number of generations or when either the highest fitness string or average pool fitness no longer changes.

In using genetic algorithms to solve an optimization problem, there are two significant issues that need to be resolved. The first issue is the encoding scheme. Does the problem lend itself to solutions that can be encoded as bit strings? The second issue is the choice of the fitness function. Since the evolutionary process is governed (i.e., directed) by the fitness function, the quality of the solution is closely dependent upon matching the fitness function to the goal at hand.

In the preferred method described herein, the first issue is resolved by defining a gene comprising an N-bit binary feature bit string, illustrated in FIG. 4, where each bit corresponds to one of N inputs in the data set. Each bit in the N-bit binary feature bit string refers to a corresponding input, and has the value 1 if the corresponding input is present in the feature subspace and has the value 0 if the corresponding input is not present in the feature subspace.

In the preferred method, the second issue is resolved by using informational entropy measures to calculate the global entropy of feature subspaces. The global entropy of the feature subspace is used as the fitness function to drive the evolution of a pool of the fittest feature combinations from which an optimum model can be evolved. The global entropy may be calculated by first determining the local entropy of a cell in a feature subspace and calculating the global entropy of the entire feature subspace as a weighted sum of the local entropies. Alternatively, the global entropy of a subspace may be determined by examining the distribution of points for a given output across the entire subspace, and then forming a weighted average of the state-specific entropies across all states. The ability to maintain a feature subspace pool provides both redundancy and diversity in the solution space, both of which can contribute to robustness in the final model.

Determination of Local Cell Entropy and Global Subspace Entropy

In accordance with an aspect of the preferred method, the level of information content is measured. Specifically, the level of information content of a cell or a subspace is a measure of the uniformity of the data distribution. That is, the more uniform the data, the more predictive value it will have for purposes of modeling a system, and hence, the higher level of information content. The uniformity may be measured in a number of alternative methods. One such method utilizes a clustering parameter. The term clustering parameter refers to a local cell entropy, an output specific entropy calculated over the particular subspace under consideration, or a heuristic method as discussed herein, or other similar method.

Figure 6:
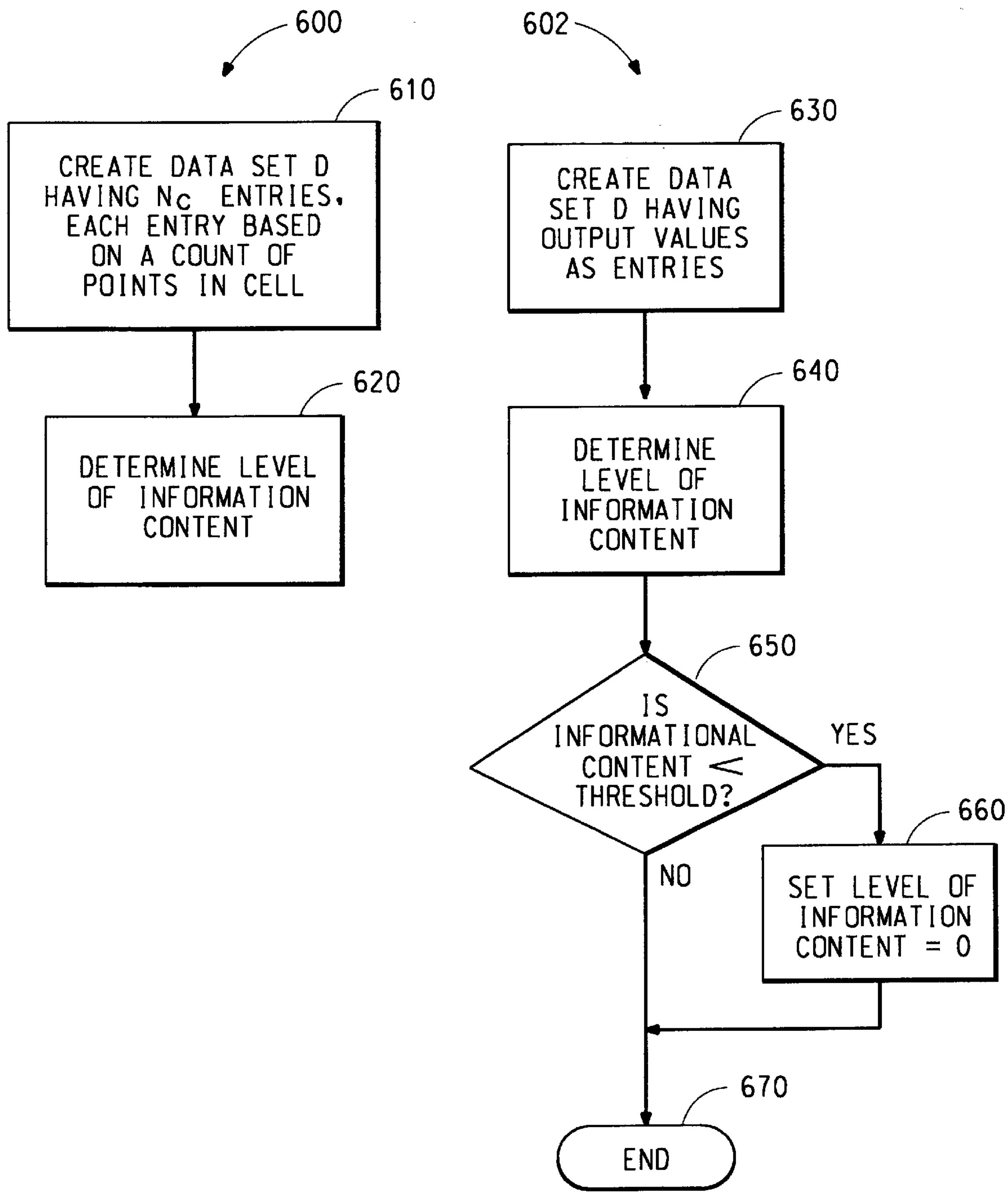
FIG. 6 is a block diagram illustrating a method for calculating local entropy parameter.

With reference to FIG. 6, the informational content of individual cells is determined for categorical output systems as shown by method 600 and for continuous quantitative models by method 602. In the preferred embodiment, the Nishi informational entropy definition discussed earlier is used to mathematically define both local and global entropic weights representing the information content. For the empirical modeling of the present invention, it has been found that Shannon's concept of entropy, as extended by Nishi, is an appropriate measure for the data sets over which the entropic measures are calculated. The Nishi formula is applied to the set of probabilities corresponding to the output states. Cells having equal output probabilities (each output is equally likely) contain little information content. Thus, data sets with high information content will have some probabilities that are higher than others. Greater probabilistic variations reflect the imbalance in the output states, and hence give an indication of the high information-richness of the data set.

In the preferred method, a general entropic weighting term W is defined, having the form W=1−E. The entropic weighting term W is the complement of the Nishi informational entropy function E and has the value 1 for a completely non-uniform distribution, and has the value 0 for a perfectly uniform distribution.

Referring again to method 600 of FIG. 6, the informational level may be determined by calculating a local entropic weighting term. For example, an appropriate for a given cell within a subspace can be defined in the following manner: first, at step 610, a data set having $n_c$ entries is created, where $n_c$ is the number of output states. Each entry corresponds to a state-specific local probability $p_{c|i}$ for cell i given by:

$$p_{c|i} = n_{ci} \Big/ \sum_{k=1}^{n} n_{ki},$$

where $n_{ci}$ is the number of points in cell i having an output state of c, and the summation extends over all the output states k within cell i and thus includes all points in the cell i. For a given cell i, the sequence of values $p_{c|i}$ represents the probabilities of being in the various output states c. At step 620, the informational content of the cell is determined. Preferably, the Nishi informational entropy definition is used to define a local entropic term E for a given cell i in subspace S:

$$E_i^S = \left(\sum_{k=1}^{n_c} f_{k|i}^S \ln f_{k|i}^S\right) \Big/ \ln(1/n),$$

where the variable of summation k is the output state, $n_c$ represents the total number of output states (or "categories"), and $$f_{k|i}^S = p_{c|i}^S \Big/ \sum_{k=1}^{n_c} p_{k|i}^S.$$

Of course, the sum of all $p_{k|i}$ over all k is equal to one, but is included above for clarification.

Finally, also in step 620, the local entropic weighting factor can be expressed as $$W_i^{Ls} = 1 - E_i^S$$

where the superscript Ls designates that W is a local entropic function for a cell in subspace S. Cells with high informational content will have a high local entropic weight. That is, they will have a high value of $W_i^{Ls}$.

Alternatively, the informational content may be measured by another measure of uniformity, such as by determining the variance or standard deviation of the output probability values, or by determining whether any single output has an associated probability above a predefined threshold. For example, one may assign a value to a cell based on the cell's probability distribution. In particular, a cell having any output state probability greater than a predetermined value may be assigned a value of 1, and any cell where none of the output state probabilities are greater than a predetermined value is assigned a value of 0. The predetermined value can be a constant that is chosen empirically based on the results of the feature subspace (model, framework, superframework, etc.). The constant may also be based on the number of output states. For example, one may wish to count the number of cells where any output state has a greater-than-average likelihood of occurring. So, for an n-output state system, any cell having any single output state probability greater than 1/n can be given a value of one, or greater than k/n, for some constant k. Other cells will be given a value of zero.

Alternatively, the weights given to cells can be increased based on the number of output states that exceed a given probability. For example, in a four-output-state system, a cell having two output states having a probability of occurrence greater than 0.25 would be given a weight of 2. As a further alternative, the cellular or global weights can be based on the variance of the output states. Other similar heuristic methods may be utilized to determine the information content of the cell under consideration.

In the case where the output of the process being modeled is continuous, the local entropy may be calculated as shown in method 602. At step 630, a data set comprising all of the output values present in the cell is created. The informational content of the cell is calculated in step 640. Recall that when dealing with output-specific probabilities, data sets with high information content will have some probabilities that are higher than others. When dealing directly with output values, however, as is the case in steps 630–670, information-rich sets are those having more uniform data values. That is, high information sets have less variation in the output values. Thus, if the informational content is determined using the Nishi entropy calculation, there is no need to form the complimentary value 1−E. The weighting factor in this case is simply equal to the Nishi entropy E.

In addition, as shown in steps 650 and 660, it may be desirable to apply a threshold limitation to set low entropy cells to zero. This assists in limiting the erroneous effects associated with accumulating the information content of cells having insignificant information content when the global calculation is made. The calculation of local cell entropy is completed as indicated at step 670.

Alternatively, when dealing with continuous output systems, it is possible to quantize the output into a plurality of categories and use the above-described method steps shown in step 610 to define a data set comprising the probabilities for each quantization level. The remaining step 620 is also performed to determine the informational content by calculating the entropic weights as described above.

Figure 7:
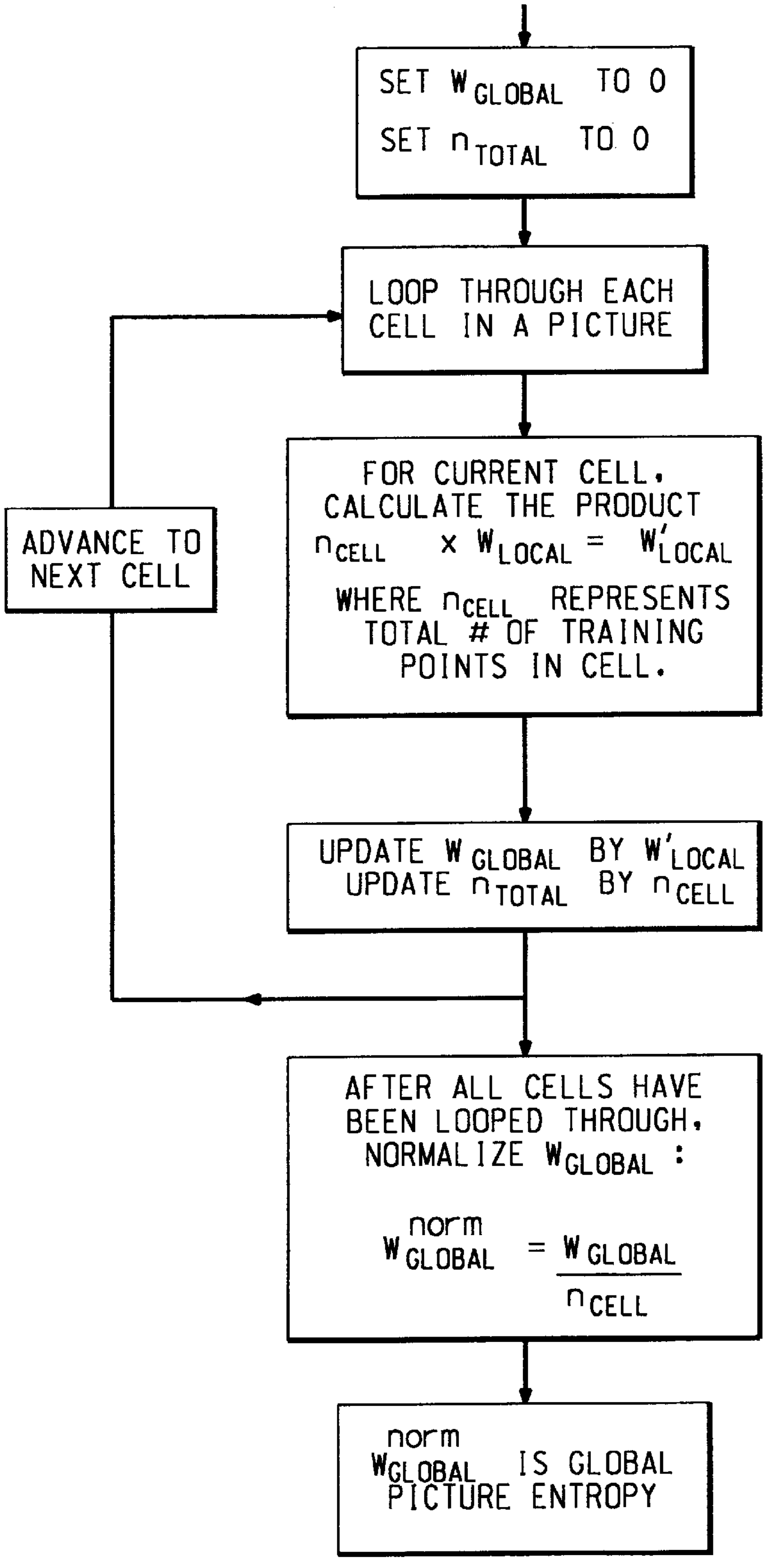
FIG. 7 is a block diagram illustrating a method for calculating a global entropy parameter.

Calculation of Global Entropy as a Weighted Sum of Local Entropies:

Referring to FIG. 7, the global entropy $W^{gs}$ for a subspace S can then be calculated as a cell-population-weighted sum of local cell entropies $W^{ls}$ over all the cells in that subspace.

$$W^{gs} = \sum_{i=1}^{n} n_i^s W_i^{ls} \Big/ \sum_{i=1}^{n} n_i^s,$$

where n represents the number of cells in subspace S, $n_i^S$ represents the number of counts (data points) in cell i in subspace S. In practice, this has proven to be a useful measure of global entropy, as it describes an overall measure of the purity of the cells within that subspace. FIG. 8 illustrates calculating local and global information content. FIG. 9 shows an example of local and global entropy parameters. Subspaces with high informational content will have a high value of $W^{gs}$.

Alternate Method for Calculating Output State Dependent Global Entropy:

The basic statistical quantity defined is a probability $p_{i|c}$ which represents the probability of being in cell i given that the output is in state c in a subspace S:

$$p_{i|c}^S = n_{ci} \Big/ \sum_{j=1}^{n} n_{cj},$$

where $n_{ci}$ is the number of points in cell i having output state c, and the summation extends over all the cells j in subspace S.

The Nishi informational entropy definition can be used to define a global entropic term $W^{gs}{}_c$ for a given output state c in subspace S. First, the Nishi entropy for a given state c is calculated:

$$E_c^s = \left( \sum_{i=1}^{n} f_{i|c}^s \ln f_{i|c}^s \right) \Big/ \ln(1/n)$$

where n is the number of cells, and $$f_{i|c}^s = p_{i|c}^s \Big/ \sum_{j=1}^{n} p_{j|c}^s.$$

Again, the denominator, being the summation over all cells of the state-specific probabilities, will equal one, but is included in the above expression for consistency and clarity. $E_c^s$ thus represents the global uniformity of the distribution of the probability $p^s{}_{i|c}$ over the subspace S. Finally, the global entropic term $w_c^{gs}$ may be defined as:

$$W_c^{gs} = 1 - E_c^2,$$

which is the global output-specific entropic weighting term for category c within subspace S. This is a global measure in the sense that it represents the clustering of the distribution of points (that correspond to output c) throughout the entire subspace. Subspaces with high informational content will have a high value of $W_c^{gs}$.

Category-Independent Generalization for the Alternative Definition of Global Entropic Weighting Factor By summing across all categories, an alternative global entropic weighting factor may be defined as a category-independent global entropic weighting factor:

$$E^S = \left( \sum_{c=1}^{n_c} \sum_{i=1}^{n} f_{i|c}^S \ln f_{i|c}^S \right) \Big/ \ln(1/n')$$

where n'=$n_c$n, which is the product of the number of output states and number of cells, and where $$f_{i|c}^S = p_{i|c}^S \Big/ \left( \sum_{c=1}^{n_c} \sum_{i=1}^{n} p_{i|c}^S \right).$$

Of course, the denominator in the above equation simplifies to:

$$\sum_{c=1}^{n_c} \sum_{i=1}^{n} p_{i|c}^S = n_c,$$

which simply indicates that the probabilities used in the Nishi formula are properly normalized. This alternative definition is believed useful in situations where the number of output states is large and computational efficiency is desired.

In the discussion above, it is assumed that the output values of the system are discrete, or "categorical". The same methods can be used to calculate local and global entropies even when the output values are continuous by first artificially quantizing the output values into discrete states or categories prior to the entropy calculations.

It is worth noting that the distribution of the population of the output states in the training data set is associated with the ultimate validity of the model. In the above analysis, it has also been assumed that the data set is balanced, however, such might not always be the case. Consider a problem where there are two output states, A and B. If the training data set consists primarily of data items representative of state A, the population statistics will be unbalanced, possibly resulting in the creation of a biased model. The reason for the imbalance could be either bias on the part of the data collector, or an intrinsic imbalance present in the parent population characteristic of the data set.

In the case of bias on the part of the data collector, a simple normalization can be performed so that the population statistics within a cell refer to the fraction of data items of a given output state present in the cell rather than the absolute number of data items. This normalization has been employed successfully on many empirical data sets. In the second case, normalization may not be appropriate since the imbalance is "real".

An example of data normalization follows:

Consider a data set with 100 items where there are 2 output states A and B. Assume that there are 75 items corresponding to state A and 25 items corresponding to state B. Consider a cell in a subspace where there are a total of 10 items with 5 items corresponding to state A and 5 items corresponding to state B. In absolute terms, this is an impure cell since we have a "count data set" corresponding to {5,5} where each entry refers to a count for a particular state. However, the data may be balanced by normalizing each count with respect to the overall count for that state as follows:

| State | Count | Fraction of Total |
|---|---|---|
| A | 5 | 5/75 = 1/15 |
| B | 5 | 5/25 = 1/5 |

The fractional count from the table is then used in the entropy calculation:

The data set D is D={1/15, 1/5}, with $d_{total}$=1/15+1/5=4/15, and the normalized data set F becomes F={1/4, 3/4}. The entropy E is calculated:

$$E=(0.25\ \ln(0.25)+0.75\ \ln(0.75))/\ln(1/2)=0.811.$$

Figure 2C:
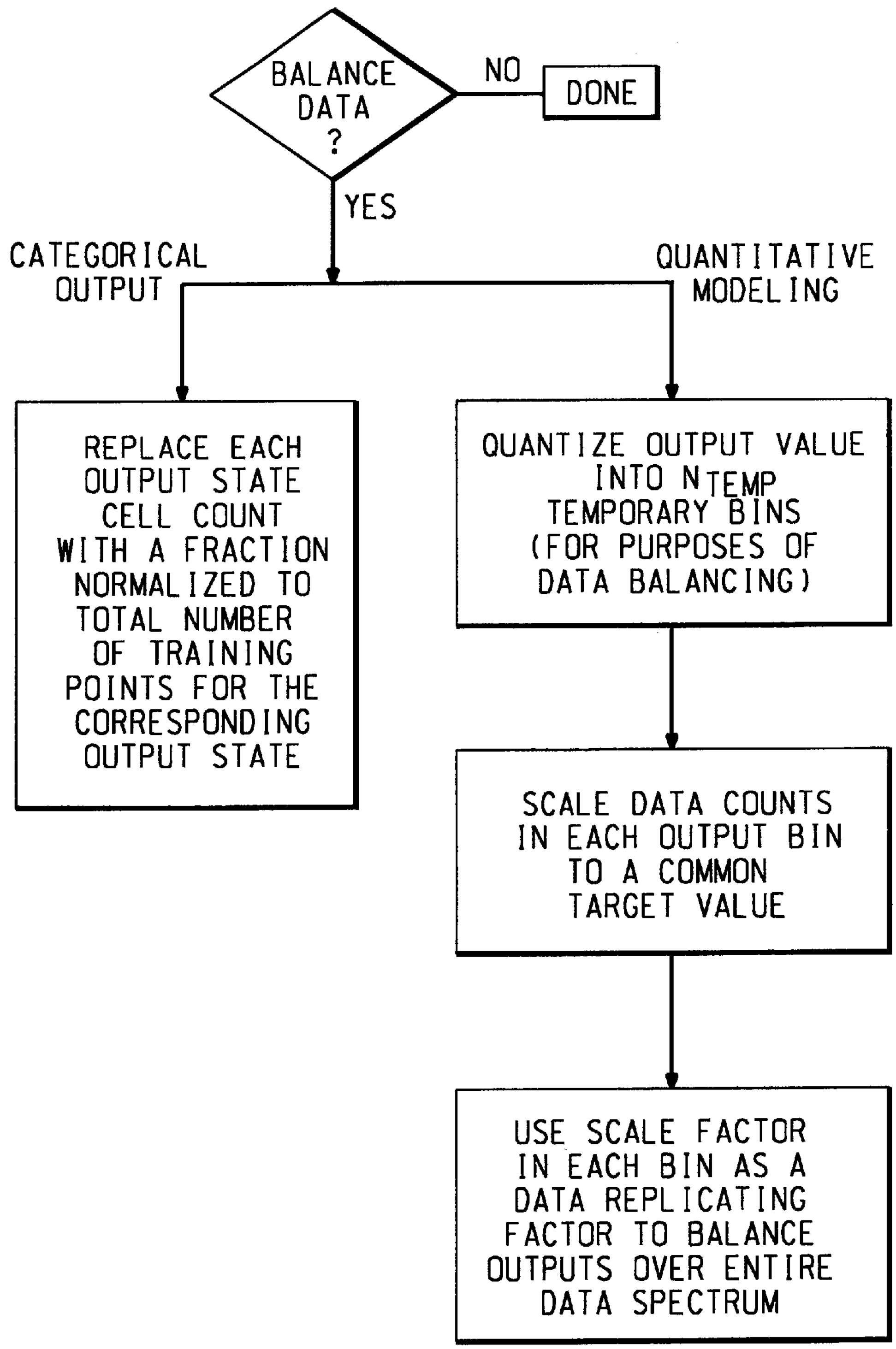
FIG. 2C shows a method of data balancing.

The modified Nishi entropy W is 1−E, or 1−0.811=0.189. FIG. 2C is a block diagram illustrating a method for balancing the influence of data when a given output state predominates in the data set.

Model Evolution Using A Prediction-Oriented Fitness Function

Once the inputs have been quantized and a pool of feature subspaces have been initially identified by the genetic algorithm, a model is generated by forming combinations of those preferred subspaces. As described above, the data, or a subset of the data called a training data set, is used to create the many feature subspace topographies from which information can be extracted. Once the subspaces having high informational content have been identified, these subspaces can be used as "look up" subspaces into which the data (or a subset of the data called test data) can be projected for the purposes of output prediction.

Output prediction by a particular subspace is determined by the distribution of output states within a given cell in the particular subspace. That is, each data point (or each point in a test data subset) will fall into a single cell in a given subspace, as seen in relation to FIGS. 3A–C. To predict the output associated with each data point, one simply looks at the distribution of the data used to populate the subspace (the entire data set, or a training subset), and uses this to arrive at a prediction. A simple rule to follow for output prediction by a particular subspace is that the probability to be that the output will be in state c is given by $p_{c|i}$. This "local" probability simply represents the output distribution of sample points that occupy a given cell in a feature subspace.

A given model is a combination of subspaces, and each point is therefore examined with respect to all the subspaces under consideration in the model. The local probabilities are essentially the "base" quantity that is then weighted by both the local and global entropies in a model. The terms "local entropy" and "global entropy" are collectively referred to herein as "entropic factors" or "entropic weights". It is the addition of both global and local information metrics to determine model predictions that makes the present method considerably more accurate when compared to a simple probabilistic model. The purpose of these entropic factors is to emphasize "information-rich" cells in "information-rich" subspaces and to de-emphasize cells which are either individually information-poor (i.e., less information-rich) or are located in information-poor (i.e., less information-rich) subspaces.

Thus the fitness function for each subspace combination, or model, used to drive the evolutionary model process is an entropic weighted sum of predictions and the associated error rate between the predictions and the actual output value associated with the test data points (again, either the entire data set or a subset).

Thus, in accordance with one aspect of the method, local and global entropic weighting factors are used to characterize the information content of the feature subspaces. By weighting the contributions of a feature subspace cell by local and global information measures, the method is able to effectively suppress different types of noise sources. One such noise source is local noise within a cell. If the distribution of output states within a cell is uniform, then that cell contains little predictive information. Although the probability of a given output state can hint at the nature of the total distribution of output states in a cell, it does not tell the whole story. The distribution of all the other output states is not contained within the probability of a given output state. For anything other than a binary output system, the information contained within a single output state probability is thus incomplete. The calculation of a local entropic term associated with an individual cell results in a weighting factor which does characterize the entire local probability distribution.

As described above, the global entropy factor can be calculated in several different ways for comparative purposes. The preferred technique for defining the global entropy of a subspace is to define the global entropy as a cell-population-weighted sum of local cell entropies. The local entropy is calculated for each cell in a subspace and the global entropy for this subspace is then calculated by performing a cell-population-weighted sum over all the cells. This measures an overall global cell informational entropy for a subspace (over all the cells of a subspace).

The alternate global measure examines the probability distribution of each output state within the cells over the entire subspace. If this distribution is uniform, then the subspace of interest contains little predictive information on that output state. In this embodiment, a separate global entropy term is calculated for each output state within a subspace. This alternate global entropy term differs from the earlier described global entropy term, which is the same for each output state. This alternate global entropy measure accommodates the possibility that a given subspace might be "information-rich" with respect to one output state, but be "information-poor" with respect to a different output state.

The present method advantageously allows for the independent calculation of both local and global entropy based weighting factors to suppress noise. These factors can be individually adjusted or "tweaked" to obtain an optimal balance between local and global information for maximum predictive accuracy. In many prior art data modeling systems, it is difficult to conveniently adjust the relative magnitudes of local and global weighting factors. As previously mentioned, most prior art methods rely on the optimization of an objective function over the entire data set to arrive at a solution.

Another related issue is that of redundancy. Several input features may contain essentially the same information content with respect to a given output. Even if two features do not contain information related to a particular output state, they might still be correlated. Redundancy does not intrinsically restrict the method of the present invention, and in fact can be very helpful as a way of building in robustness into the model that is created although it can increase total computational cost. Clustering methods using information measures are available to identify redundancy between features and are discussed below.

Both the local and global entropy-weighting factors measure the amount of "structure" in a distribution. The less uniform, or "more structured" a distribution is, the higher its corresponding entropic weight W. This aspect of structure of the data space is used to weight the importance of both local and global statistics.

The calculation of both local and global entropy terms allows for the separate control of local and global information weighting factors in the method. A natural issue which arises is the definition of locality: How local is local? The answer to this question depends of course on the specific problem being addressed. In accordance with a preferred embodiment, the method systematically searches for the "best" description of locality by scanning the bin resolutions which in turn determine the multi-dimensional cell sizes in order to provide the highest predictive accuracy. In particular, different groups of information-rich feature subspaces may be identified (either by exhaustive searching or feature subspace evolution), where each group uses a different number of cells n per subspace. In fact, the number of cells n may be exhaustively searched from a minimum value to a maximum value. The maximum number of cells may be specified in terms of a minimum average of points per cell, because it is undesirable to over-resolve the subspace with too many bins. The minimum number may be even be less than one.

It is worth digressing at this point to consider the properties of the "output state" in more detail. In the method of the present invention, quantization of the inputs is performed to create the multi-dimensional subspaces. In classification problems, the output variable is a discrete category or state, and is thus already quantized. In quantitative modeling, the output variable can be continuous. In such cases, one possible solution is to perform an artificial quantization of the output data space into discrete bins. After the output data space has been quantized, the discrete modeling framework described above can be used to measure local and global entropy factors. These entropy factors can then be used to predict continuous values of the output using methods described below.

A significant measure regarding precision is the ratio of the number of output state categories, $n_c$, to the mean total cell population statistics $<n_{pop}>$. If $n_c$ is much greater than $<n_{pop}>$, most of the output states will be unoccupied within a cell, resulting in poor statistics and possible degradation in the model. This again argues for more data, which is not surprising for a data driven model. With the advances in computer hardware technology, the ability to acquire and store massive data sets is increasing rapidly; the method of the present invention enables the extraction of information from the data. The method has been found to work surprisingly well even when $n_c$ is much greater than $<n_{pop}>$ in many real world problems where the value of $n_c$ is small (on the order of 1–10). This may be due to the cooperative effects of summing statistics over a large number of subspaces.

To summarize, the global entropy factors associated with feature subspaces can be used as the fitness functions used to evolve a pool of the most information-rich features using a genetic algorithm. The determination of this pool is dependent on the data quantization conditions as described earlier. As the mean number of sample points per cell decreases, the local and global entropic information measures generally increase. However, this does not necessarily imply that these quantization conditions will generalize well in the development of the final models. In practice, evolving features under quantization conditions where the mean number of sample points per cell is significantly less than 1 (i.e., 0.1 or less) has still resulted in accurate models. This may be due in large part to the cooperative effects of summing statistics over a large number of subspaces in the feature pool.

Figure 10A:
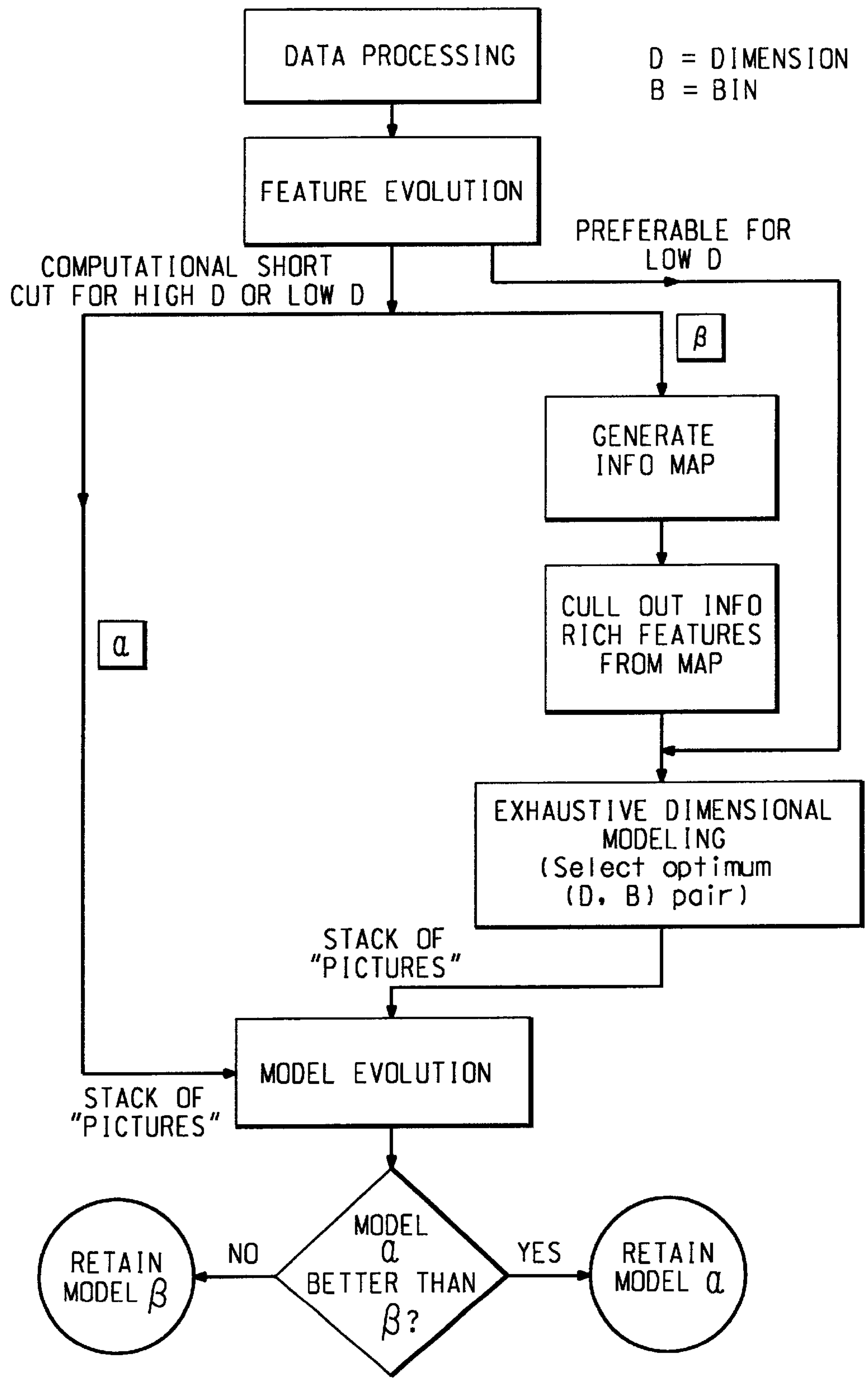
FIG. 10A is a block diagram illustrating a method for determining an optimum model.
Figure 10B:
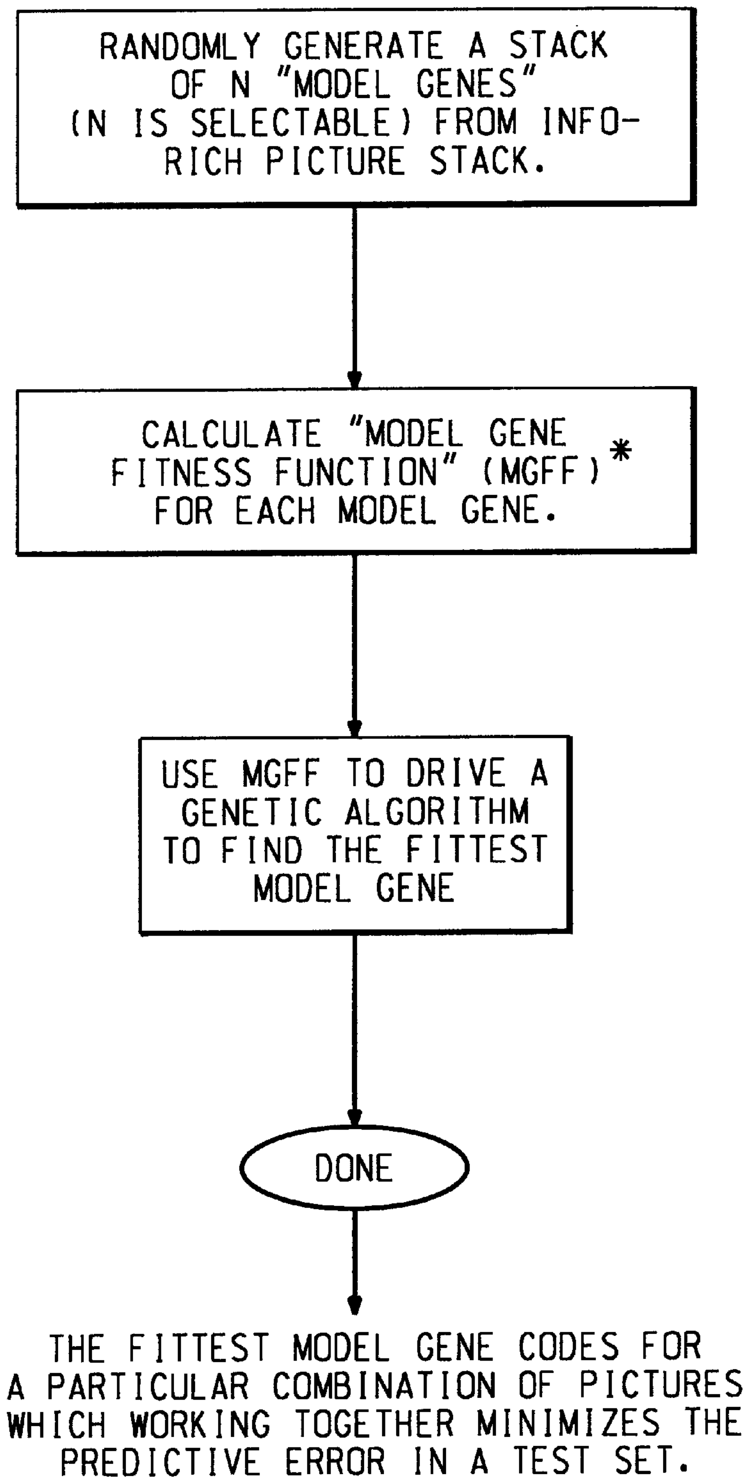
FIG. 10B is a block diagram illustrating a method for model evolution.

Determining a Subset of the Feature Data Set that Most Accurately Predicts System Outputs from System Inputs Referring to FIG. 10, once a feature data set with high informational entropy has been determined, this feature set may be used directly to develop a predictive model. However, the feature selection process using evolutionary methods has the significant advantage of alleviating the so-called "curse of dimensionality" by only retaining those features in a high dimensionality data space which have a relatively high informational entropy. In this regard, it should be noted that the total number of possible binary feature bit strings in an N-dimensional space is $2^N$, a quantity which increases exponentially with N.

Figure 14:
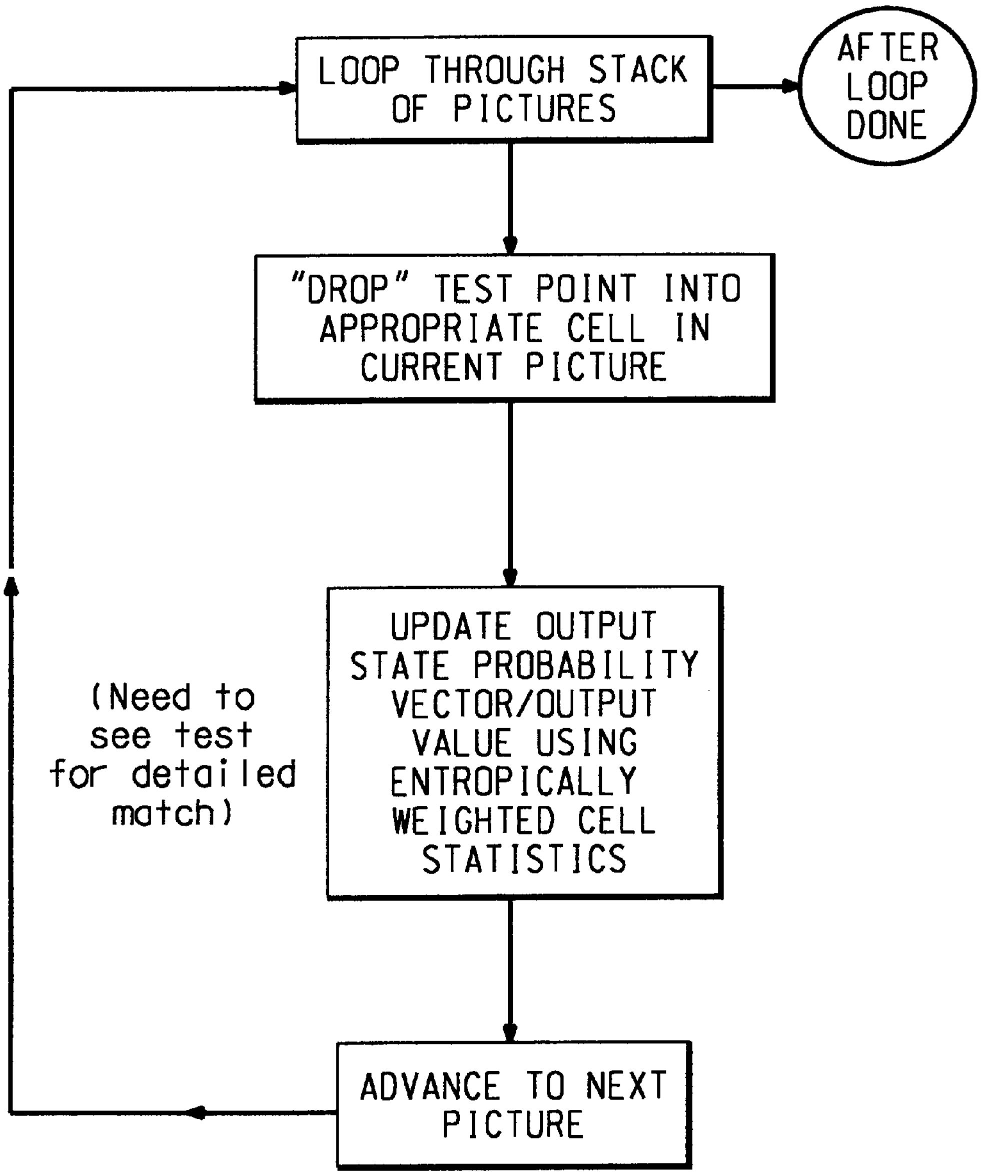
FIG. 14 is a block diagram illustrating a method for the step of calculating the output state probability vector/output state value.

Once a feature data set has been determined, it is possible to calculate an output state probability vector for any sample data point. Referring to FIG. 14, in order to calculate this vector, it is first necessary to combine the local and global entropic weighting factors to create a total weighting factor. In the method of the present invention, a general third order expression involving the local and global entropic weights has been defined with the coefficients empirically adjusted for optimum model performance. The general expression for the total weighting factor thus looks as follows:

$$W^S{}_{ic}=a(W^{is}{}_i)^2W^{gs}{}_c+b(W^{gs}{}_c)^2W^{is}{}_i+c(W^{is}{}_i)^2+d(W^{gs}{}_c)^2+eW^{is}{}_iW^{gs}{}_c+fW^{is}{}_i+gW^{gs}{}_c+h$$

Thus, each cell i, in each subspace S, has an associated general weighting factor $W^S$ that is a combination of the local and global weights for the given subspace S (note that the equation also indicates that the global weighting factor $W^{gs}$ is output state dependent, and hence the general weighting factor is output state dependent. In the event that the global weighting factor is calculated across all output states, then the dependence upon output state c is removed).

The parameters a through h may be empirically adjusted to obtain the most accurate models, frames, superframes, etc. In many problems, the weighting factor is dominated by the local entropic weighting factor, although the global entropic factor is also present. It reinforces the point that the method described herein provides significant importance to local statistics in a feature subspace, which is a distinguishing feature between the method described herein and prior art modeling approaches. In establishing confidence limits for the model, the model coefficients can be varied to calculate the error statistics.

Once a suitable value for $W^S{}_{ic}$ has been determined, the probability of each output state for a sample point d can be calculated as $$P_c(d)=\sum_{s=1}^{n_S} W^s_{i_d c}\, p^s_{c|i_d},$$

where the summation extends over all the $n_S$ subspaces, the sample point d is assumed to project into a corresponding cells $i_d$ in each subspace, and the local probability $p_{c|i_d}$ is the probability that the output is state c given the fact that the point maps into cell $i_d$. As mentioned above, if the general entropic weight is not output dependent, then the subscript c of the general entropic weight may be ignored in the above equation. The probabilities for each output state c can then be combined into a probability vector $$P(d)=(P_1(d), \ldots, P_{Kc}(d))/N(i),$$

where $K_c$ output states are assumed, and $$N(i)=\Sigma P_c(i)$$

is a normalizing factor, summed over c=1 to $K_c$, to ensure that the sum of probabilities is unity.

The output state probability vector P(i) encapsulates the information contained within the data space as far as the classification of sample point d. Various prior art modeling approaches such as neural networks also result in a similar vector and different approaches have been taken to interpret the result. A commonly used method, as described in Bishop, C. M., "Neural networks and Their Applications," Review of Scientific Instruments, vol. 65 (6), pp. 1803–1832 (1994), is to use the "winner take all" tactic of assigning the predicted output state as the state with the largest probability of occurrence.

Evolving an Optimum Model Using a Subset of Feature Subspaces

Figure 15:
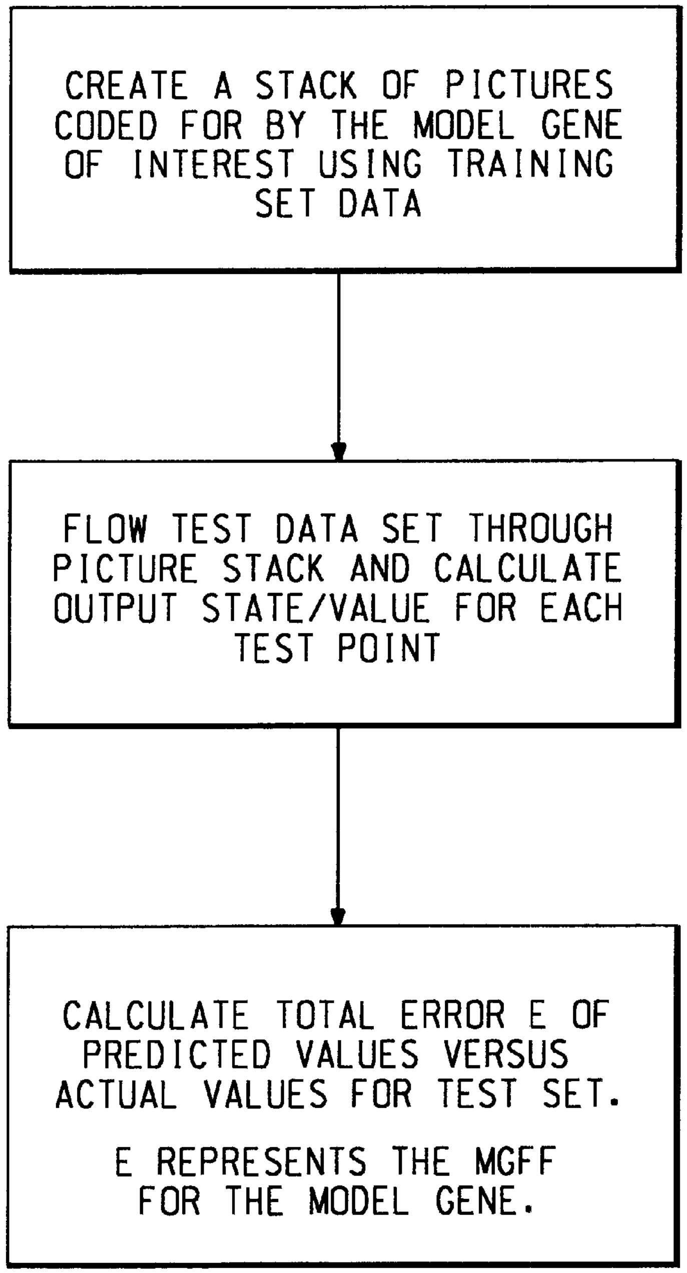
FIG. 15 is a block diagram illustrating a method for calculating a fitness function for a model gene.

Evolutionary methods for identifying subspaces with high global entropic weights have been discussed above. This is particularly useful in problems that have many input features where the curse of dimensionality is evident. In a first evolutionary stage, the fitness function that drives the evolution is the global entropy of the subspace. It is also possible to use the concept of evolution for determining the best predictive model. In a second evolutionary stage the goal is to identify the optimum subset of feature subspaces with high global entropy which results in the lowest error in a test data set. This second evolutionary stage will group those subspaces which "work well together" in a cooperative fashion to produce the best predictive model. At the same time subspaces that introduce additional noise in the modeling process will be culled out during the second evolutionary stage. Referring to FIG. 15, the fitness function in this second evolutionary stage is then the overall prediction error in the test set obtained from using a particular subset of feature subspaces.

If M features are present in the final gene pool of feature subspaces with high global entropy after the first evolutionary stage where M has been predetermined, a second evolutionary process may be used to find the optimum combination of features. An M-bit "model vector" is defined where each bit position encodes the presence or absence of a given feature. Training and testing are then performed using the features encoded by the model vector, with the fitness function being an appropriate performance metric resulting from the modeling process on a test set. For classification problems, the appropriate performance metric could be the percent of samples correctly classified in the test set. For the quantitative modeling problem, the appropriate performance metric could be the normalized absolute difference between predicted and actual values in the test set, as given by $$F = 1 - \frac{\sum_{d=1}^{N} \frac{|a_d - p_d|}{d_{\max} - d_{\min}}}{N},$$

where $a_i$ is the actual output value for the test point d, $p_d$ is the predicted value for the test point d, $d_{max}$ is the maximum value of the output range of test point values, and $d_{min}$ is the minimum output value of the range of test point values.

Once the second evolutionary process has finished, the fittest model vector is used to select the optimal feature combination for the modeling process. So, the first evolutionary stage has identified a pool of features of high informational entropy that are then further evolved in the second evolutionary stage to find the best subset of features that minimizes the predictive error in a test set. This entire process may be repeated under different evolutionary conditions and constraints to find the best empirical solution to the modeling problem.

The method of the present invention thus incorporates the concept of hierarchical evolution, where evolutionary methods are used both to identify the most information-rich features, as well as the optimum subset of feature subspaces needed to develop the best predictive model. Having two evolutionary stages provides a unique advantage of the method. The first stage produces an information-rich subset of feature subspaces that can be examined independently of any subsequent modeling step to gain insight into the problem at hand. This insight in turn can be used to guide a decision-making process.

A common complaint with prior art modeling paradigms is that they do not easily reveal where the information lies amongst the input features. This deficiency limits the ability of prior art methods to participate in strategic planning and decision making. In the method of the present invention, the breakpoint after the first evolutionary stage allows for the possibility of intelligent strategic planning and decision making as well as an opportunity to determine whether the subsequent modeling step is worthwhile. For example, if no sufficiently rich set of input features can be found, the method of the present invention points the modeler back to the data to include more information-rich features as inputs prior to developing a robust model. Although the present method does not specify which information is missing, the present method does indicate that there is an information gap that needs to be filled. This indication of an information gap itself is very valuable in the understanding of complex processes.

Creation of an Information Map

Figure 11:
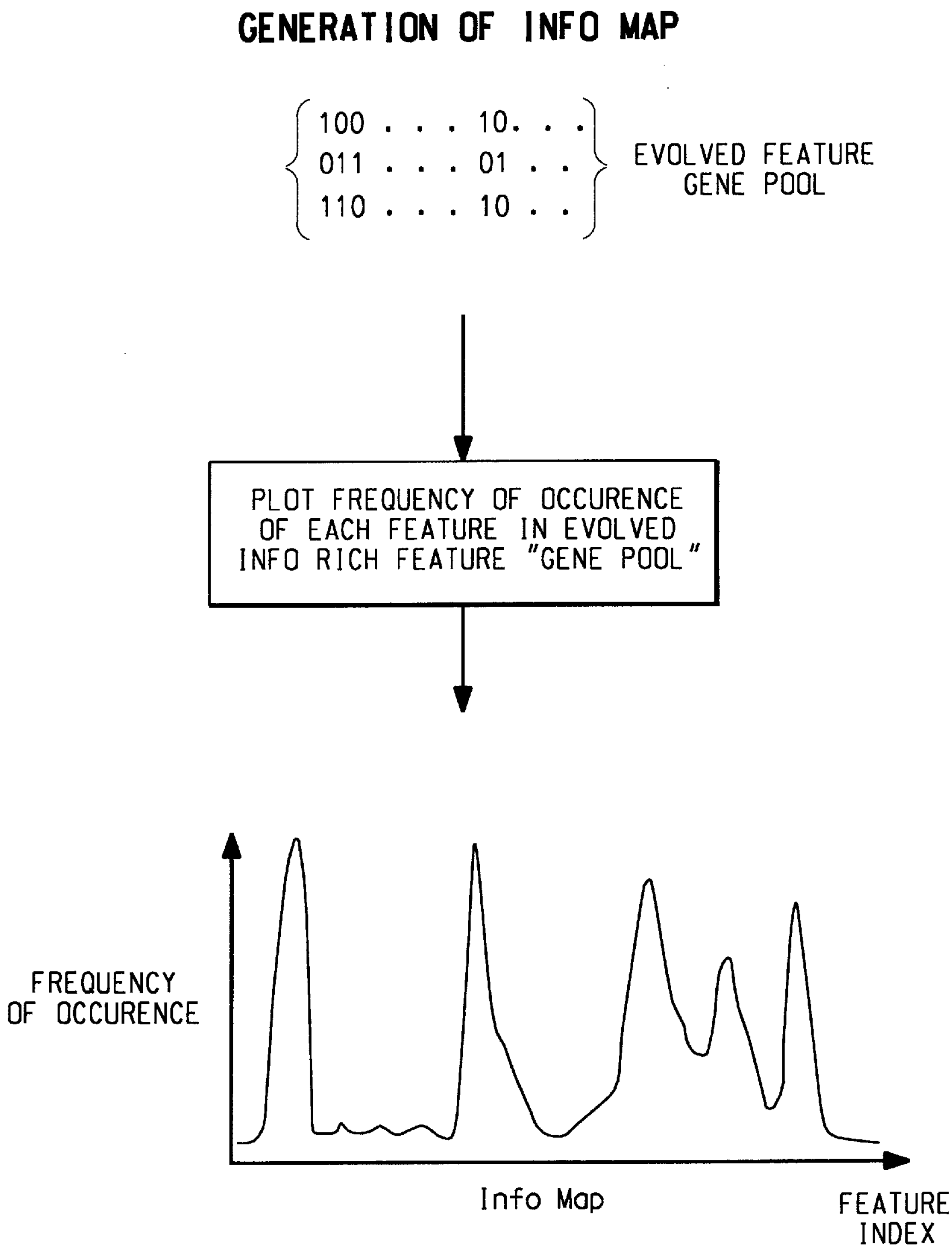
FIG. 11 illustrates a method for generating an information map.
Figure 12:
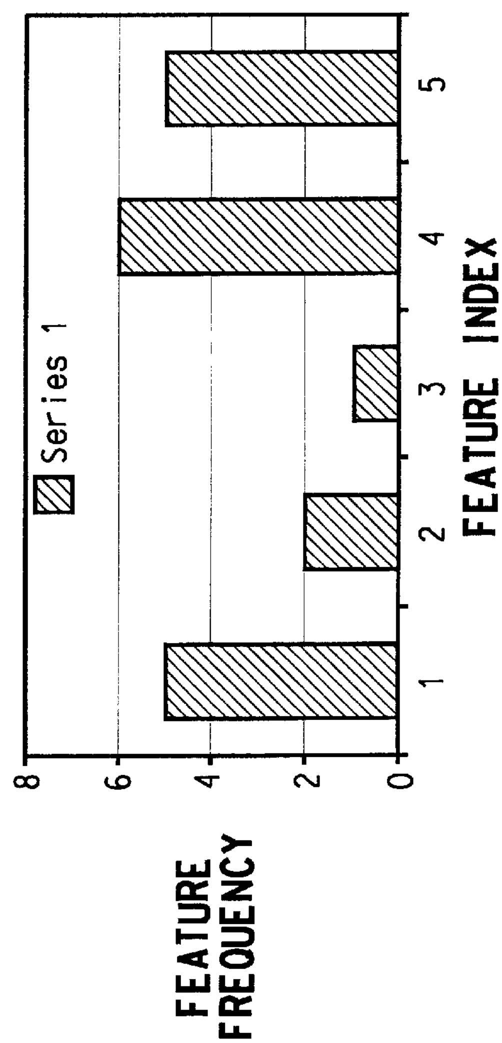
FIG. 12 is an example of a gene list and its associated information map.

Referring to FIG. 11, after the first evolutionary stage, it is also very useful to create a histogram of the frequency of occurrence of inputs present in the evolved feature data set to gain fundamental understanding of the problem. This histogram can be defined as an "Information Map" for the problem. For some problems, the structure of the Information Map can be used to reduce the dimensionality of the problem if certain subsets of inputs occur significantly more frequently than other subsets of inputs. Reducing the dimensionality of the subspaces has the additional advantage of alleviating another aspect of the curse of dimensionality where the amount of data needed to populate a subspace with a mean number of sample points per cell increases exponentially as the dimension increases. FIG. 12 is an example of a gene list and its associated information map.

Exhaustive Dimensional Modeling

Figure 13:
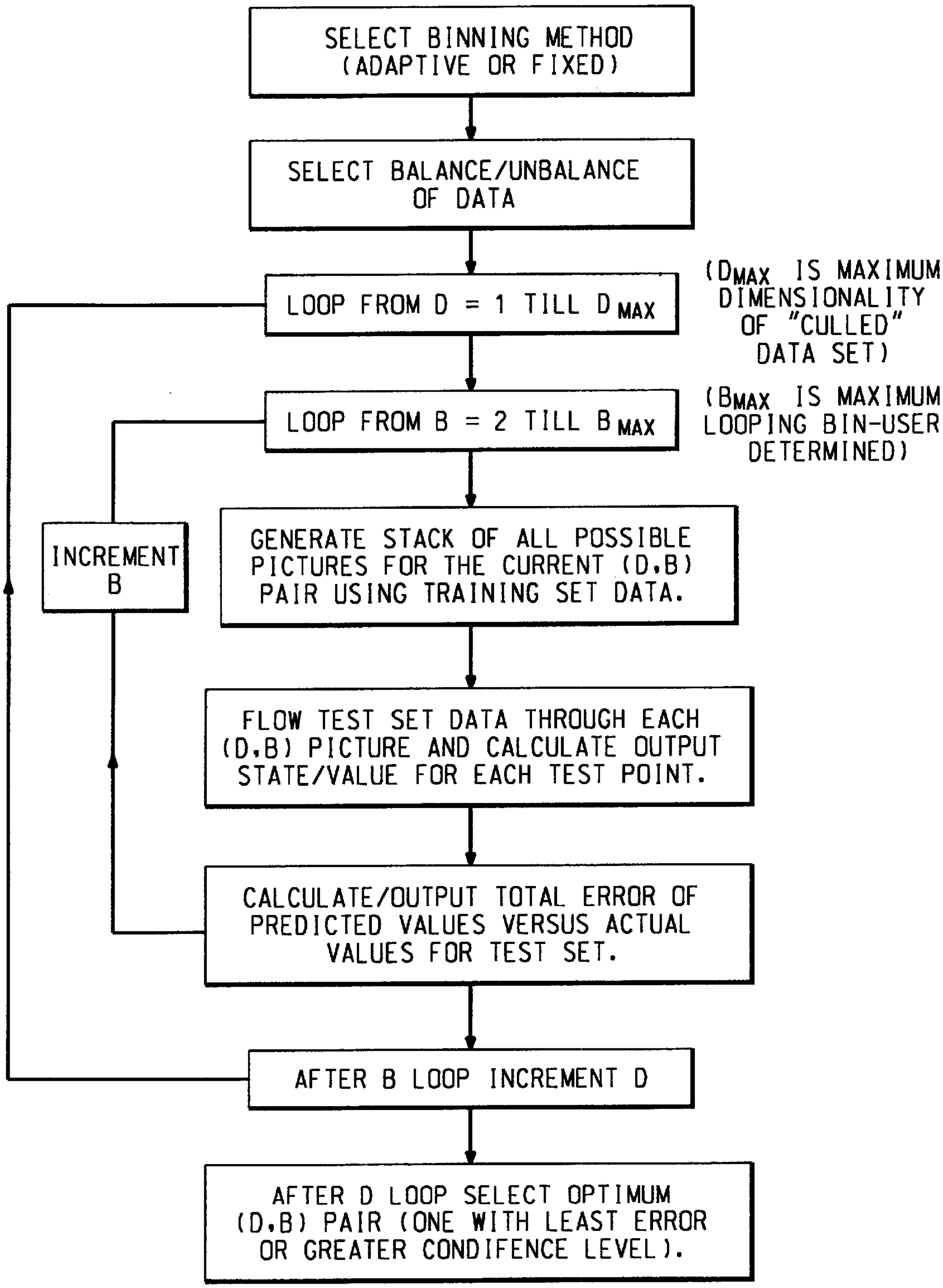
FIG. 13 is a block diagram illustrating a method for the exhaustive dimensional modeling step.

Referring to FIG. 13, if such a dimensionality reduction is possible, predictive models can be developed using the reduced input data set. In accordance with one preferred embodiment of the method, the N most commonly occurring inputs are identified from the Information Map and then all possible projections of the N features into M sub-dimensions for all M less than or equal to N are computed to define the feature subspaces. A recursive algorithm to compute all such projections is as follows:

A recursive technique to enumerate all combinations of features: For each sub-dimension M, consider the problem of identifying all M-tuples (combinations of length M) in a list of N numbers. The first element is initially selected and then all (M−1)-tuples (combinations of length M−1) in the remaining list of N−1 numbers need to be identified in a recursive fashion. Once all such (M−1)-tuples have been identified and combined with the first element, the second element in the original list is selected as a new first element and then all the (M−1)-tuples in the N−2 remaining elements past the second element are identified. This process continues until the first element exceeds the M+1 'th element from the end of the original list. The algorithm is inherently recursive since it calls itself, and it also assumes that the ordering of the elements is unimportant.

Once a pool of all feature subspaces for a given sub-dimension M have been identified, this pool can be used directly as the set of feature subspaces used to predict output values in a test set using the methods described above. This process can be repeated over a plurality of quantization conditions for each sub-dimension M. The optimum (sub-dimension, quantization)-pair is then selected based on minimizing the total predictive error on a test set. After an optimum (sub-dimension, quantization) pair has been selected, the pool of feature subspaces corresponding to the optimum (sub-dimension, quantization) condition can be used as the starting point for the second evolutionary stage. This second evolutionary stage selects the optimum subset of feature subspaces from this pool having the minimum total predictive error in a test set, and thus defines an optimum model.

As a general rule, it has been found advantageous to determine a relatively low sub-dimensional representation which still preserves enough total predictive accuracy on a test set. At lower sub-dimensions, higher cell population statistics can still be maintained even at relatively fine levels of quantization, thus improving the precision of the model.

It has also been found that if the dimension of the original data set is not very high, the method of exhaustive dimensional modeling can be applied directly on the original data set. This eliminates the need to perform the first evolutionary step of identifying a pool of features with high informational entropy.

Quantitative Modeling

The transformation of a quantitative modeling problem into a classification problem by performing an artificial quantization of the output variable is useful for calculating local and global entropy factors. A natural question that arises is how to preserve the precision present in the original data set in the final predictive model. This is especially significant if the output bin resolution is constrained by the size of the data set in order to avoid sparse cell statistics. For traditional classification problems, the precision issue is not present since the output variable can only assume one of a discrete ensemble of possible states.

One advantage of performing the artificial quantization of the output variable is that the calculations of the local and global information measures are based on Shannon terms where the summations occur over categories or cells which are both independent of the number of sample points. This facilitates decoupling sample population statistics from information content. For quantitative modeling, the artificial quantization of the output variable allows the local and global entropies to be calculated in the same way, thus maintaining the separation of information measures from sample population statistics.

After the local and global information measures have been calculated using the output variable quantization, the precision in the raw output variables can be used to recover precision in the final predictive model.

First the "spectrum" of output values is balanced over all the artificial output variable categories. This is accomplished by effectively replicating the data items in each output category by a scale factor so that the final population in each category is at a common target value. A typical common target value is a number representing the total number of data points.

One method for data balancing has been described above, wherein the state-specific probabilities are normalized based on the number of points corresponding to that state. An alternate approach to data balancing without explicitly replicating data is described below. Although the calculation of the Nishi informational entropy term has a normalization term involving a ln (1N) factor where N represents the size of the data set, this normalization serves primarily to bound the entropic term to values between 0 and 1. The normalization term does not directly address the issue that the degree of the uniformity depends on the size of the data set.

For a small data set, the normalization of the data items to the total of all the data items in the data set introduces a subtle bias. The relative variation between the normalized data items in the smaller data set can be greater than that between corresponding items in a larger data set, even if the absolute variation in data is comparable. In order to correct for this bias, a data balancing step has been introduced. The balancing step is described below:

Consider two data sets $D_1$ and $D_2$ where the sets represent the inputs corresponding to a first and second output state, respectively. $D_1$ has $N_1$ items and $D_2$ has $N_2$ items. Let M represent the lowest common multiple of $N_1$ and $N_2$, and let $M_1$ and $M_2$ represent the multiplying scale factors for each of the corresponding data sets. If one replicates $D_1$ by $M_1$ times and $D_2$ by $M_2$ times, both the resulting data sets $D_1'$ and $D_2'$ will have M items. After performing the requisite algebra, one finds that the Nishi entropy terms for each of the new data sets are modified as follows:

$$E'_1=(\ln(1/M_1)+\Sigma f_i \ln f_i)/(\ln(1/M_1)+\ln(1/N_1))$$

$$E'_2=(\ln(1/M_2)+\Sigma f'_i \ln f'_i)/(\ln(1/M_2)+\ln(1/N_2))$$

where $f_i$ and $f'_i$ represent the normalized data fractions over the original data sets $D_1$ and $D_2$ respectively.

If the output data within a cell is tightly clustered, $W_{local}$ will be high. Conversely, if the output data is spread out over all the artificial output categories within the cell, $W_{local}$ will be low. The global entropy can be defined simply as a number weighted average $\langle W^i_{local} \rangle$ over the cells in the subspace. $W_{global}$ measures a normalized total amount of information in the subspace. Finally, the basic probability metric $P^S_{ic}$ used in the category based classification can be replaced by the mean (or alternatively median or other representative statistic) cell analog output value. A weighted sum of the mean cell analog output values over the subspaces can then be performed as in the discrete case to predict an output value. Note that cells that have a wide spread in their output values will be weighted down, as will be subspaces where the individual cells are not information-rich.

In the estimation of the mean output value $\mu_i^S$ of a cell the data replication scale factor defined above is used to calculate the mean value in the cell for a balanced data set. The data-balancing step is performed to remove any bias introduced by the distribution of output values in the training data set.

$$\mu_i^s = \frac{\sum_{j=1}^{n} o_j M_j}{\sum_{j=1}^{n} M_j},$$

where n represents the total number of items within a cell; $o_j$ represents the output value of the jth item and $M_j$ is the data replication factor associated with the jth data item, which depends on the artificially quantized state to which the jth item belongs.

In order to reduce "creep error" from information-poor cells and subspaces, the following steps are optionally performed. First, information-rich subspaces can be evolved as described earlier in the discussion of discrete output states. Once the most information-rich subspaces have evolved, both local and global entropic thresholds can be applied towards the computation of an entropically-weighted sum of either the mean or median values associated with the information-rich subspaces. Local entropy values for cells that are lower than the local entropic threshold are set to zero (0). Similarly, global entropy values for a subspace which are lower than the global entropic threshold are set to zero (0) to prevent the gradual accumulation of error in the calculation of the mean.

In the thresholding of the local and global entropy functions, it is often desirable to perform an additional thresholding of the local entropy based on the value of the global entropy function. If the global entropy for a given subspace projection is below its corresponding threshold, the local entropy function for all cells in that subspace can optionally be set to zero regardless of their individual values. The previously described thresholding methods can also be optionally performed for discrete output state modeling, but may be more valuable for quantitative modeling where more restrictive steps should be taken in order to minimize the creep error.

Finally, either with or without the thresholding steps, the method of the present invention can evolve the optimum combination of information-rich subspaces which results in the minimum total output error over a test set of samples. The method of quantitative modeling within the scope of the present invention also involves hierarchical evolution. In a first evolutionary stage the most information-rich subspaces are evolved using global entropy as the fitness function, followed by a second evolutionary stage where the optimum combination of information-rich subspaces are evolved which result in the minimum test error.

An advantage of the method of the present invention over prior art methods is that a common paradigm is used for both categorical and quantitative modeling. The concept of distributed hierarchical evolution as the basis for empirical modeling and process understanding applies to both classes of output variables (both continuous and discrete) in contrast to prior art methods which are optimized for only one type of output variable (either continuous or discrete).

Distributed Hierarchical Evolution

The method described herein utilizes the concepts of pictorial representations of data, or multidimensional representations of data, with concepts from information theory, to create a hierarchy of "objects", e.g., features, models, frameworks, and super-frameworks. The term "distributed hierarchical evolution" is defined as an evolutionary process in which groups of successively more complex interacting evolutionary "objects", such as models, frameworks, super-frameworks, etc. are created to model and understand progressively larger amounts of complex data.

Figure 16:
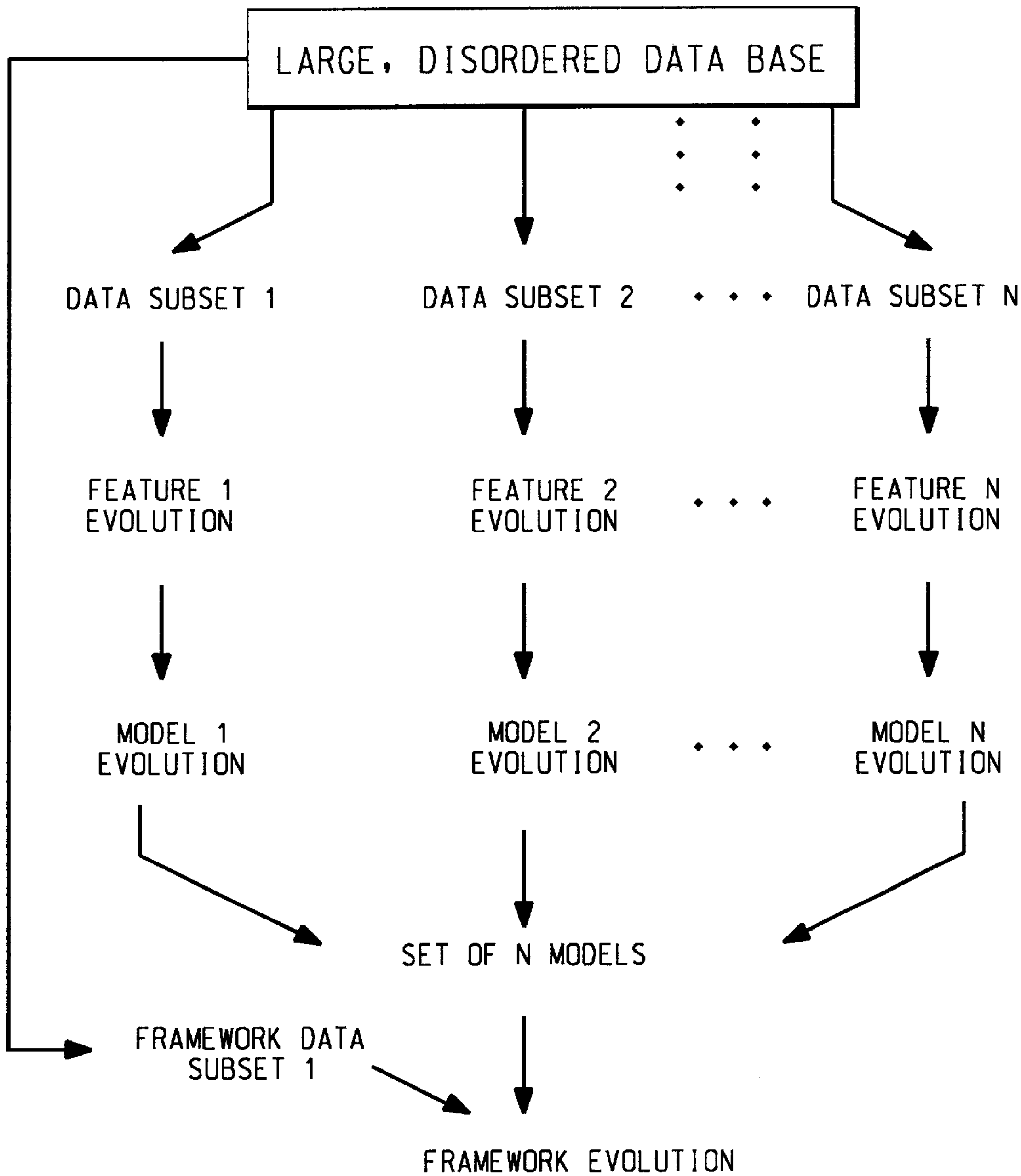
FIG. 16 is a block diagram illustrating a method for distributed hierarchical modeling to evolve a single framework.

For large, complex data sets, the model creating steps described earlier may then be repeated on different training and test data sets to find a group of optimum models. An information-rich subset of the group of optimum models can be determined as follows:

Referring to FIG. 16, the inputs of a test data set are submitted to each model of a selected subset group of models (may be randomly selected) and each subset-predicted output is compared with each test data output. The step of calculating the subset-predicted output is performed in a manner similar to the steps for creating an individual model, where a new training and test data set is created using individual model-predicted values as inputs and actual output values as the outputs. This step may be repeated for multiple selected subset groups of models. The selected subset groups are then evolved to find an optimum subset group of models that most accurately predicts system outputs from system inputs to define what is called a "framework". FIGS. 17A and 17B illustrate the concepts of framework evolution.

Figure 18A:
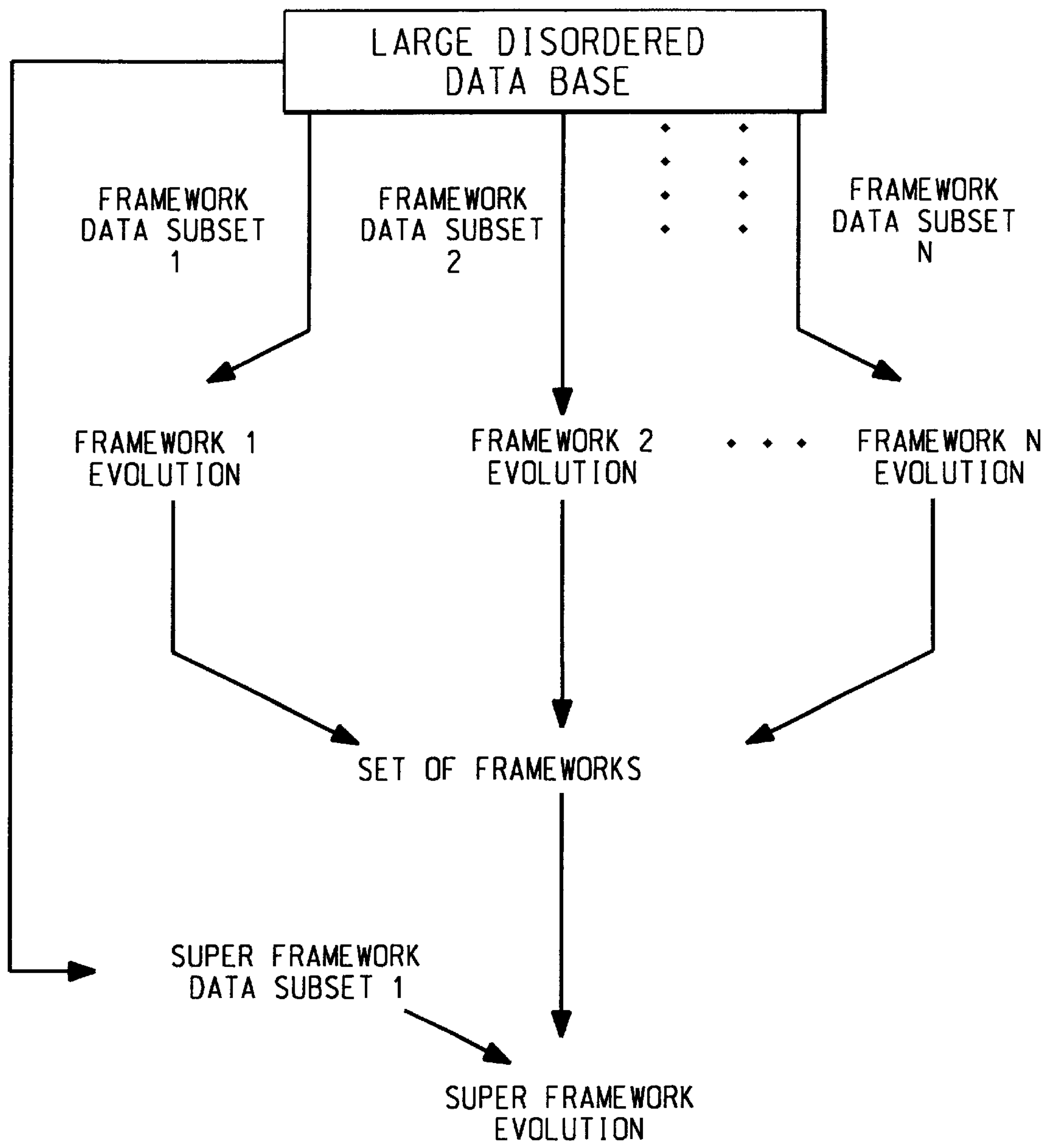
FIG. 18A is a block diagram illustrating a method for distributed modeling to evolve a super-framework.
Figure 19A:
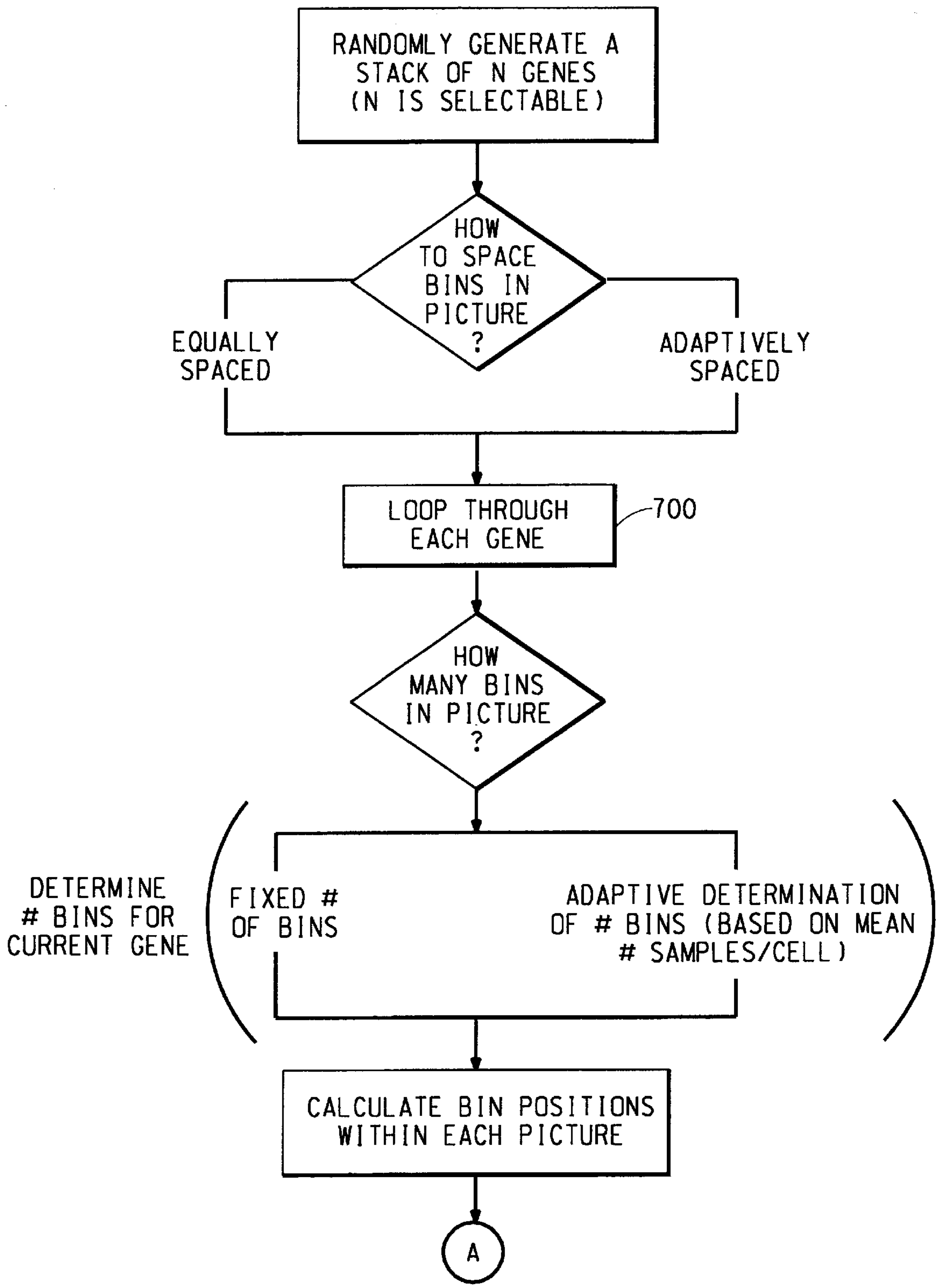
FIGS. 19A and 19B are a block diagram illustrating a method for cluster evolution.
Figure 19B:
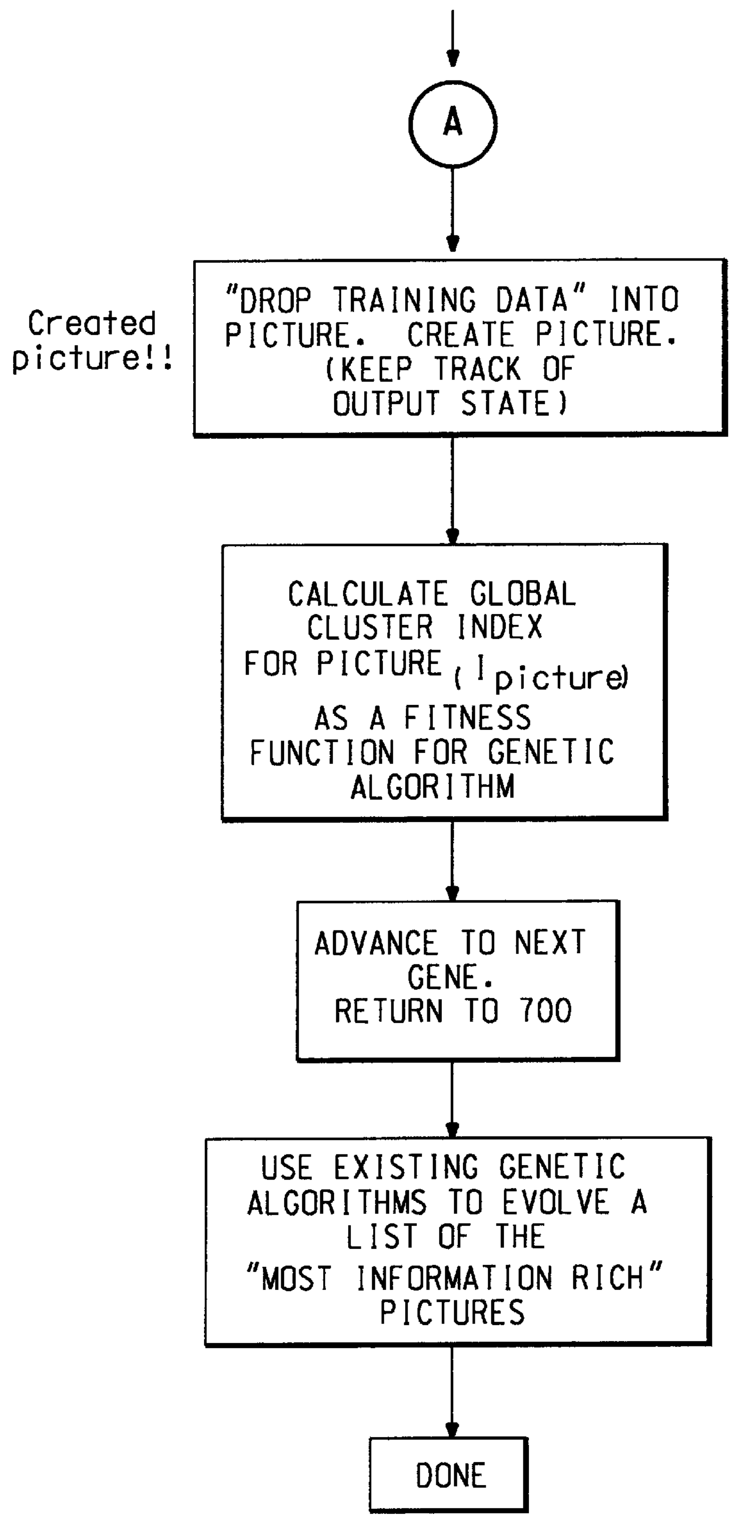
Figure 19D:
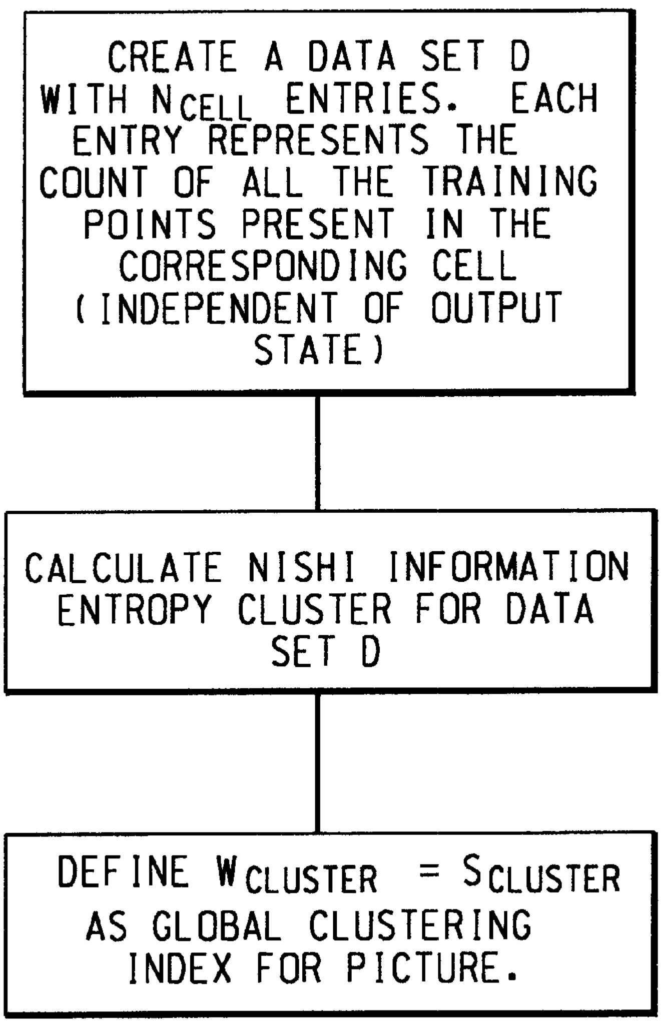
FIG. 19D is a block diagram illustrating a method for calculation of a global clustering index for a pictorial representation.

Referring to FIG. 18A, the framework creating steps may further be repeated, in a manner similar to the model creating steps, to find a group of optimum frameworks. An information-rich subset of the group of optimum frameworks may be determined as follows. The inputs of a test data set are applied to each framework of the selected subset group of frameworks and each framework-subset-predicted output is compared with each test data output. The step of calculating the framework-subset-predicted output is performed in a manner similar to the steps for creating an individual model, where a new training and test data set is created using individual framework-predicted values as inputs and actual output values as the outputs. This step may be repeated for multiple selected subset groups of frameworks. The selected subset groups are then evolved to find an optimum subset group of frameworks (this is called a "super-framework") that most accurately predicts system outputs from system inputs. FIG. 18B illustrates the considerations for super-framework evolution.

The optimum model determination steps, the optimum framework determination steps, or the optimum super-framework determination steps may be repeated until a predetermined stopping condition has been achieved. The stopping condition may be defined as, for example: 1) achievement of a predetermined prediction accuracy; or 2) when no further improvement in prediction accuracy is achieved. The method of the present invention is thus an extensible evolutionary process where a hierarchy of multiple interacting evolutionary objects distributed over the empirical data set is identified. The depth of the hierarchy of evolutionary objects is determined by the complexity of the data set to be analyzed. For simple data sets, one compact model using a very small subset of the total data set might be sufficient to accurately predict test and verification data set values across the total data set. As the complexity of the data set increases, it may be necessary to develop a hierarchy of models, frameworks, super frameworks etc to accurately explain the total data set (including the verification data set).

A significant computational advantage of Distributed Hierarchical Evolution results from the creation of multiple, compact evolutionary objects distributed across a large data set to define an empirical model rather than the creation of one large, monolithic empirical model. For highly non-linear processes, dividing a large task into many small tasks can provide significant computational advantage that has important practical consequences.

It should also be noted that as the distributed hierarchy grows, further optimizations are being performed at each stage, resulting in significant performance improvements over a single, global optimization over the entire data set. More and more of the information contained in the large data set is encapsulated in the interactions of the successively more complex evolutionary objects, with the interactions acting as a significant source of degrees of freedom in the empirical modeling process. This simplifies updating the empirical model when new data is presented. The initial steps in updating the empirical model involve evolving new groups of the most current or "highest" evolutionary objects in the existing empirical model using the new data as a test set. The earlier or "lower" evolutionary objects, which were evolved using the earlier data, need not be changed at all but can be used to create new groups of the most current evolutionary objects in the hierarchy. Only if an insufficiently accurate new empirical model results from this reclustering of earlier evolutionary objects is there a need to re-evolve (repeat the evolution of) the earlier evolutionary objects in the hierarchy using a subset of the new data. When this has been accomplished, then subsequently new groups of the most current evolutionary object are re-evolved using a different subset of the new data. This top-down approach to model updating offers significant computational advantages over more traditional bottom-up model updating common to most prior art modeling approaches.

Unsupervised Feature Clustering

The concept of a global entropy measure for a subspace can also be used as a fitness function to evolve feature clusters based on input correlations. Even if the cells in a feature subspace do not contain significant information with respect to an output state, the cell population statistics could still be highly clustered over the subspace. Correlations between input features can be identified by calculating the uniformity of cell population statistics independent of output state using an informational entropy definition very similar to the alternative definition of the global entropy parameter described above in the section entitled "Alternate Definition of Global Entropic Weighting Factor". In this case, the base quantity in the Nishi data set used to calculate the informational entropy is the cell population and the number of entries in the Nishi data set is the number of cells in the subspace.

By using evolutionary techniques driven by the global entropy of the cell occupation statistics, the most highly clustered feature subspaces can be evolved and shown in FIGS. 19A, 19B, 19C and 19D. (The evolutionary process of 19A and 19B is similar to previously described process of FIGS. 5A and 5B. The particular gene under consideration is selected at step 700. As shown by step 740, the next gene sequence is acted on beginning at step 700.)

This would be an alternative to other unsupervised methods such as the Kohonen neural networks, as described in Kohonen, T., "The Self-Organizing Map", Proceedings of the IEEE, vol. 78, (4), 1464–1480 (1990) for discovering clusters. An appealing aspect of the method of the present invention over such prior art methods is that the distinction between unsupervised and supervised modeling occurs very naturally by simply excluding or including the output state information in the entropy calculation.

Once a pool of highly clustered feature subspaces has been evolved, groups of feature subspaces in this pool can be recursively merged to create larger clusters using, for example, a threshold condition for the overlap of inputs across the subspaces as a driving condition for the recursion. In this way, a smaller group of larger feature clusters can be efficiently identified even in a very high dimensional data set where the direct identification of the larger feature clusters would be computationally intractable.

Information Visualization

During the first evolutionary stage of determining a feature data set of high global informational entropy, it is also possible to maintain a list of the cells with the highest local informational entropy, which are identified during the evolutionary process.

A minimum cell-count threshold may be used in selecting this list to prevent the entry of sparse, i.e., artificially information-rich, cells. It is also possible to create this high local entropy list at the end of the first evolutionary stage by examining the cells present in the features with high global information. For reasons of computational efficiency, creating this high local entropy list at the end of the first evolutionary stage is preferred.

This method of identifying information-rich cells in a multi-dimensional data space can also be used for "information visualization". Information visualization in a multi-dimensional space can be viewed as a problem of data reduction. In order to capture the essential information in a data set in an easily understandable fashion, only the most information-rich cells need be displayed. In the previous paragraph, a systematic method for selecting the most information-rich cells was discussed. Once these cells have been selected over all the subspaces, methods derived from color science may be used to display the selected cells in a visually appealing fashion. For example, in a (Hue, Saturation, Lightness) characterization of a color space, the hue coordinate can be mapped to the cell output category. The saturation coordinate can be mapped to the local cell entropy (either $E^{Ls}_i$ or $W^{Ls}_i$), which is a measure of cell purity, and the lightness coordinate can be mapped to the number of data points (i.e., the population) in the cell. Other visual mappings can also be performed. It should be noted that the process of generating an active list of the most information-rich cells on a per category basis at the end of the first evolutionary stage has resulted in a significant data reduction step. This data reduction facilitates identification of localized domains of high information in a large data space. Once the scan over all the subspaces is completed at the end of the first evolutionary stage, this list can be displayed on a suitable display device (such as a color CRT monitor) using an appropriate visual mapping method. The multi-dimensional data space has thus been reduced to a one-dimensional list for display purposes. A unique aspect of the method of the present invention is the combination of the methodology used to perform data modeling with the methodology used for information visualization. The common unifying kernel for both methods lies in the integration of informational entropy and evolution with the pictorial representation of data in the form of cells and subspaces.

Hybrid Modeling—Combining Distributed Hierarchical Evolution with Neural Networks or Other Modeling Paradigms Although the present method discloses a powerful framework for data modeling, it is important to note that no modeling framework is perfect. Every modeling method imposes a "model bias", either due to its approach or due to geometries that are imposed on the data. Distributed hierarchical evolution can be combined with other modeling paradigms to create a hybrid model. These other paradigms could be neural networks or other classification or modeling frameworks. If the other available modeling tools have a fundamentally different philosophy, combining one or more of them with Distributed Hierarchical Evolution has the effect of smoothing out model bias. In addition, multiple distributed models can be built within each paradigm using different data sets to smooth out data bias. The final predictive result could be a weighted or unweighted combination of the individual predictions coming from each model. Hybrid modeling thus provides an extremely powerful framework for modeling because it takes advantages of the strengths of diverse modeling philosophies.

The Discovery of Laws—Combining Distributed Hierarchical Evolution with Genetic Programming After the first evolutionary stage, it is instructive to examine the information content of the resulting feature data set. In many cases, there will be a number of relatively information-rich features, which taken together, can form the basis for the subsequent development of empirical models. On the other hand, if there are no information-rich features which have evolved, as measured by their absolute information content (which is normalized between 0 and 1), the most appropriate next step is to go back to the data instead of trying to evolve useful, robust models.

Occasionally, however, there could be another outcome of the first evolutionary stage. It may be that a standout feature has evolved from the data. This feature could be extremely information-rich, and may in fact represent the "genetic code" for the problem at hand. In such a case, the larger data set can be parsed using the inputs coded for by the standout gene, and this reduced data set can be used as an input into a genetic programming framework, to evolve a mathematical expression describing the underlying law. Genetic programming is described, for example, in Koza, J. R., "Genetic Programming—On the Programming of Computers by Natural Selection", M.I.T. Press (1994). This expression would represent an analytic description of the process being studied and would be the final outcome of an evolutionary discovery process. With this step, the combination of information theory and evolution will have resulted in discovering a mathematical expression encapsulating the underlying order in an apparently disordered system. The entire process of examining the features for information content and then embarking on either empirical modeling, mathematical discovery, or returning to the data describes a systematic approach to a "Science of Discovery" based on a data driven paradigm.

The evolution of a mathematical description of a disordered system transforms the empirical model from a fundamentally interpolative nature to an extrapolative nature. The mathematical expression can thus be used to predict output values even in data domains outside the range of the training sets used in the development of the empirical model. The mathematical description could also provide the stimulus for gaining fundamental insight into a process or system being modeled and perhaps discovering underlying principles.

EXAMPLE

Homogeneous Polymerase Chain Reaction (PCR) Fragment Identification

The present invention has been applied to the identification of homogeneous PCR fragments. The present method first identifies the information-rich portion of the DNA melting curve and then evolves optimal models using the information-rich subset of the input spectrum.

Background:

DNA fragment identification has traditionally been performed by gel electrophoresis. An alternative method using intercalated dyes offers potential time and sensitivity advantages. This method is based on the observation that the dye fluorescence decreases as the double stranded DNA denatures (unwinds) upon heating. Data analysis of the resulting so-called "melt curve", which plots the fluorescence versus temperature, provides the basis for a unique identification of the DNA fragment. The method, however, requires an accurate identification of a specific DNA fragment both in the presence of other non-specific fragments and in the presence of fluorescence noise from the background matrix.

Preparation of Spiked Food Samples:

This study evaluated foods that are known to inhibit PCR. The evaluation tested the ability of the addition of bovine serum albumin (BSA) to the reaction to overcome the inhibitory effect of the inhibitory foods. In addition, the homogeneous detection of PCR product using melting curve analysis was compared to standard gel electrophoresis with ethidium bromide staining.

Foods were purchased from local grocery stores and were stored at 4° C. Thirty different foods were pre-enriched according the BAM procedure. Following the prescribed enrichment, samples were spiked with *Salmonella* newport or were left unspiked, see Table III. The enrichments were then diluted 1:10 in BHI (Difco) and then incubated at 37° C. for 3 hours.

TABLE I

| Food | Pre-enrichment Broth | Food:Broth Dilution | Inoculation Levels |
|---|---|---|---|
| Almonds | LB | 1:10 | 0, $10^4$/mL, $10^5$/mL |
| Liquid Egg | TSB | 1:10 | 0, $10^4$/mL, $10^5$/mL |
| Red Wheat Bran | LB | 1:10 | 0, $10^4$/mL, $10^5$/mL |
| Peanut Butter | LB | 1:10 | 0, $10^4$/mL, $10^5$/mL |
| Walnuts | LB | 1:10 | 0, $10^4$/mL, $10^5$/mL |
| Ground Coffee | LB | 1:10 | 0, $10^7$/mL |
| Instant Coffee | LB | 1:10 | 0, $10^7$/mL |
| Instant Tea | LB | 1:10 | 0, $10^7$/mL |
| Thyme | TSB | 1:10 | $10^7$/mL |
| Chocolate Ice-cream | Non fat dry milk | 1:10 | $10^7$/mL |
| Basil | TSB | 1:10 | $10^7$/mL |
| Hot Chocolate Mix | Non fat dry milk | 1:10 | $10^7$/mL |
| Oregano | TSB | 1:100 | $10^7$/mL |
| Pastry Nut Mix | LB | 1:10 | $10^7$/mL |
| All Spice | TSB | 1:100 | $10^7$/mL |
| Rosemary | TSB | 1:10 | $10^7$/mL |
| Cinnamon | TSB | 1:100 | $10^7$/mL |
| Wheatbran | LB | 1:10 | $10^7$/mL |
| Carnation, Hot Cocoa Mix | Non fat dry milk | 1:10 | 0, $10^7$/mL |
| Nestle's cocoa | Non fat dry milk | 1:10 | 0, $10^7$/mL |
| Oreo Crumbs | Non fat dry milk | 1:10 | 0, $10^7$/mL |
| Swiss Mocha Café | Non fat dry milk | 1:10 | 0, $10^7$/mL |
| Nestle Chocolate Liquor | Non fat dry milk | 1:10 | 0, $10^7$/mL |
| Milk Chocolate | Non fat dry milk | 1:10 | 0, $10^7$/mL |
| Hershey's cocoa | Non fat dry milk | 1:10 | 0, $10^7$/mL |
| Dark Cocoa | Non fat dry milk | 1:10 | 0, $10^7$/mL |
| Viennese Chocolate Café | Non fat dry milk | 1:10 | 0, $10^7$/mL |
| Walnut Whip | Non fat dry milk | 1:10 | 0, $10^7$/mL |
| Nestle's milk chocolate crumbs | Non fat dry milk | 1:10 | 0, $10^7$/mL |

Polyvinylpolypyrrolidone (PVPP) Treatment:

A 500 ul aliquot of the growback sample was added to a tube containing a 50 mg tablet of PVPP (Qualicon, Inc.). The tube was vortexed and the PVPP was allowed to settle for 15 minutes. The resultant supernatant was then used in the lysis procedure.

*Salmonella* Sample Preparation:

In a 2 ml screw cap tube, five (5) microliters of the enrichment or PVPP treated sample was added to 200 ul of the lysis reagent (5 ml BAX® lysis buffer and 62.5 ul BAX® Protease) containing a 1:10,000 dilution of the DNA intercalating dye SYBR® Green (Molecular Probes). The tubes were incubated at 37° C. for 20 minutes followed by 95° C. for 10 minutes. Following the 95° C. incubation, 50 ul of a 4 mg/ml BSA solution was added to the lysate. This was done for both PVPP treated and untreated samples. As a control, some samples were left untreated. Fifty (50) microliters of this crude bacterial lysate was used to hydrate one BAX® *Salmonella* sample tablet that were contained in PCR tubes used with the Perkin Elmer 7700 Sequence Detector instrument. The tubes were capped and thermal cycled according to the following protocol in a Perkin Elmer 9600 thermal cycler:

| | | |
|---|---|---|
| 94° C. | 2.0 minutes | 1 cycle |
| 94° C. | 15 seconds | 35 cycles |
| 72° C. | 3.0 minutes | |
| 72° C. | 7 minutes | 1 cycle |
| 4° C. | "forever" | |

Post Amplification Analysis:

Following the amplification, melting curves were generated on the Perkin Elmer 7700 DNA Sequence Detector by running the following conditions:

| | | |
|---|---|---|
| Plate Type: | Single Reporter | |
| Instrument: | 7700 Sequence Detection System | |
| Run: | Real Time | |
| Dye Layer: | FAM | |
| Sample type: | Unknown | |
| Sample volume: | 50 ul | |
| Running Conditions: | | |
| 70° C. | 2 minutes 1 cycle | No data collection |
| 68° C. | 10 seconds 98 cycles | Collect data |
| Auto increment + 0.3° C./cycle | | |
| 25° C. | "forever" | |

The multicomponent data was exported from the instrument and was used in the analysis. The production of the specific DNA fragment was verified by adding 15 ul of BAX® Loading Dye to the amplified sample. A 15 ul was aliquot was then loaded into a well of a 2% agarose gel containing ethidium bromide. The gel was run at 180 volts for 30 minutes. The specific product was then visualized using UV transillumination.

Data Analysis:

The raw fluorescence data was imported into Microsoft Excel for processing. From this stage divergent approaches were used for visualizing the data and making predictions from the data.

Data Preprocessing:

It has been determined experimentally that preprocessing the data to reduce the fluorescence noise increases the likelihood of successful modeling. The data preprocessing consists of the following steps:

a. Normalizing the fluoresence data.

b. Interpolating the normalized fluorescence with a cubic spline function at 0.1° C. resolution.

c. Taking the logarithm of the interpolated fluorescence spectrum.

d. Smoothing the logarithm of the fluorescence using a 25 point Savitsky Golay smoothing function.

The resulting temperature spectrum is used as the set of inputs to the modeling method described herein. Two different modeling examples using the temperature spectrum are described.

Step a. Normalizing and Visualizing the Data

The fluorescence data is normalized by: first, determining the lowest measured fluorescence level in the spectrum; subtracting this values from each point in the spectrum to remove the dc offset. The normalized data of step a. above was then smoothed with a Savitzky-Golay smoothing algorithm. The negative derivative is taken of the smoothed fluorescence with respect to temperature (-dlog(F)/dT) and plotted, -dlog(F)/dT (y-axis) vs.Temperature (x-axis).

Steps b–d. Predictions From the Data

Starting with the normalized data, the data is interpolated to a 0.1 C resolution using a cubic spline interpolating function. The logarithm of the interpolated data is then taken and then smoothed with a Savitzky-Golay smoothing algorithm over 2.5 degrees (i.e., 25 points at 0.1° C. The negative derivative is taken of the log fluorescence with respect to temperature (-d(log F)/dT) and parsed at a 1.0 C interval using the data range for *Salmonella:* 82.0° C. to 93.0° C. (12 data points).

For method comparison, the method described herein was compared to two other well-known modeling methods: a Neural Network, and logistic regression; and the results are reported in the table below.

The most effective DNA fragment identification method found comprises using two modeling schemes in a back-to-back in a sequential fashion. The first level of identification is to separate smears from non-smears. This is followed by identifying the specific DNA fragment of interest for the non-smear samples. In practice, this hierarchical method has proven to be more accurate than using a single 3-state model with positives, negatives and smears representing the possible output categories.

1. Modeling of Non-Specific PCR Fragments Versus Specific PCR Fragments.

The PCR amplification process produces non-specific PCR fragments as well as fragments corresponding to a specific type of DNA of interest. The first example demonstrates the present method's ability to discriminate between the non-specific and specific PCR fragments. A group of 30 non-specific or "smear" fluorescence spectra were created, along with 149 locked process (i.e., control) specific training spectra and 309 test spectra of problem foods (actual foods known to be problematic for PCR). A temperature spectrum (over a range of 111.1° C.) for each sample comprising one hundred eleven (111) points, with a temperature resolution of 0.1° C., was created. Both the locked process and problem food samples contained both positive and negative exemplars. In this example, the positive samples were spiked (i.e., contaminated) with a specific bacteria (e.g., *Salmonella*) and the negative samples were left unspiked (uncontaminated). The smear samples were randomly introduced into both the locked process training set (12 smear samples) and the problem food test set (18 smear samples). Both the positive and negative sample states were merged and labeled with a binary zero "0" character and the smear sample states were labeled with a binary one "1".

a. Evolving the Most Information-Rich Set of Inputs:

The first step in the modeling process was to reduce the 111-dimensional input feature space into a smaller, more information-rich subset. The evolutionary framework described earlier was used to evolve the most information-rich features. An initial gene pool of 100 genes was randomly generated, where each gene comprised a binary string 111 bits long, with the state of each bit denoting whether the corresponding input feature was activated in the gene. The evolutionary process was constrained by the mean cell occupation number to be 1 sample per cell, and the evolution proceeded over 5 generations. The number-weighted-sum of local entropies was used as the global entropy, or fitness function, to drive the evolution for each gene. The evolution proceeded using fixed-sized subranges (i.e., fixed bins, rather than adaptive binning) and the data was balanced, as described above, to balance the number of 0 and 1 output states.

A global list of the 100 most information-rich genes was maintained throughout the evolutionary process. A histogram of the bit frequencies for all 111 input features was analyzed at the end of each generation of the evolution to identify the most frequently occurring bits in the information-rich gene pool which had evolved. This histogram provided information about which temperature points were most closely associated with the output states.

The 111 point temperature range was indexed from 0 to 110, the following 31 temperature points were selected from the evolutionary process: 12, 14, 16, 18, 20, 22, 24, 26, 28, 30, 32, 34, 36, 38, 40, 42, 44, 46, 50, 52, 54, 56, 58, 60, 62, 64, 80, 82, 84, 86, 88.

It should be noted that information-rich regions were observed in the histogram and even-numbered index points (listed above) spanning these regions were selected. It should be noted that most of the selected points span the range from 12–60. This is because the melting curve spectrum for the smear samples starts to rise above the baseline and separate from both the positive and negative samples in the temperature range corresponding to the index interval [12,60]. Even though smears by their very definition have variable melting curve structure, the main structural features generally appear at lower temperatures than in the positive samples. The negative samples are essentially structure free. Thus, the present method confirms that the lower temperature region is where the best discrimination between smears and non-smears occurs.

b. Exhaustively Searching All Low-Dimensional Projections of Parsed Data.

After the training data set was parsed using the information-rich points discovered in the first evolutionary process, the reduced data set was exhaustively searched at low dimensions over a wide binning range. Fixed bins and dataset balancing was used throughout the exhaustive process. In this modeling problem, it was found that generating 465 projections of the 31-dimensional input space into all two-dimensional projections using 26 fixed bins per dimension resulted in the best exhaustive model. Entropic weighting coefficients of $W_1^2=10$, $W_1=5$, constant term=1 were used. However, the exhaustive model using all 465 projections is not guaranteed to be the optimum model, since many of the projections could introduce more noise than information. So a second evolutionary stage was performed using 465 bit long binary strings with each bit representing the inclusion (binary 1) or the exclusion (binary 0) of a given two-dimensional projection in the gene pool for the model.

c. Evolving the Best Two-Dimensional Model

One hundred (100) random binary strings were initially generated and their fitness functions were calculated using the error in the test data set as the fitness function to drive the evolutionary process. The model was evolved over 20 generations and a global list of the most information-rich genes was maintained. Finally, the most information-rich gene in this gene pool (corresponding to the gene that resulted in the minimum test error) was selected as genetic code for smear detection. This gene had 163 of the two-dimensional projections included with the remaining projections excluded. The minimum test error using these 163 projections was 3 errors out of the 327 test cases (309 problem food samples plus 18 smear samples) resulting in a model accuracy of greater than 99%!

2. Modeling a Specific *Salmonella* PCR Fragment (Positive) Against Negative Samples As a second example of PCR modeling, the present method was presented the task of identifying a specific DNA fragment corresponding to *Salmonella* in a food sample. Once again, the locked process spectra was used as the training data set and the problem food spectra was used as the test data set. A similar process to the one described above was used to evolve the best predictive model.

a. Evolving the Most Information-Rich Set of Inputs:

Following a similar procedure to that described in the previous example, the present method evolved a set of 12 input features corresponding to the following temperature points:

10,13,16,61,64,67,76,79,82,85,88,91

Note that in this example, the information-rich portion of the spectrum is in the higher end of the temperature range (between points 61 and 91). This is not too surprising, since the main structure in the positive melting curves occurs in the vicinity of temperature index 80.

b. Exhaustively Searching all Low Dimensional Projections of Parsed data

After the training data set was parsed using the information-rich points discovered in the first evolutionary process, the reduced data set was exhaustively searched at low dimensions over a wide binning range. Fixed bins and dataset balancing was used throughout the exhaustive process. In this modeling problem, it was found that generating 220 projections of the 12-dimensional input space into all three-dimensional projections using 19 fixed bins per dimension resulted in the best exhaustive model. The same entropic weighting coefficients were used as in the previous example. In this example, it was found that using all 220 projections resulted in the best model. Evolving subsets of the 220 projections did not improve the predicted accuracy on the test data set. With all 220 projections, 301 out of the 309 problem food test samples (in the absence of smears) were identified properly for an accuracy of 97.4%.

Results

Of the 309 data samples produced during these experiments, 204 were spiked with *Salmonella* and 105 samples were "blank" reactions. Of the 204 spiked samples, 143 samples were positive on an agarose gel and 61 were negative on the gel. The negative samples can be attributed to the inhibition of PCR or inadequate gel or PCR sensitivity. Of the 105 "blank" reactions, 95 were negative on the gel, and 10 were positive on the gel. The positive samples can be attributed to natural food contamination (e.g., liquid egg samples) or technical errors.

The following Table summarizes the results of the three modeling methods. The output of each of the modeling methods is a number between one and zero. A "1" represents a "spiked" prediction while a "0" represents an "unspiked" prediction. The closer the number is to zero or one, the more confidence can be placed in the prediction. Any prediction higher than the threshold of 0.5 is considered positive. The number for each of the methods below shows the number of samples that agreed with the expected prediction.

TABLE II

| | Description | Expected Prediction[2] | Number of Samples[3] | Present Method | Neural Net | Logistic Regression |
|---|---|---|---|---|---|---|
| Spiked/ Pos Gel | Confirmed Pos | 1 | 143 | 139 | 138 | 134 |
| Unspiked/ Neg Gel | Confirmed Neg | 0 | 95 | 93 | 92 | 64 |
| Unspiked/ Pos Gel | Contaminated Sample | 1 | 10 | 8 | 8 | 10 |
| Spiked/ Neg Gel[1] | Detection Sensitivity | 0/1 | 61 | 56/5 | 55/6 | 47/14 |
| | | Total | 309 | 301 | 299 | 269 |
| | | | % Agreement | 97.41% | 96.76% | 87.06% |

[1]These samples were spiked, but were negative on the gel. Because homogeneous detection is more sensitive than gel detection, it is possible to detect a positive sample with homogeneous detection and not with a gel-based method. When calculating percent agreement, all samples in this category are assumed to be correct.
[2]The "Expected Prediction" column displays a one or a zero based on the spike status and gel result. This number is what the model would be expected to predict based on the training samples.
[3]The "Number of Samples" column displays the number of samples that fall into a particular spike/gel category.

In addition to the hierarchical modeling of the present method, a hybrid modeling framework may be employed.

Neural net models have been developed for both smear/non-smear identification as well as positive/negative identification. In fact, as more data becomes available, multiple training/test data sets can be generated resulting in multiple neural net and InfoEvolve™ models. An unknown sample can be tested in all the models and categorized based on the statistics of the individual model predictions. As we discussed in Appendix G, this approach has the advantage of reducing data bias as well as model bias, by diversifying over multiple data sets and modeling paradigms. In addition, the hierarchical approach of using two separate modeling stages successively will further improve model accuracy.

Hybrid Modeling

Although the present method discloses a powerful framework for data modeling, it is important to note that no modeling framework is perfect. Every modeling method imposes a "model bias", either due to its approach or due to geometries that are imposed on the data. The present method makes minimal use of additional geometries and has several advantages as described above; however the present method is fundamentally interpolative rather than extrapolative. In relatively data poor systems, this interpolative characteristic reduces the ease of generalization.

In order to take advantage of the present method's strengths and minimize its weaknesses, it can be combined with other modeling paradigms to create a hybrid model. These other paradigms could be neural networks or other classification or modeling frameworks. If the other modeling tool(s) has (have) a fundamentally different philosophy, combining one or more other modeling tool(s) with the present method has the effect of smoothing out model bias. In addition, multiple models can be built within each paradigm using different data sets to smooth out data bias. The final predictive result could be a weighted or unweighted combination of the individual predictions coming from each model. Hybrid modeling provides an extremely powerful framework for modeling to take advantage of the strengths of diverse modeling philosophies. In an important sense, this approach represents the ultimate goal of empirical modeling.

For instance, if there is a desire to minimize the percent of false negatives, as in the example described above in testing for foodborne pathogens, a positive result would be reported if any one of the models predicted a spiked sample. If this rule was applied to the data in this example the false positive rate based on gel results would be less than 0.7%. The false negative rate for any one model would have been: present method=3.9%, neural networks=4.5%, and logistic regression=5.8% respectively.

Concluding Remarks

This example illustrates the power of InfoEvolve™ in an important empirical modeling problem. InfoEvolve™ first identifies the information-rich portion of the DNA melting curve and then evolves optimal models using the information-rich subset of the input spectrum. The general paradigm followed in this example has been tested on a variety of industrial and business applications with great success, and provides powerful support for this new discovery framework.

Manufacturing Process Example

An important variable in the Kevlar® manufacturing process is the residual moisture retained in the Kevlar® pulp. The retained moisture can have a significant effect both in the subsequent processability of the pulp and resulting product properties. It is thus important to first identify the key factors, or system inputs, that affect moisture retention in the pulp in order to define an optimum control strategy. The manufacturing system process is complicated by the presence of multiple time lags between the input variables and the final pulp moisture due to the overall time frame for the drying process. A spreadsheet model of the pulp drying process can be created where the inputs represent several temperature and mechanical variables at multiple prior times, and the output variable is the pulp moisture at the current time. The most information-rich feature combinations (or genes) can be evolved using the InfoEvolve™ method described herein to discover which variables at which earlier time points are most information-rich in affecting pulp moisture.

Fraud Detection Example

Fraud detection is a particularly challenging application, not only because it is hard to build a training set of known fraudulent cases, but also because fraud may take on many forms. The detection of fraud can lead to significant cost savings for a business able to prevent fraud by predictive modeling. Identification of system inputs that can determine with some threshold probability that fraud will occur is desirable. For example, by first determining what is a "normal" record, records that vary from the norm by more than some threshold may be flagged for closer scrutiny. This might be done by applying clustering algorithms and then examining records that do not fall into any cluster, or by building rules that describe the expected range of values for each field, or by flagging unusual associations of fields. Credit card companies routinely build this feature of flagging unexpected usage patterns into their charge authorization process. If a cardholder normally uses his/her card for airplane tickets, rental cars, and restaurants, but one day uses it to buy stereo equipment or jewelry, the transaction may be delayed until the cardholder can speak with a representative of the card issuing company to verify his identity. (Reference: "*Data Mining Techniques for Marketing, Sales and customer Support*", by Micheal J. A. Berry, and Gordon Linhoff, 1997, pg. 76). The most information-rich feature combinations (or genes) can be evolved using the present invention described herein to discover which variables are most information-rich in detecting fraud. These variables may include the types and amounts of purchases over a time interval, credit balances, recent address changes etc. Once an information rich set of inputs has been identified, empirical models using these inputs can be evolved using the present invention. These models can be updated on a regular basis as new data comes in to create an adaptive learning framework for fraud detection.

Marketing Example

Banks desire sufficient warning of customer attrition for its demand deposit accounts (e.g. checking accounts) to have time to take preventive action. It is important to determine key factors or system inputs that predict potential customer attrition in a timely manner to spot trouble areas before it is too late. Thus, monthly summaries of account activity would not provide such timely output, whereas detailed data at a transactional-level may. System inputs include reasons customers may leave the bank, identifying data sources to determine if such reasons are feasible and then combining the data sources with transactional history data. For example, a customer's death may provide an output of transaction ceasing or a customer no longer is paid bi-weekly or no longer has direct deposit and thus no longer direct deposits on a regular bi-weekly basis. However, data generated by internal decisions may not be reflected in transactional data. Examples include a customer leaving because the bank now charges for debit card transactions that were once free or the customer was turned down for a loan. (See "*Data Mining Techniques for Marketing, Sales and Customer Support*", by Micheal J. A. Berry, and Gordon Linhoff, 1997, pg. 85). The most information-rich feature combinations (or genes) can be evolved using the present invention described herein to discover which variables will be the most information-rich in determining predictive attrition. Creating a data base where both internal controls associated with bank strategy as well as customer attributes are combined with transactional data patterns will allow potential information rich linkages between bank strategies, customer attributes and transactional patterns to be discovered. This in turn can lead to the evolution of customer behaviour forecasting models to anticipate transactional behaviour.

Financial Forecasting Example

An important consideration in financial forecasting (e.g., stock, option, portfolio and index pricing) is to determine an output variable tolerant of a wide margin of error in a dynamic and volatile arena such as the stock market. For example, predicting the change in the Dow Jones Index, rather than the actual price level, has a wider tolerance for error. Once a useful output variable has been identified, the next step is to identify the key factors, or system inputs, that may affect the selected output variable in order to define an optimum prediction strategy. The change in the Dow Jones Index, for example, might depend on prior changes in the Dow Jones Index as well as other national and global indices. In addition, global interest rates, foreign exchange rates and other macroeconomic measures may play a significant role. In addition, most financial forecasting problems are complicated by the presence of multiple time lags between the input variables (e.g. prior price changes) and the final price change at the end time frame. Thus, the inputs represent market variables (e.g., price changes, volatility of the market, change in volatility model, . . . ) at multiple prior times and the output variable is the price change at the current time. (Reference: "*Neural Networks for Financial Forcasting*" by Edward Gately, 1996, pg. 20). The most information-rich feature combinations (or genes) can be evolved using the present invention described herein to discover which variables at which earlier time points are most information-rich in affecting market variables for financial forecasting. Once these (variable, time point) combinations have been discovered, they can be used to evolve optimum financial forecasting models.

What follows is a Pseudo Code listing relating to the method described herein used to generate models:

```
    LoadParameters( );                      // Loads data set, and various
                                            parameter values such as type of
                                            binning, balance data choice,
                                            entropic weighting coefficients,
                                            number of data subsets etc...
Loop through subset_number {
    CreateDataSubset(filename);             // randomly subset data
Loop through number of local models {
    EvolveFeatures( );                      // Evolve Info-Rich Genes
    CreateTrainTestSubsets( );              // Break Data Subset into
                                            Train/Test subsets
        EvolveModel( );                     // Evolve a model
    }
}
```

-continued

```
CreateDataSubset

    DetermineRangesofInputs;
    if(BalanceStatsPerCatFlag is TRUE)
        BalanceRandomize;
    else
        NaturalRandomize;
DetermineRangeofInputs

                Loop through data records {
        Loop through input features {
            if(input feature value == max
                or input feature value == min) {
                LoadMinMaxArray(feature index, feature value);
                UpdateMinMax(feature value);
            }
        }                                   // end of input feature loop
    }                                       // end of data loop
BalanceRandomize

/*******************************************************************
/divides dataset into current subset and remainder subset;
/user specifies number of items per output category.
/*******************************************************************
Loop through output states {
    InitializeCountinState(output) to 0;
    InitializeCountinRemainingState(output) to 0,
}
Loop through data records {
    Set IncludeTrainFlag to FALSE;
    Loop through input features {
        if(input feature == min) {
            if(input FeatureMinFlag == CLEAR) {
                IncludeTrainFlag = TRUE;
                FeatureMinFlag      = SET;
            }
        }
        elseif(input feature == max) {
                if(input FeatureMaxFlag == CLEAR) {
                IncludeTrainFlag = TRUE;
                FeatureMaxFlag      = SET;
            }
        }
    }                                       // end of feature loop
    output = ReadOutputState;               // read output state for record
    guess = GuessRandomValue;
Threshold(output) = NUMITEMSPERCAT/TotalCountinState(output)
                                            //TotalCountinState(output)
                                            means #data items in output
                                            category
/**************************************************************
If data record is the FIRST instance of a feature minimum or maximum value,
copy record to BOTH the current data subset and the remaining data subset.
/**************************************************************
    if(IncludeTrainFlag == TRUE) {          // copy record to both
                                            // the current subset &
                                            // remaining data subset.
        CopyRecordtoCurrentDataSubset;
        IncrementCountinState(output);
        CopyRecordtoRemainingDataSubset;
        IncrementCountinRemainingState(output);
    }
/*******************************************************************
or else if the number of items in the output category is NOT in excess, replace the
data item in the REMAINING data subset.
/*******************************************************************
    elseif(Threshold(output) > MINIMUM_THRESHOLD){
        CopyRecordtoRemainingData;
        IncrementCountinRemainingState(output);
        if(CountinState(output) < NUMITEMSPERCAT) {
            CopyRecordtoDataSubset;
            IncrementCountinState(output);
                }
    }
        // MINIMUM_THRESHOLD is typically 0.5 to insure
        /enough data remains in remaining data
        /subset to create another current subset
```

-continued

```
/**********************************************************************
or else if the random guess decides that the data item should go to the current data
subset, check and see if the desired quota of NUMITEMSPERCAT has been
exceeded. If not, add data point to current data subset and increment CountinState.
/**********************************************************************
    elseif(guess <=     Threshold(output)) {
        if(CountinState(output) < NUMITEMSPERCAT) {
            CopyRecordtoDataSubset;
            IncrementCountinState(output);
            }
        else {
            CopyRecordtoRemainingData;
            IncrementCountinRemainingState(output);
            }
        }
/**********************************************************************
or finally, if the random guess decides that the data item should go into the
remaining data subset, check if the quota for the remaining subset has been
exceeded. If not, add the data item to the remaining data subset. If the quota has
been exceeded, add the data item to the current data subset if more items in that
category are needed.
/**********************************************************************
    elseif(CountinRemainingState(output) < (1−Threshold(output))*
            TotalCountinState(output)) {
            CopyRecordtoRemainingDataSubset;
            IncrementCountinRemainingData(output);
        }
    elseif(CountinState(output) < NUMITEMSPERCAT) {
            CopyRecordtoDataSubset;
            IncrementCountinDataSubset(output);
        }
}                                       // end of data record loop
//end of BalanceRandomize
NaturalRandomize

SampleSize = NumberOfDataRecords/NumberOfModels;
Threshold = 1 − SampleSize/NumberOfRemainingDataRecords;
Loop through output states {
    InitializeCountinState(output) to 0;
    InitializeCountinRemainingState(output) to 0;
}
Loop through data records {
    Loop through input features {
        if(input feature == min) {
            if(input FeatureMinFlag == CLEAR) {
                IncludeTrainFlag = TRUE;
                FeatureMinFlag      = SET;
            }
        }
        elseif(input feature == max) {
                if(input FeatureMaxFlag == CLEAR) {
                IncludeTrainFlag = TRUE;
                FeatureMaxFlag      = SET;
            }
        }
    }                                   // end of feature loop
    output = ReadOutputState;           // read output state for record
    guess = GuessRandomValue;
/***************************************************************
If data record is the FIRST instance of a feature minimum or maximum value,
copy record to BOTH the data subset and the remaining data subset.
***************************************************************/
    if(IncludeTrainFlag == TRUE) {      // copy record to
                                        // both the data subset and
                                        // the remaining data set.
        CopyRecordtoCurrentDataSubset;
        CopyRecordtoRemainingDataSubset;
    }
/**********************************************************************
or if the random guess decides that the data item should go into the remaining data
subset, check if the statistical limit for the remaining subset has been exceeded for
that category. If not, add the data item to the remaining data subset. If the quota
has been exceeded, add the data item to the data subset.
**********************************************************************
    elseif(guess <=     Threshold) {
            if(CountinRemainingState(output) <
                Threshold * TotalCountinState(output))
                CopyRecordtoRemainingDataSubset;
```

-continued

```
                else
                    CopyRecordtoCurrentDataSubset;
            }
/*********************************************************************
or if the random guess decides that the data item should go into the current data
subset, check if the statistical limit for the current subset has been exceeded for
that category. If not, add the data item to the current data subset. If the quota has
been exceeded, add the data item to the remaining data subset.
/*********************************************************************
            else {
            if(CountinState(output) <
                (1-Threshold])*TotalCountinState) {
                CopyRecordtoCurrentDataSubset;
            else
                CopyRecordtoRemainingDataSubset;
        }
}                                               // end of data record loop
/end of NaturalRandomize
EvolveFeatures

            SelectRandomStackofGenes(N);
            Loop Through each gene in Stack {
/*****************Create Subspace from gene***************/
                ReadParameters( );
                ReadSubspaceAxesfromGene( );
                if(AdaptiveNumberofBinsFlag == SET)
                    CalculateAdaptiveNumBins;
                else
                    UseNumBinsinParameterList;
                if(AdaptiveBinPositionsFlag == SET)
                    CalculateAdaptiveBinPositions;
                else
                    CalculateFixedBinPositions;
/*****************End of Create Subspace from gene***************/
                ProjectTrainDataintoSubspace;
                CalculateGlobalEntropyforSubspace;
            }                                   // end of gene loop
            EvolveGenesUsingGlobalEntropy( );   // genetic algorithm
}
CreateTrainTestSubsets

        DetermineRangesofInputs;
        RandomizeTrainTestSubsets;
RandomizeTrainTestSubsets

{
Threshold = ReadThresholdfromParameterList;
Loop through data records in Data Subset {
    Loop through input features {
        if(input feature == min) {
            if(input FeatureMinFlag == CLEAR) {
                IncludeTrainFlag = TRUE;
                FeatureMinFlag      = SET;
            }
        }
        else {
            if(input feature == max) {
                if(input FeatureMaxFlag == CLEAR) {
                IncludeTrainFlag = TRUE;
                FeatureMaxFlag      = SET;
                }
            }
    }                                           // end of feature loop
    output = ReadOutputState;                   // read output state for record
    guess = GuessRandomValue;
    if(guess <=    Threshold) {
            if(CountinTrainDataSubset(output) <
                Threshold(output)*TotalCountinState
                OR IncludeTrainFlag == TRUE)
                CopyRecordtoTrainDataSubset;
            else
                CopyRecordtoTestDataSubset;
        }
        else {
        if(CountinTestDataSubset(output) <
            (1-Threshold)*TotalCountinState(output)
            AND IncludeTrainFlag == FALSE) {
            CopyRecordtoTestDataSubset;
```

-continued

```
            else
                  CopyRecordtoTrainDataSubset;
      }
}                                               // end of data record loop
//end of RandomizeTrainTestSubsets
ModelEvolution

{
      GenerateRandomStackofModelGenes( ); // generate random
                                          // model genes where
                                          // a model gene is
                                          // a cluster of genes
            Loop through each model gene in stack {
            CalculateMGFF( ):             // calculate model gene

                                          // fitness function(MGFF)
            }                             // end of model gene loop
            EvolveFittestModelGene( );    // use MGFF to drive a
                                          //genetic algorithm to
                                          //evolve the fittest model
                                          //gene
}
CalculateMGFF - Calculation of Model Gene Fitness Function (MGFF)

{
      IdentifyFeatureGenes( );            //Parse model gene to identify
                                          // set of feature genes
      Loop through each feature gene {
            CreateFeatureSubspace( );
            Loop through each test record {
                  ProjectTestRecordintoSubspace( );
                  UpdateTestRecordPrediction( );
            }
      }
      Total_Error = 0;
      Loop through each test record {
            If(RecordPrediction != ActualRecordOutput)
                        TotalError = TotalError +1; // increment error
      }
      MGFF = Total_Error;
}
```

Preferred embodiments of the present invention have been described herein. It is to be understood, of course, that changes and modifications may be made in the embodiments without departing from the true scope of the present invention, as defined by the appended claims. The present embodiment preferably includes logic to implement the described methods in software modules as a set of computer executable software instructions. A Central Processing Unit ("CPU"), or microprocessor, implements the logic that controls the operation of the transceiver. The microprocessor executes software that can be programmed by those of skill in the art to provide the described functionality.

The software can be represented as a sequence of binary bits maintained on a computer readable medium including magnetic disks, optical disks, and any other volatile or (e.g., Random Access memory ("RAM")) non-volatile firmware (e.g., Read Only Memory ("ROM")) storage system readable by the CPU. The memory locations where data bits are maintained also include physical locations that have particular electrical, magnetic, optical, or organic properties corresponding to the stored data bits. The software instructions are executed as data bits by the CPU with a memory system causing a transformation of the electrical signal representation, and the maintenance of data bits at memory locations in the memory system to thereby reconfigure or otherwise alter the unit's operation. The executable software code may implement, for example, the methods as described above.

It should be understood that the programs, processes, methods and apparatus described herein are not related or limited to any particular type of computer or network apparatus (hardware or software), unless indicated otherwise. Various types of general purpose or specialized computer apparatus or computing device may be used with or perform operations in accordance with the teachings described herein.

In view of the wide variety of embodiments to which the principles of the present invention can be applied, it should be understood that the illustrated embodiments are exemplary only, and should not be taken as limiting the scope of the present invention. For example, the invention may be utilized in systems relating to the financial services market, advertising and marketing services, manufacturing processes, or other systems that involve large data sets. In addition, the steps of the flow diagrams may be taken in sequences other than those described, and more or fewer elements may be used in the block diagrams.

It should be understood that a hardware embodiment may take a variety of different forms. The hardware may be implemented as an integrated circuit with custom gate arrays or an application specific integrated circuit ("ASIC"). Of the course, the embodiment may also be implemented with discrete hardware components and circuitry. In particular, it is understood that the logic structures and method steps described herein may be implemented in dedicated hardware such as an ASIC, or as program instructions carried out by a microprocessor or other computing device.

The claims should not be read as limited to the described order of elements unless stated to that effect. In addition, use of the term "means" in any claim is intended to invoke 35 U.S.C. § 112, paragraph 6, and any claim without the word "means" is not so intended. Therefore, all embodiments that come within the scope and spirit of the following claims and equivalents thereto are claimed as the invention.

We claim:

1. A computer-implemented method of selecting a feature set having a global informational content above a predefined threshold, the feature set being selected from an initial feature set of inputs corresponding to inputs to a system having measurable inputs and outputs, wherein a large number of input data points to the system and corresponding output data points from the system are acquired to define a data set, and the acquired input and output data points are stored in a storage device, the method comprising the steps of:

(a) creating a plurality of feature subspaces, each said feature subspace comprising a set of features from the data set, (b) quantizing the inputs of the data set, the inputs having a range of values, by dividing the range of values into subranges, thereby dividing said feature subspace into a plurality of cells, (c) determining the global level of informational content of each feature subspace by calculating at least one local cell Nishi-formulated entropy E to define a local entropic weight W as the complement of the Nishi-formulated entropy E (W=1−E), and (d) selecting at least one feature set that has a global informational content above the predefined threshold.

2. The method of claim 1 wherein the step of quantizing the inputs of the data set is performed by dividing the range of values of each input into equally sized subranges.

3. The method of claim 1 wherein the step of quantizing the inputs of the data set is performed by adaptively dividing the range of values of the inputs into subranges, such that the population of data points within each subrange approximates the mean population of the subranges, the mean population being defined as the ratio of the overall selected data point population divided by the number of subranges.

4. The method of claim 1, wherein the step (a) of creating a plurality of feature subspaces is performed using a genetic selection method employing a fitness function which utilizes the global level of informational content of the feature subspaces, wherein the global level of informational content of the feature subspaces is based on a global entropic weight for each subspace, wherein the global entropic weight for a subspace is defined by an output-state-population-weighted sum of local entropic weights W, wherein each output-state-population is based on the total number of data points corresponding to an output state.

5. The method of claim 4, wherein the global entropic weight for each output state is based on the distribution of the population of that output state over the subspace.

6. The method of claim 4, wherein the global entropic weight for a subspace is based on a cell-population-weighted sum of local entropic weights W for each cell within the subspace.

7. The method of claim 6, wherein the local entropic weight W for each cell within the subspace is based on the distribution of the population of the output states over the cell.

8. The method of claim 6, wherein the local entropic weight W for each cell within the subspace is defined by the distribution of a normalized population of the output states over the cell, the normalized population of each output state being defined by the ratio of the population of output states over the cell to the total output state population.

9. The method of claim 4, wherein the global entropic weight for a subspace is defined by a cell-population-weighted sum of local entropic weight W, wherein each cell-population represents the total number of data points in the cell, wherein the local entropic weight W is defined by the distribution of the cell populations over the subspace.

10. The method of claim 1 further comprising, prior to step (a), the step of preprocessing the previously acquired data by applying a transformation function to the acquired data.

11. The method of claim 1, wherein, before step (a), grouping the acquired input and output data points into at least one training data set and at least one test data set by selecting corresponding combinations of inputs and outputs of the system, and wherein the step of selecting at least one feature set comprises selecting a plurality of sets of features, and further comprising the step of:

(e) selecting a group of feature sets that most accurately predicts the system outputs from the system inputs of the test data set.

12. The method of claim 11, wherein the step of selecting a group of feature sets is performed using a genetic selection method employing a fitness function, and wherein the fitness function for the genetic selection method is based on a predictive error parameter for the entire test data set.

13. The method of claim 12, wherein the predictive error for a system having discrete outputs is the fraction of samples correctly classified in the test data set, and wherein an output state of each data point is predicted by creation and analysis of an output state probability vector for that data point.

14. The method of claim 13, wherein the output state is predicted by the state having the largest probability in the output state probability vector.

15. The method of claim 13, wherein the output state probability vector is based on a set of probabilities of each possible output state, wherein the probability of each output state is a weighted sum over all feature subspaces of the probability of being in that output state, and wherein the weighted sum is computed using local entropic weights W and global entropic weights.

16. The method of claim 12, wherein the predictive error for a continuous system having quantitative outputs is the normalized mean absolute difference between the predicted and the actual output values of the test data set.

17. The method of claim 16, wherein the output values are artificially quantized into a set of discrete output states to facilitate computing the local entropic weights W and global entropic weights, wherein a mean analog output value is calculated by using a data replication scale factor for balancing the data set over all the artificially quantized output states.

18. The method of claim 17, wherein the output state value for each data point is predicted by calculating a mean analog output value in a cell for a subspace, wherein the mean analog output value is calculated as a weighted sum of the mean analog output values over all the subspaces, wherein the weighted sum is computed using local entropic weights W and global entropic weights.

19. The method of claim 12, wherein the predictive error for a continuous system having quantitative outputs is the normalized median absolute difference between the predicted and the actual output values of the test data set.

20. The method of claim 19, wherein the output values are artificially quantized into a set of discrete output states to facilitate computing the local entropic weights W and global entropic weights, wherein a median analog output value is calculated by using a data replication scale factor for balancing the data set over all the artificially quantized output states.

21. The method of claim 19, wherein the output state value for each data point is predicted by calculating a median analog output value in a cell for a subspace, wherein the median analog output value is calculated as a weighted sum of the median cell analog output values over all the subspaces, wherein the weighted sum is computed using local entropic weights W and global entropic weights.

22. The method of claim 1, further comprising:

(e) creating a histogram representing the frequency of occurrence of each input in the selected feature set.

23. The method of claim 22, wherein a dimensionality of the data set is the number of inputs, further comprising:

(f) retaining the most frequently occurring inputs to define a reduced-dimensionality data set, wherein the reduced-dimensionality is less than or equal to the dimensionality of the data set.

24. The method of claim 23, wherein the retaining step (f) further comprises:

analyzing the histogram to select a subset of the inputs to create a reduced-dimensionality data set, wherein the size of the subset is less than or equal to the number of inputs, wherein the subset of inputs having the highest frequency of occurrence is selected by sorting the histogram.

25. The method of claim 23, wherein the retaining step (f) further comprises creating a visual representation of the histogram and subjectively selecting a subset of the inputs, wherein the size of the selected subset is less than or equal to the number of inputs.

26. The method of claim 23, wherein the retaining step (f) further comprises:

subjectively selecting one or more inputs to represent each peak in the histogram.

27. The method of claim 23, wherein, before step (a), grouping the acquired input and output data points into at least one training data set and at least one test data set by selecting corresponding combinations of inputs and outputs of the system, and further comprising the steps of:

(g) defining a reduced-dimensionality group of feature sets by exhaustively searching over a plurality of subsets of the reduced-dimensionality data set under a plurality of quantization conditions to determine an optimum or near-optimum dimensionality and an optimum or near-optimum quantization condition, the combination of which most accurately predicts system outputs from system inputs on the test data set, (h) using a genetic selection method, selecting a final group of feature sets from the reduced-dimensionality group of feature sets that most accurately predicts system outputs from system inputs on the data set.

28. A computer-implemented method of defining a model of a system having measurable inputs and outputs from a data set that most accurately predicts system outputs from system inputs, wherein a large number of input data points to the system and corresponding output data points from the system are acquired, the input and output data points are stored in a storage device, and the acquired input and output data points are grouped into at least one training data set and at least one test data set by selecting corresponding combinations of inputs and outputs of the system, the method comprising the steps of:

(a) creating a plurality of feature subspaces, each said feature subspace comprising a set of features from the training data set, each feature subspace having a dimension, wherein the dimension of a feature subspace is the number of inputs in the subspace, (b) quantizing the inputs of the training data set, the inputs having a range of values, by dividing the range of values into subranges, thereby dividing said feature subspace into a plurality of cells, (c) determining the global level of informational content of each feature subspace by calculating at least one local cell Nishi-formulated entropy E to define a local entropic weight W as the complement of the Nishi-formulated entropy E (w=1−E), (d) selecting at least one feature set that has a global informational content above a predefined threshold, and (e) searching over the plurality of feature subspaces of the training data set under a plurality of quantization conditions by repeating steps (b)–(d) to determine an optimum or near-optimum dimensionality and an optimum or near-optimum quantization condition of cells, the combination of which most accurately predicts system outputs from system inputs on the test data set, thereby defining a model.

29. The method of claim 28 further comprising the step of retaining a subset of the cells in the feature subspace having high local entropic weights W above a predefined threshold.

30. The method of claim 29, wherein the informational content of a cell comprises the output value, the local cell entropic weight W and the cell population, further comprising the step of displaying the subset of cells on a display device by mapping the output value, the local cell entropic weight W and the cell population into a color space.

31. A computer-implemented method of defining a framework by selecting a group of models of a system having measurable inputs and outputs that most accurately predict system outputs from system inputs, wherein a large number of input data points t to the system and corresponding output data points from the system are acquired, the acquired input and output data points are stored in a storage device, and the acquired input and output data points are grouped into at least one training data set and at least one test data set by selecting corresponding combinations of inputs and outputs of the system, the method comprising the steps of:

(a) defining a feature subspace as a combination of one or more inputs, wherein the dimension of a feature is the number of inputs in the combination;

(b) determining a combination of feature subspaces having a global informational content above a predefined threshold by:

(i) selecting the training data set;

(ii) creating a plurality of feature subspaces from the training data set;

(iii) quantizing the inputs of the training data set with respect to each feature subspace, the inputs having a range of values, by dividing the range of values into subranges thereby dividing each feature subspace into a plurality of cells, each cell having a cell population being defined as the number of training set data points which occupy each cell, (iv) determining the local Nishi-formulated informational entropy E of each cell in the subspace, (v) using the local informational entropy (E) to define a local entropic weight W as the complement of the Nishi-formulated entropy E (W=1−E), and using the local entropic weight W to determine the global informational content of each feature subspace, (vi) determining a set of feature subspaces that have a global informational content above the predefined threshold;

(c) selecting a model comprising a set of feature subspaces that most accurately predicts system outputs from system inputs on the test data set;

(d) repeating steps (a)–(c) on different training and test data sets to define a group of models;

(e) creating a new training data set and a new test data set using individual model output-predicted values as inputs and actual output values as outputs; and (f) selecting a subset group of optimum models from the group of models that most accurately predict system outputs from system inputs on the new test data set to define the framework.

32. The method of claim 31, wherein the selecting step (f) is performed using a genetic selection method employing a fitness function, wherein the fitness function for the genetic selection method is defined by a predictive error parameter for the entire new test data set of step (f).

33. The method of claim 31, wherein the step (b) (vi) of determining a set of feature subspaces that have a global informational entropy above the predefined threshold is performed using a genetic method employing a fitness function.

34. A computer-implemented method of defining a super-framework of a system having measurable inputs and outputs by selecting a group of frameworks that most accurately predict system outputs from system inputs, wherein a large number of input data points to the system and corresponding output data points from the system are acquired, the acquired input and output data points are stored in a storage device, and the acquired input and output data points are grouped into at least one training data set and at least one test data set by selecting corresponding combinations of inputs and outputs of the system, the method comprising the steps of:

(a) defining a feature subspace as a combination of one or more inputs, wherein the dimension of a feature subspace is the number of inputs in the combination;

(b) determining a combination of feature subspaces of a global informational content above a predefined threshold by:

(i) selecting the training data set, (ii) creating an initial set of features from the training data set, (iii) quantizing the inputs of the training data set, the inputs having a range of values, by dividing the range of values into subranges, thereby dividing each feature subspace into a plurality of cells, the cells being defined by combinations of subranges of inputs, each cell having a cell population being defined as the number of training data set data points which occupy each cell, (iv) determining the local Nishi-formulated informational entropy E of each cell in the subspace, (v) using the local informational entropy E to define a local entropic weight W as the complement of the Nishi-formulated entropy E (W=1−E), and using the local entropic weight W to determine the global informational content of each feature subspace, (vi) determining a set of feature subspaces that have a global informational content above a predefined threshold;

(c) selecting a model comprising a combination of features subspaces that most accurately predicts system outputs from system inputs on the test data set;

(d) repeating steps (a)–(c) on different training data sets and test data sets to define a group of models;

(e) creating a new training data set and a new test data set using individual model output-predicted values as inputs and actual output values as outputs;

(f) defining a framework by selecting a subset group of optimum models from the group of models that most accurately predict system outputs from system inputs on the new test data set;

(g) repeating steps (a)–(f) on different training data sets and test data sets to define a group of optimum frameworks;

(h) creating a new training data set and a new test data set using individual framework output-predicted values as inputs and actual output values as the outputs; and (i) defining a super-framework by selecting a subset group of frameworks from the group of optimum frameworks that most accurately predict system outputs from system inputs on the new test data set.

35. The method of claim 34, wherein the step (f) of selecting the subset group of frameworks from the group of optimum frameworks that most accurately predict system outputs from system inputs is performed using a genetic selection method employing a fitness function, wherein the fitness function for the genetic selection method is defined by a predictive error parameter for the entire new test data set of step (i).

36. The method of claim 34, wherein the step (b)(vi) of determining a set of feature subspaces that have high global informational entropy is performed using a genetic selection method employing a fitness function.

37. A computer-implemented method of evolving a mathematical relationship between inputs and outputs in an empirical data set acquired from a system having measurable inputs and outputs, wherein a large number of input data points to the system and corresponding output data points from the system are acquired, the acquired input and output data points are stored in a storage device, and the acquired input and output data points are grouped into at least one training data set and at least one test data set by selecting corresponding combinations of inputs and outputs of the system, the method comprising the steps of:

(a) defining a feature subspace as a combination of one or more inputs, wherein the dimension of a feature subspace is the number of inputs in the combination;

(b) determining a combination of feature subspaces having a global informational entropy above a predefined threshold by:

(i) selecting the training data set, (ii) creating an initial set of feature subspaces from the training data set, (iii) quantizing the inputs of the training data set, the inputs having a range of values, by dividing the range of values into subranges, thereby dividing each feature subspace into a plurality of cells, each cell having a cell population being defined as the number of training set data points which occupy each cell, (iv) determining the local Nishi-formulated informational entropy E of each cell in the subspace relative to each output of the subspace, (v) using the local informational entropy E to define a local entropic weight W as the complement of the Nishi-formulated entropy E (W=1−E), and using the local entropic weight W to determine the global informational entropy of each feature subspace, (vi) selecting a set of feature subspaces that have a global informational entropy above the predefined threshold;

(c) selecting the feature subspace with the highest global informational entropy from the feature data set;

(d) creating a reduced-dimensionality data set by selecting only those inputs from the data set that are contained in the selected feature subspace; and (e) applying a genetic programming method to evolve a mathematical relationship between the inputs and outputs of the reduced-dimensionality data set.

38. A hybrid method of evolving a relationship between inputs and outputs in an empirical data set acquired from a system having measurable inputs and outputs, using the model generating method of one of claim, comprising the steps of:

(a) generating a first model from a data set;

(b) generating a second model using the same modeling method, by either:

i) creating a plurality of feature subspaces different from the first model generating step, or ii) dividing the feature subspace into a different plurality of cells by quantizing the inputs differently from the first model generating step;

(c) dividing the data set into subsets and determining a local performance of each model in each subset;

(d) generating a weighting function based upon the local performance of the first and second models in each subset; and (e) combining the first and second models using the weighting function, thereby combining the local performance advantages of each of the models.

39. A machine-readable storage medium containing data generated by the method of one of claims 1, 4, 10, 11, 12, 16, 22, 25, 27, 28, 31, 34, or 37.

40. A hybrid method of evolving a relationship between inputs and outputs in an empirical data set acquired from a system having measurable inputs and outputs, using the model generating method of one of claim 28 or 31 or 34 or 37, comprising:

(a) generating a first model from a data set;

(b) generating a second model using the same modeling method, by either:

i) creating a plurality of feature subspaces different from the first model generating step, or ii) dividing the feature subspace into a different plurality of cells by quantizing the inputs differently from the first model generating step;

(c) dividing the data set into two or more subsets and generating a weighting function based upon performance of the first and second models in each subset; and (d) combining the first and second models using the weighting function, thereby combining advantages of the performance of each of the models.

41. A machine-readable storage medium containing a set of instructions for causing a computing device to generate a model of a system using measurable inputs and measurable outputs of the system, said instructions causing the computing device to execute the steps of:

creating a plurality of feature subspaces, each said feature subspace comprising a set of features from data acquired from the system;

determining the global level of informational content of each feature subspace by calculating at least one local cell Nishi-formulated entropy E to define a local entropic weight W as the complement of the Nishi-formulated entropy E (W=1−E)

searching the plurality of feature subspaces to locate feature subspaces having informational content above a predefined threshold, said located feature subspaces comprising combinations of one or more inputs;

searching a plurality of models, said models comprising one or more of said located feature subspaces, each of said models having an associated output prediction; and selecting one of said models having an output prediction accuracy that is greater than that of at least one other model.

42. The storage medium of claim 41 wherein said step of searching a plurality of subspaces is performed by examining substantially all possible subspaces.

43. The storage medium of claim 41 wherein said step of searching a plurality of subspaces is performed by a genetic evolution algorithm employing a measure of informational content as a fitness function, wherein said fitness function is a measure of global subspace entropy, further comprising the step of eliminating one or more inputs having the lowest frequency of occurrence in the plurality of models, and thereafter repeating the step of searching, wherein the feature subspaces comprise combinations of one or more of the remaining inputs.

44. The storage medium of claim 41 wherein said step of searching a plurality of models is performed by a genetic evolution algorithm which uses a measure of prediction accuracy as a fitness function, wherein said measure of prediction accuracy is based on predictions comprising a weighted combination of predictions of localized cellular regions within said one or more informational feature subspaces.

45. The storage medium of claim 41 wherein said searching includes dividing each said subspace into cells.

46. The storage medium of claim 45 wherein the number of cells is varied to identify a cell division that provides a higher informational content than at least one other cell division.

47. The storage medium of claim 45 wherein the number of cells is determined based on the number of available data points.

48. The storage medium of claim 45 wherein the cells are determined by dividing each dimension into equally sized subranges.

49. The storage medium of claim 45 wherein the cells are determined by dividing each dimension of a given subspace into subranges such that each subrange has approximately the same number of data points.

50. The storage medium of claim 41 wherein the informational content of a subspace is a weighted sum of cell informational content.

51. The storage medium of claim 50 wherein the cell informational content is based on the probabilities of an output being in a given output state for that cell.

52. The storage medium of claim 50 wherein the cell informational content is based on output state entropy.

53. The storage medium of claim 50 wherein the weight of a cell is based on number of points in the cell.

54. The storage medium of claim 41 wherein the informational content is a weighted sum of output-specific probabilities.

55. The storage medium of claim 54 wherein the output-specific probabilities are based on the probabilities of inputs being in individual cells for a given output state, wherein the output-specific probabilities are based on the entropy of the cell distribution for a given output state.

56. The storage medium of claim 54 wherein the weight of a subspace is based on the number of points in that subspace for a given output state.

57. The storage medium of claim 41 wherein the located informational subspaces are identified by a heuristic algorithm utilizing the number of cells within a subspace having a clustering of output states.

58. The storage medium of claim 41 wherein each subspace is divided into cells and each cell in each subspace has a cell probability vector, and wherein elements of the probability vector correspond to the probability of each output state, wherein each model has an associated probability vector containing a weighted sum of cell probability vectors, and wherein the weight is a combination of local entropic weights W and global entropic weights.

59. The storage medium of claim 41 wherein the output prediction accuracy is based on predictions having a value equal to the output having the highest probability of occurrence.

60. The storage medium of claim 41 further including instructions comprising the steps of:

selecting a plurality of models; and grouping subsets of the selected models into a framework.

61. A machine-readable storage medium containing data structures, said data structures comprising:

a feature subspace data structure containing data representing a plurality of input combinations corresponding to a plurality of feature subspaces;

a model data structure containing data representing a plurality of feature subspace combinations;

a data structure containing data used to specify cell regions for each feature subspace; and a training data structure containing data representing the training data set needed to populate the feature subspaces; and further containing a data structure containing entropic weights for each subspace, each entropic weight being based upon at least one local cell Nishi-formulated entropy E, each local entropic weight W being defined as the complement of the Nishi-formulated entropy E (W=1−E).

62. The storage medium of claim 61 further containing a data structure containing entropic weights for each cell region.

63. The storage medium of claim 61 further containing a data structure containing prediction values for each cell region.

64. The storage medium of claim 61 further containing a framework data structure containing data representing a plurality of model combinations.

65. A machine-readable storage medium containing a plurality of data structures, said plurality of data structures being used to determine a system output prediction response to system input data points, said data structures comprising:

a mapping data structure containing data used to map an input data point to a cell prediction value, wherein the prediction values are weighted probability vectors;

a model data structure containing data representing a plurality of feature subspace combinations, and, further comprising a weighting data structure containing data representing local entropic weights w and global entropic weights, each entropic weight being based upon at least one local cell Nishi-formulated entropy E, each local entropic weight W being defined as the complement of the Nishi-formulated entropy E (W=1−E).

66. The storage medium of claim 65 further containing a framework data structure containing data representing a plurality of model combinations.

67. The method of claim 1 wherein the system relates to a manufacturing, financial services, advertising, marketing, analytical process or any system having large sets of measurable data.

68. A machine-readable storage medium containing a set of instructions for causing a computing device to generate a model of a system using measurable inputs and measurable outputs of the system, wherein a large number of input data points to the system and corresponding output data points from the system are acquired to define a data set, said instructions causing the computing device to execute the steps of:

(a) creating a plurality of feature subspaces, each said feature subspace comprising a set of features from the data set, (b) quantizing the inputs of the data set, the inputs having a range of values, by dividing the range of values into subranges, thereby dividing said feature subspace into a plurality of cells, (c) determining the global level of informational content of each feature subspace by calculating at least one local cell Nishi-formulated entropy E to define a local entropic weight W as the complement of the Nishi-formulated entropy E (W=1−E), and (d) selecting at least one feature set that has a global informational content above a predefined threshold.

* * * * *